United States Patent
Mori et al.

(10) Patent No.: US 10,093,798 B2
(45) Date of Patent: Oct. 9, 2018

(54) POLYESTER RESIN COMPOSITION

(71) Applicant: KAO CORPORATION, Tokyo (JP)

(72) Inventors: Masahiro Mori, Wakayama (JP);
Motoi Konishi, Wakayama (JP);
Akiyoshi Kimura, Wakayama (JP);
Masahiro Fujioka, Wakayama (JP);
Kenta Mukai, Utsunomiya (JP);
Yoshiaki Kumamoto, Wakayama (JP)

(73) Assignee: KAO CORPORATION, Tokyo (JP)

( * ) Notice: Subject to any disclaimer, the term of this patent is extended or adjusted under 35 U.S.C. 154(b) by 0 days.

(21) Appl. No.: 14/369,046

(22) PCT Filed: Dec. 20, 2012

(86) PCT No.: PCT/JP2012/083122
§ 371 (c)(1),
(2) Date: Jun. 26, 2014

(87) PCT Pub. No.: WO2013/099770
PCT Pub. Date: Jul. 4, 2013

(65) Prior Publication Data
US 2015/0011685 A1    Jan. 8, 2015

(30) Foreign Application Priority Data

Dec. 28, 2011  (JP) ................. 2011-289170
Jul. 6, 2012   (JP) ................. 2012-152644

(51) Int. Cl.
*C08L 67/04*   (2006.01)
*C08B 15/06*   (2006.01)
(Continued)

(52) U.S. Cl.
CPC .......... *C08L 67/04* (2013.01); *B29C 45/0001* (2013.01); *B29C 45/0005* (2013.01);
(Continued)

(58) Field of Classification Search
CPC ................. C08B 15/06; C08L 67/04
See application file for complete search history.

(56) References Cited

U.S. PATENT DOCUMENTS

| | | |
|---|---|---|
| 2010/0173146 A1 | 7/2010 | Ihara et al. |
| 2011/0129505 A1 | 6/2011 | Kaneko et al. |
| 2012/0283363 A1 | 11/2012 | Kumamoto et al. |

FOREIGN PATENT DOCUMENTS

| | | |
|---|---|---|
| JP | 2000-26229 A | 1/2000 |
| JP | 2008-1728 A | 1/2008 |

(Continued)

OTHER PUBLICATIONS

Lasseuguette, E., "Grafting onto microfibrils of native cellulose," Cellulose (2008) 15:571-580.*

(Continued)

*Primary Examiner* — Nicholas E Hill
(74) *Attorney, Agent, or Firm* — Birch, Stewart, Kolasch & Birch, LLP

(57) ABSTRACT

A polyester resin composition containing a polyester resin, and a fine cellulose fiber composite having an average fiber diameter of from 0.1 to 200 nm, wherein the fine cellulose fiber composite contains fine cellulose fibers and hydrocarbon groups being connected thereto via an amide bond. The polyester resin composition of the present invention can be worked into a molded article by thermoforming or injection-molding, and is suitably used for various industrial applications, such as daily sundries, household electric appliance parts, packaging materials for household electric appliance parts, and automobile parts. In addition, the fine cellulose fiber composite has high dispersibility against various resins and can exhibit thickening effects, so that it is suitable as various thickeners or the like.

3 Claims, 1 Drawing Sheet

VACUUM-FORMED ARTICLE (CUP-SHAPED)

(51) Int. Cl.

| | | |
|---|---|---|
| *C08L 1/08* | (2006.01) | |
| *C08J 5/04* | (2006.01) | |
| *C08L 1/02* | (2006.01) | |
| *B29C 45/00* | (2006.01) | |
| *B29C 47/00* | (2006.01) | |
| *B29K 1/00* | (2006.01) | |
| *B29K 67/00* | (2006.01) | |
| *B29K 105/00* | (2006.01) | |

(52) U.S. Cl.
CPC ...... *B29C 47/0004* (2013.01); *B29C 47/0054* (2013.01); *C08B 15/06* (2013.01); *C08J 5/045* (2013.01); *C08L 1/02* (2013.01); *C08L 1/08* (2013.01); *B29K 2001/08* (2013.01); *B29K 2067/046* (2013.01); *B29K 2105/0088* (2013.01); *C08J 2367/04* (2013.01); *C08L 2201/08* (2013.01); *C08L 2201/10* (2013.01); *C08L 2205/06* (2013.01); *C08L 2205/16* (2013.01); *Y10T 428/298* (2015.01)

(56) References Cited

FOREIGN PATENT DOCUMENTS

| JP | 2010-37199 A | 2/2010 |
|---|---|---|
| JP | 2010-116477 A | 5/2010 |
| JP | 2010-242063 A | 10/2010 |
| JP | 2010-270315 A | 12/2010 |
| JP | 2011-140632 A | 7/2011 |
| JP | 2011-152787 A | 8/2011 |
| JP | 2013-14741 A | 1/2013 |
| WO | WO 2005/003450 A1 | 1/2005 |
| WO | WO 2009/078492 A1 | 6/2009 |
| WO | WO 2011/071156 A1 | 6/2011 |

OTHER PUBLICATIONS

Bonini, et al., "Rodlike Cellulose Whiskers Coated with Surfactant: A Small-Angle Neutron Scattering Characterization", Langmuir, vol. 18, 2002 (Published on Web Mar. 13, 2002), pp. 3311-3314.
Heux, et al., "Nonflocculating and Chiral-Nematic Self-ordering of Cellulose Microcrystals Suspensions in Nonpolar Solvents", Langmuir, vol. 16, 2000 (Published on Web Sep. 13, 2000), pp. 8210-8212.
International Search Report, dated Apr. 16, 2013, for International Application No. PCT/JP2012/083122.
Johnson, et al., "Preparation and characterization of hydrophobic derivatives of TEMPO-oxidized nanocelluloses", Cellulose, vol. 18, 2011 (Published online: Aug. 10, 2011), pp. 1599-1609.
Lasseuguette, "Grafting onto microfibrils of native cellulose", Cellulose, vol. 15, 2008 (Published online: Feb. 6, 2008), pp. 571-580.
Petersson, et al., "Structure and thermal properties of poly (lactic acid)/cellulose whiskers nanocomposite materials", Composites Science and Technology, vol. 67, 2007 (Available online Jan. 11, 2007), pp. 2535-2544.
Extended European Search Report, dated Jul. 20, 2015, for European Application No. 12861739.6.

* cited by examiner

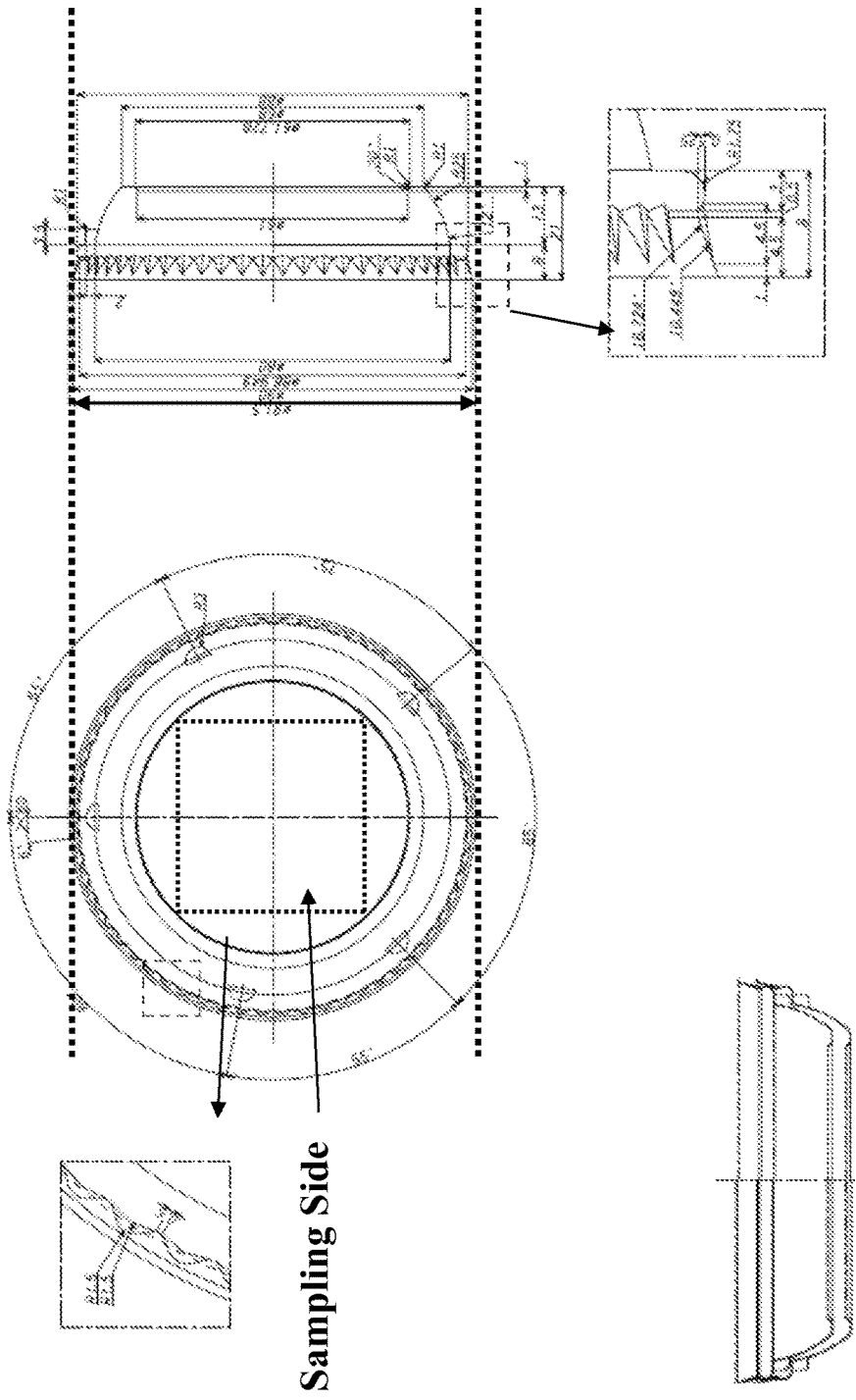

POLYESTER RESIN COMPOSITION

FIELD OF THE INVENTION

The present invention relates to a polyester resin composition. More specifically, the present invention relates to a polyester resin composition which can be suitably used in daily sundries, household electric appliance parts, automobile parts, and the like, a molded article made of the polyester resin composition, and a method for producing the molded article.

BACKGROUND OF THE INVENTION

Conventionally, although plastic materials derived from petroleum, which is a limited resource, are being used in many occasions, techniques involving less burdens to the environment (environmental friendliness) are given high profiles in the recent years. Under the background art mentioned above, materials using cellulose fibers which are biomass that is present in an abundant amount in nature are currently remarked.

For example, Non-Patent Publications 1 to 3 describe that a composite material of a polylactic acid and cellulose nanowhiskers is obtained by using a dispersion prepared by dispersing acicular fine cellulose fibers called cellulose nanowhiskers in an organic solvent such as toluene, cyclohexane, or chloroform. The cellulose nanowhiskers are obtained by hydrolyzing a raw material cellulose with sulfuric acid, and subjecting the hydrolyzed mixture to a ultrasonic treatment, but the cellulose nanowhiskers by themselves have some disadvantages in dispersibility in an organic solvent such as an alcohol or a non-aqueous solvent. Therefore, in order to prepare a dispersion, in the Non-Patent Publications 1 to 3, the cellulose nanowhiskers are treated with an anionic surfactant such as a phenyl group-containing phosphoric ester to modify (to hydrophobically treat) surfaces thereof, thereby making it possible to stably disperse the cellulose nanowhiskers in an organic solvent.

In addition, the present applicant previously reports that a composite material having high elastic modulus, tensile strength, and transparency is obtained by using cellulose fibers having an average fiber diameter of 200 nm or less and a carboxyl group content of from 0.1 to 2 mmol/g as fine cellulose fibers having a nanosize fiber diameter, and mixing a polylactic acid with the cellulose fibers, cf. Patent Publication 1. The fine cellulose fibers are obtained by subjecting natural cellulose fibers such as wood pulp to an oxidation treatment in the presence of a 2,2,6,6-tetramethyl-1-piperidinyl-N-oxyl (TEMPO) catalyst, and subjecting the resulting dispersion of an oxidized product to a disintegration treatment with a mixer or the like to form microfibrils, and the fine cellulose fibers have even finer fiber diameters than the fibers conventionally called nanofibers.

Further, since the above-mentioned fine cellulose fibers do not have sufficient dispersion stability in an organic solvent or a resin, the present applicant prepares a fine cellulose fiber composite by adsorbing a surfactant containing a cationic surfactant such as a primary to tertiary amine compound, or a quaternary ammonium compound to the fine cellulose fibers. Since the fine cellulose fiber composite has excellent dispersion stability in an organic solvent or a resin, it is suitable for forming composites with a plastic material such as a polylactic acid, thereby making it possible to provide an environmental-friendly composite material having both high mechanical strength and transparency, cf. Patent Publication 2.

On the other hand, Non-Patent Publication 4 discloses that fine cellulose fibers obtained by an oxidation treatment in the presence of TEMPO catalyst are surface-treated with octadecylamine (ODA) to provide a hydrophobically treated derivative. The binding amount of ODA of the derivative is calculated as 1.58 mmol/g, from the measurement results of conductometric titration. In addition, Non-Patent Publication 5 discloses a derivative obtained by subjecting the fine cellulose fibers obtained by the same TEMPO treatment as above, to a treatment with hexylamine ($C_6$) or dodecylamine ($C_{12}$). The binding amount thereof is calculated as 0.18 mmol/g for the $C_6$ derivative, and 0.06 mmol/g for $C_{12}$ derivative, from the measurement results of conductometric titration.

PRIOR ART REFERENCES

Patent Publications

Patent Publication 1: Japanese Patent Laid-Open No. 2011-140632 Patent Publication 2: WO 2011/071156

Non-Patent Publications

Non-Patent Publication 1: L. Heux, et al., *Langmuir*, 16(21), 2000
Non-Patent Publication 2: C. Bonini, et al., *Langmuir*, 18(8), 2002
Non-Patent Publication 3: L. Petersson, et al., *Composites Science and Technology*, 67, 2007
Non-Patent Publication 4: Richard K. Johnson, et al., *Cellulose*, 18, 1599-1609, 2011
Non-Patent Publication 5: Elsa Lasseuguette, *Cellulose*, 15, 571-580, 2008

SUMMARY OF THE INVENTION

The present invention relates to the following [1] to [11]:
[1] a polyester resin composition containing a polyester resin, and a fine cellulose fiber composite having an average fiber diameter of from 0.1 to 200 nm, wherein the fine cellulose fiber composite contains fine cellulose fibers and hydrocarbon groups being connected thereto via an amide bond;
[2] a thermoformed article made of the polyester resin composition as defined in the above [1];
[3] an injection-molded article made of the polyester resin composition as defined in the above [1];
[4] a method for producing a thermoformed article as defined in the above [2], including the following steps (1-1) to (1-3):
step (1-1): melt-kneading raw materials containing a fine cellulose fiber composite having an average fiber diameter of from 0.1 to 200 nm and a polyester resin, wherein the fine cellulose fiber composite contains fine cellulose fibers and hydrocarbon groups being connected thereto via an amide bond, to provide a polyester resin composition;
step (1-2): extrusion-molding or press-molding the polyester resin composition obtained in the step (1-1), to provide a sheet; and
step (1-3): thermoforming the sheet obtained in the step (1-2), to provide a thermoformed article;
[5] a method for producing an injection-molded article as defined in the above [3], including the following steps (2-1) to (2-2):
step (2-1): melt-kneading raw materials containing a fine cellulose fiber composite having an average fiber diameter of from 0.1 to 200 nm and a polyester resin, wherein the fine cellulose fiber composite contains fine cellulose fibers and hydrocarbon groups being connected thereto via an amide bond, to provide a polyester resin composition; and step (2-2): injection-molding the polyester resin composition obtained in the step (2-1) in a die;

[6] a fine cellulose fiber composite having an average fiber diameter of from 0.1 to 200 nm, wherein the fine cellulose fiber composite contains fine cellulose fibers and hydrocarbon groups having from 1 to 16 carbon atoms being connected thereto via an amide bond in an average binding amount of 0.3 mmol/g or more;

[7] a method for producing a fine cellulose fiber composite as defined in the above [6], including the following steps (1a) and (1b):

step (1a): oxidizing natural cellulose fibers in the presence of an N-oxyl compound, to provide carboxy group-containing cellulose fibers; and step (1b): reacting the carboxy group-containing cellulose fibers obtained in the step (1a) and primary or secondary amines having hydrocarbon groups having from 1 to 16 carbon atoms;

[8] a method for producing a fine cellulose fiber composite as defined in the above [6], including the following step (2a):

step (2a): reacting the carboxy group-containing cellulose fibers and primary or secondary amines having hydrocarbon groups having from 1 to 16 carbon atoms;

[9] use of a polyester resin composition as defined in the above [1] in the manufacture of automobile parts;

[10] use of a polyester resin composition as defined in the above [1] in the manufacture of (1) blister packs or trays for manufactured articles selected from daily sundries, cosmetics, and household electric appliances, (2) food containers, or (3) industrial trays usable in transportation or protection of industrial parts;

[11] use of a polyester resin composition as defined in the above [1] in the manufacture of cases or parts for the manufactured articles selected from intelligent household electric appliances, daily sundries, stationeries, and cosmetics.

BRIEF DESCRIPTION OF THE DRAWINGS

FIG. 1 shows a die used when a thermoformed article of Examples is prepared.

DETAILED DESCRIPTION OF THE INVENTION

In the recent years, bio-mass manufactured articles are expected to be used in even a wider range of applications such as daily sundries, household electric appliance parts, and automobile parts, and further bio-mass manufactured articles having excellent mechanical strength while having excellent transparency are in demand.

As a result of intensive studies, the present inventors have found that a polyester resin is blended with a composite in which the fine cellulose fibers are connected to hydrocarbon groups via an amide bond as described in Patent Publication 1, whereby a resin composition having excellent transparency, and having excellent thermal stability, e.g. inhibiting coloration during kneading and molding at high temperatures, and the like, in addition to mechanical strength is obtained. In addition, they have found that a thermoformed article made of the resin composition has excellent transparency and heat resistance, and an injection-molded article made of the resin composition has excellent mechanical strength and heat resistance.

The present invention relates to a polyester resin composition having excellent transparency, excellent mechanical strength, and being environmental-friendly, a molded article made of the polyester resin composition, and a method for producing the molded article. In addition, the present invention relates to a composite material of cellulose fibers blended with the polyester resin composition, and a method for producing the composite material.

The polyester resin composition of the present invention exhibits some excellent effects such as excellent transparency, practically sufficient mechanical strength, and excellent thermal stability. Further, the thermoformed article made of the resin composition exhibits some excellent effects of having excellent transparency and heat resistant, and the injection-molded article made of the resin composition exhibits some excellent effects of having excellent mechanical strength and heat resistance.

The polyester resin composition of the present invention contains a polyester resin and a fine cellulose fiber composite having an average fiber diameter of from 0.1 to 200 nm, characterized in that the fine cellulose fiber composite contains fine cellulose fibers and hydrocarbon groups being connected to the surface thereof via an amide bond. The phrase "hydrocarbon groups . . . via an amide bond" as used herein means a state that carbon atoms of amide groups are bound to a cellulose surface, so that the hydrocarbon groups are bound to nitrogen atoms with a covalent bonding.

In general, in biosynthesis of natural cellulose, nanofibers called microfibrils are firstly formed, and these nanofibers are multi-bundled, thereby constructing a higher order solid structure. The fine cellulose fibers usable in the present invention are obtained by utilizing this construction in principle, as described later. In order to weaken the firm hydrogen bonds between the surfaces which bring about strong aggregation between the microfibrils in the cellulose solid raw material derived from nature, a part of the fine cellulose fibers is oxidized, and converted to carboxy groups. Accordingly, the larger the amount of carboxy groups existing on the cellulose surface, i.e. the carboxy group content, the fine cellulose fibers can stably exist in an even finer fiber diameter, and the aggregation of microfibrils is inhibited in water due to electric repulsions, thereby even more increasing dispersion stability of the nanofibers. However, hydrophilic carboxy groups exist on the surface of the above-mentioned fine cellulose fibers, so that the fine cellulose fibers do not have sufficient dispersion stability in a hydrophobic organic solvent or a resin. In view of the above, as a result of intensive studies in order that the above-mentioned fine cellulose fibers stably disperse in an organic solvent or a resin while having a fine fiber diameter, it has been surprisingly found that carboxy groups on the surface are substituted with amide groups having hydrocarbon groups, thereby making dispersibility of the fine cellulose fibers obtained after the surface treatment, also referred to as a fine cellulose fiber composite or surface-modified fine cellulose fibers, in an organic solvent or a resin more excellent; therefore, when the fine cellulose fibers are blended with the resin, a resin composition having excellent transparency, excellent mechanical strength, and further excellent heat resistance is obtained. In addition, it has been found that when the resin composition having the above properties is molded or formed into an injection-molded article, a thermoformed article or the like, the formed article or molded article is found to have the above-mentioned properties. Although the detailed reasons therefor are unknown, the reasons are deduced as follows. The surface of the fine cellulose fibers is substituted with amide groups having hydrocarbon groups, so that the surface of the fine cellulose fibers become hydrophobic, thereby improving dispersibility in the resin. Here, the term "mechanical strength" as used herein means properties that are evaluated by "tensile modulus" and "flexural strength" described later. In addition, the term "heat-resistance" as used herein means the properties that are evaluated by "deflection temperature under load" and "storage modulus."

[Polyester Resin Composition]
[Polyester Resin]

The polyester resin is not particularly limited so long as the polyester resin is known in the art, those having biodegradability are preferred, and biodegradable polyester resins are preferred. Specific examples include aliphatic polyester resins such as polyhydroxy butyrate, polycaprolactone, polybutylene succinate, polybutylene succinate/adipate, polyethylene succinate, polyethylene terephthalate, polylactic acid resin, polymalic acid, polyglycolic acid, polydioxanone, and poly(2-oxetanone); aliphatic aromatic co-polyester resins such as polybutylene succinate/terephthalate, polybutylene adipate/terephthalate, and polytetramethylene adipate/terephthalate; mixtures of a natural polymer such as starch, cellulose, chitin, chitosan, gluten, gelatin, zain, soybean protein, collagen, or keratin, and the aliphatic polyester resins or the aliphatic aromatic co-polyester resins mentioned above; and the like. Among them, the polybutylene succinate and the polylactic acid resin are preferred, and the polylactic acid resin is more preferred, from the viewpoint of excellent workability, economic advantages, availability, and physical properties. Here, the term "biodegradable or biodegradability" as used herein refers to a property which is capable of being degraded to low molecular compounds by microorganisms in nature. Specifically, the term means biodegradability based on "test on aerobic and ultimate biodegradation degree and disintegration degree under controlled aerobic compost conditions" of JIS K6953, ISO 14855.

The polylactic acid resin includes commercially available polylactic acid resins, for example, LACEA H-100, H-280, H-400, H-440, etc. manufactured by Mitsui Chemicals, Inc., Nature Works PLA/NW3001D and NW4032D manufactured by Nature Works LLC, and Ecoplastic U'z S-09, S-12, S-17, etc. manufactured by TOYOTA MOTOR CORPORATION; and polylactic acids synthesized from lactic acid and lactides. A polylactic acid resin having an optical purity of 90% or more is preferred, from the viewpoint of improving strength and heat resistance, and, for example, a polylactic acid resin such as NW4032D, manufactured by Nature Works LLC having a relative large molecular weight and a high optical purity is preferred.

In addition, in the present invention, as the polylactic acid, a stereocomplex polylactic acid, composed of two kinds of polylactic acids, each obtained from a lactic acid component containing an isomer different from one another as a main component, may be used, from the viewpoint of satisfying both strength and flexibility of the polylactic acid resin composition, and improving heat resistance and transparency.

One polylactic acid constituting the stereocomplex polylactic acid [hereinafter referred to as "polylactic acid (A)"] contains L-form in an amount of from 90 to 100% by mol, and other component including D-form in an amount of from 0 to 10% by mol. The other polylactic acid [hereinafter referred to as "polylactic acid (B)"] contains D-form in an amount of from 90 to 100% by mol, and other component including L-form in an amount of from 0 to 10% by mol. Other components besides the L-form and the D-form include dicarboxylic acids, polyhydric alcohols, hydroxycarboxylic acids, lactone, and the like, each having a functional group capable of forming two or more ester bonds. Also, other components may be a polyester, a polyether, a polycarbonate, or the like, each having two or more unreacted functional groups mentioned above in the molecule.

The polylactic acid (A) and the polylactic acid (B) in the stereocomplex polylactic acid are in a weight ratio, i.e. polylactic acid (A)/polylactic acid (B), of preferably from 10/90 to 90/10, more preferably from 20/80 to 80/20, and even more preferably from 40/60 to 60/40.

In addition, the polylactic acid resin in the present invention may be contained as a polymer alloy formed by a blend of the polylactic acid resin with biodegradable polyester resins other than the polylactic acid resins, or with non-biodegradable resins such as polypropylene.

The content of the polylactic acid resin is preferably 80% by weight or more, more preferably 90% by weight or more, and even more preferably substantially 100% by weight, of the polyester resin.

In addition, the content of the polyester resin is, but not particularly limited to, preferably 50% by weight or more, more preferably 60% by weight or more, and even more preferably 70% by weight or more, of the polyester resin composition.

[Fine Cellulose Fiber Composite]

One feature of the fine cellulose fiber composite usable in the present invention is in that the fine cellulose fiber composite contains fine cellulose fibers and hydrocarbon groups being connected thereto via an amide bond. Here, the fine cellulose fiber composite may be hereinafter described as a fine cellulose fiber composite A.

<Fine Cellulose Fibers>
(Average Fiber Diameter)

The average fiber diameter of the fine cellulose fibers constituting the fine cellulose fiber composite A usable in the present invention is preferably 0.1 nm or more, more preferably 0.2 nm or more, even more preferably 0.5 nm or more, even more preferably 0.8 nm or more, and still even more preferably 1 nm or more, from the viewpoint of producing a fine cellulose fiber composite having an even fiber diameter. In addition, the average fiber diameter is preferably 200 nm or less, more preferably 100 nm or less, even more preferably 50 nm or less, even more preferably 20 nm or less, and still even more preferably 10 nm or less, from the viewpoint of sufficiently improving mechanical strength when contained in the above-mentioned polyester resin to provide a polyester resin composition, which is also referred to as a composite material. In addition, the average fiber diameter is preferably from 0.1 to 200 nm, more preferably from 0.2 to 100 nm, even more preferably from 0.5 to 50 nm, even more preferably from 0.8 to 20 nm, and still even more preferably from 1 to 10 nm, from the viewpoint of improving mechanical strength of the composite material obtainable by including the fine cellulose fiber composite having an even fiber diameter in the resin. When the average fiber diameter is 0.1 nm or more, the even sizing of the fiber diameters is facilitated, and when the average fiber diameter is 200 nm or less, the effects of improving mechanical strength when blending with the polyester resin are excellent. Here, the average fiber diameter of the cellulose fibers as used herein can be measured with an atomic force microscope (AFM), and the average fiber diameter is specifically measured in accordance with the method described in Examples described later. In general, the least unit of the cellulose nanofibers prepared from higher plants is such that 6×6 molecular chains are packed in the form of nearly a square, so that a height analyzed by AFM images can be assumed to be a width of fibers.

(Carboxy Group Content)

The carboxy group content of the fine cellulose fibers is an important element in stably obtaining cellulose fibers having a fine fiber diameter of an average fiber diameter of from 1 to 200 nm. In the present invention, the above-mentioned carboxy group content is preferably 0.1 mmol/g or more, more preferably 0.4 mmol/g or more, and even more preferably 0.6 mmol/g or more, from the viewpoint of stable fine pulverization. In addition, the carboxy group content is preferably 3 mmol/g or less, more preferably 2 mmol/g or less, and even more preferably 1.8 mmol/g or less, from the viewpoint of improvement in handleability. In addition, the carboxy group content is preferably from 0.1 to 3 mmol/g, more preferably from 0.1 to 2 mmol/g, even more preferably from 0.4 to 2 mmol/g, and still even more preferably from 0.6 to 1.8 mmol/g, from the viewpoint of stable fine pulverization and improvement in handleability. The fine cellulose fibers usable in the present invention may unintentionally contain fine cellulose fibers of which carboxy group content is outside the above range as impurity. Here, the term "carboxy group content" means a total amount of carboxy groups in the cellulose constituting the fine cellulose fibers, and the carboxy group content is specifically measured in accordance with the method described in Examples set forth below.

(Average Aspect Ratio)

The average aspect ratio, i.e. fiber length/fiber diameter, of the fine cellulose fibers is preferably 10 or more, more preferably 20 or more, even more preferably 50 or more, and still even more preferably 100 or more, from the viewpoint of sufficiently improving the mechanical strength when including the fine cellulose fibers in the above-mentioned polyester resin to provide a composite material. In addition, the average aspect ratio is preferably 1,000 or less, more preferably 500 or less, even more preferably 400 or less, and still even more preferably 350 or less, from the viewpoint of suppressing the lowering of mechanical strength accompanying the lowering of dispersibility in the polyester resin. In addition, the average aspect ratio is preferably from 10 to 1,000, more preferably from 20 to 500, even more preferably from 50 to 400, and still even more preferably from 100 to 350. The fine cellulose fibers having an average aspect ratio within the above-mentioned range have excellent dispersibility in the resin when blended with the polyester resin, and have high mechanical strength, so that a resin composition which is less likely to undergo brittle fracture is obtained. Here, the average aspect ratio as used herein is obtained by an inverse calculation in accordance with the following formula (1) to provide an aspect ratio of the cellulose fibers, based on the relationship between a cellulose fiber concentration in the dispersion and a specific viscosity of the dispersion to water. Here, the following formula (1) is derived from the viscosity formula for rigid rod-shaped molecules (8.138) described in *The Theory of Polymer Dynamics*, M. DOI and D. F. EDWARDS, CLARENDON PRESS, OXFORD, 1986, page 312, and the relational formula $Lb^2 \times \rho = M/N_A$, wherein L is a fiber length, b is a fiber width, assuming that a cross section of the cellulose fibers is a square, $\rho$ is a concentration of the cellulose fibers (kg/m$^3$), M is a molecular weight, and $N_A$ is an Avogadro number. In addition, in the above-mentioned viscosity formula (8.138), it is assumed that a rigid rod-shaped molecule is cellulose fibers. In the following formula (1), $\eta_{SP}$ is a specific viscosity, $\pi$ is a ratio of the circumference of a circle to its diameter, ln is a natural logarithm, P is an aspect ratio L/b, $\gamma=0.8$, $\rho_S$ is a density of the dispersion medium, kg/m$^3$, $\rho_0$ is a density of the cellulose crystals, kg/m$^3$, and C is a mass concentration of the cellulose, $C=\rho/\rho_S$.

$$\eta_{sp} = \frac{2\pi P^2}{45(\ln P - \gamma)} \times \frac{\rho_s}{\rho_0} \times C \quad (1)$$

(Crystallinity)

The crystallinity of the fine cellulose fibers is preferably 30% or more, more preferably 35% or more, even more preferably 40% or more, and still even more preferably 45% or more, from the viewpoint of improving mechanical strength when the fine cellulose fibers are contained in the above-mentioned polyester resin to provide a composite material. In addition, the crystallinity is preferably 95% or less, more preferably 90% or less, even more preferably 85% or less, and still even more preferably 80% or less, from the viewpoint of improving reaction efficiency of the amidation reaction. Also, the crystallinity is preferably from 30 to 95%, more preferably from 35 to 90%, even more preferably from 40 to 85%, and still even more preferably from 45 to 80%, from the viewpoint of improving mechanical strength of the polyester resin composition and reaction efficiency of the amidation reaction. The crystallinity of the cellulose as used herein is a cellulose I crystallinity calculated according to Segal method from diffraction intensity values according to X-ray diffraction method, which is defined by the following calculation formula (A):

Cellulose *I* Crystallinity (%)=[(*I*22.6−*I*18.5)/*I*22.6]× 100     (A)

wherein I22.6 is a diffraction intensity of a lattice face (face 002)(angle of diffraction 2θ=22.6°), and I18.5 is a diffraction intensity of an amorphous portion (angle of diffraction 2θ=18.5°), in X-ray diffraction. Here, cellulose I is a crystalline form of a natural cellulose, and the cellulose I crystallinity means a proportion of the amount of crystalline region that occupies the entire cellulose.

<Hydrocarbon Group>

The fine cellulose fiber composite in the present invention contains fine cellulose fibers mentioned above and hydrocarbon groups being connected thereto via an amide bond. The fine cellulose fibers are surface-modified with hydrocarbon groups, in other words, carboxy groups already existing on the surface of the fine cellulose fibers are selected and substituted with amide groups having hydrocarbon groups, so that when blended with the polyester resin, dispersibility in the resin becomes excellent, whereby mechanical strength and heat resistance can be improved while maintaining transparency inherently owned by the polyester resin composition obtained. In addition, since the amide bond mediates when the hydrocarbon groups are introduced, heat resistance of the fine cellulose fibers is improved, thereby making it possible to sufficiently endure kneading at high temperatures, and that dispersibility in the resin is improved, so that mechanical strength and heat resistance of the polyester resin composition are improved, whereby consequently improving mechanical strength and heat resistance of the molded article made of the polyester resin composition.

The above-mentioned hydrocarbon groups may be any one of saturated hydrocarbon groups and unsaturated hydrocarbon groups, and the saturated hydrocarbon groups are preferred, from the viewpoint of inhibiting side reactions and from the viewpoint of stability. In addition, it is preferable that the hydrocarbon groups are linear or branched hydrocarbon groups. The number of carbon atoms of the hydrocarbon groups is preferably 1 or more, more preferably 2 or more, and even more preferably 3 or more, from the viewpoint of handleability. In addition, the number of carbon atoms is preferably 30 or less, more preferably 18 or less, even more preferably 12 or less, and still even more preferably 8 or less, from the viewpoint of easy availability. In addition, the number of carbon atoms of the hydrocarbon groups is preferably from 1 to 30, more preferably from 2 to 18, even more preferably from 2 to 12, and still even more preferably from 3 to 8. Specifically, the preferred hydrocarbon groups include a hydrocarbon group having 1 carbon atom, or saturated or unsaturated, linear or branched hydrocarbon groups having the number of carbon atoms of preferably from 2 to 30, more preferably from 2 to 18, even more preferably from 2 to 12, and still even more preferably from 3 to 8.

Specific examples of the hydrocarbon groups include, for example, a methyl group, an ethyl group, a propyl group, an isopropyl group, a butyl group, an isobutyl group, a pentyl group, a hexyl group, a heptyl group, an octyl group, a 2-ethylhexyl group, a decyl group, a dodecyl group, a tridecyl group, a tetradecyl group, an octadecyl group, and the like. Each of these hydrocarbon groups may be connected via an amide bond in any proportions, alone or in a combination of two or more kinds.

The average binding amount of the hydrocarbon groups in the fine cellulose fiber composite is preferably 0.001 mmol/g or more, more preferably 0.005 mmol/g or more, and even more preferably 0.01 mmol/g or more, based on the above-mentioned fine cellulose fibers, from the viewpoint of easy control of the binding amount of the hydrocarbon groups. In addition, the average binding amount of the hydrocarbon groups is preferably 3 mmol/g or less, more preferably 2 mmol/g or less, and even more preferably 1 mmol/g or less, from the viewpoint of reactivity when the hydrocarbon groups are connected via amide groups. Also, the average binding amount of the hydrocarbon groups is preferably from 0.001 to 3 mmol/g, more preferably from 0.005 to 2 mmol/g, and even more preferably from 0.01 to 1 mmol/g.

In addition, the introductory rate of the hydrocarbon groups is preferably from 1 to 100%, more preferably from 3 to 95%, and even more preferably from 5 to 95%, from the viewpoint of mechanical strength of the resulting polyester resin composition. In the present invention, the average binding amount (mmol/g) and the introductory rate (%) of the hydrocarbon groups are specifically obtained in accordance with the methods described in Examples set forth below.

<Method for Producing Fine Cellulose Fiber Composite>

The fine cellulose fiber composite A can be obtained in accordance with a known method without particular limitations, so long as hydrocarbon groups can be introduced via amide groups to the fine cellulose fibers. For example, a reaction of introducing hydrocarbon groups to previously prepared fine cellulose fibers via amide groups may be carried out, or a reaction of, subsequent to the preparation of the fine cellulose fibers, introducing hydrocarbon groups via amide groups may be continuously carried out. Here, the fine cellulose fibers can be produced in accordance with a known method, for example, a method described in Japanese Patent Laid-Open No. 2011-140632.

A preferred production method includes, for example, a method including the following steps (A) and (B):

step (A): oxidizing natural cellulose fibers in the presence of an N-oxyl compound, to provide carboxy group-containing cellulose fibers; and step (B): reacting the carboxy group-containing cellulose fibers and primary or secondary amines having hydrocarbon groups.

Here, the above-mentioned preferred production method includes a method including, subsequent to the step (A), carrying out a finely pulverizing step to provide carboxy group-containing fine cellulose fibers, and thereafter carrying out the step (B) (a first production embodiment); and a method including, subsequent to the step (A), carrying out the step (B), and thereafter carrying out a finely pulverizing step (second production embodiment).

The method for producing a fine cellulose fiber composite will be explained hereinbelow based on the above-mentioned "first production embodiment."

<Step (A)>

The step (A) is a step of oxidizing natural cellulose fibers in the presence of an N-oxyl compound, to provide carboxy group-containing cellulose fibers.

In the step (A), first, a slurry of natural cellulose fibers dispersed in water is prepared. The slurry is obtained by adding water in an amount of about 10 to about 1000 times the amount on mass basis based on the raw material natural cellulose fibers (on absolute dry basis: the mass of natural cellulose fibers after subjection to thermal drying at 150° C. for 30 minutes), and treating the mixture with a mixer or the like. The natural cellulose fibers include, for example, wooden pulp such as pulp from needle-leaf trees and pulp from broad-leaf trees; cotton pulp such as cotton linter and cotton lint; non-wooden pulp such as maize straw pulp and bagasse pulp; bacteria cellulose; and the like. These natural cellulose fibers can be used alone or in a combination of two or more kinds. The natural cellulose fibers may be subjected to a treatment of increasing surface areas such as treatment with a beater. In addition, the cellulose I crystallinity of the above-mentioned commercially available pulp is usually 80% or more.

(Oxidation Treatment Step)

Next, the above-mentioned natural cellulose fibers are subjected to an oxidation treatment in the presence of an N-oxyl compound to provide carboxy group-containing cellulose fibers, which may be hereinafter simply referred to as "oxidation treatment."

As the N-oxyl compound, one or more heterocyclic N-oxyl compounds selected from piperidinyloxyl compounds, pyrrolidinyloxyl compounds, imidazolinyloxyl compounds, and azaadamantane compounds having an alkyl group having 1 or 2 carbon atoms are preferred. Among them the piperidinyloxyl compounds having an alkyl group having 1 or 2 carbon atoms are preferred, from the viewpoint of reactivity, which includes di-tert-alkylnitroxyl compounds such as a 2,2,6,6-tetraalkylpiperidinyl-1-oxyl (TEMPO), a 4-hydroxy-2,2,6,6-tetraalkylpiperidinyl-1-oxyl, a 4-alkoxy-2,2,6,6-tetraalkylpiperidinyl-1-oxyl, a 4-benzoyloxy-2,2,6,6-tetraalkylpiperidinyl-1-oxyl, a 4-amino-2,2,6,6-tetraalkylpiperidinyl-1-oxyl; a 4-acetamide-TEMPO, a 4-carboxy-TEMPO, a 4-phosphonoxy-TEMPO, and the like. Among these piperidinoxy compounds, a 2,2,6,6-tetramethylpiperidinyl-1-oxyl (TEMPO), a 4-hydroxy-2,2,6,6-tetramethylpiperidinyl-1-oxyl, and a 4-methoxy-2,2,6,6-tetramethylpiperidinyl-1-oxyl are more preferred, and a 2,2,6,6-tetramethylpiperidinyl-1-oxyl (TEMPO) is even more preferred.

The amount of the N-oxyl compound may be a catalytic amount, and the amount is preferably from 0.001 to 10% by mass, more preferably from 0.01 to 9% by mass, even more preferably from 0.1 to 8% by mass, and still even more preferably from 0.5 to 5% by mass, based on the natural cellulose fibers, on absolute dry basis.

In the oxidation treatment of the natural cellulose fibers, an oxidizing agent can be used. The oxidizing agent includes oxygen or the air, peroxides, halogens, hypohalous acids, halous acids, perhalo acid, and alkali metal salts or alkaline earth metal salts thereof, halogen oxides, nitrogen oxide, and the like, from the viewpoint of solubility, reaction rate or the like when a solvent is adjusted to an alkaline region. Among them, an alkali metal hypohalite is preferred, which is specifically exemplified by sodium hypochlorite and sodium hypobromite. The amount of the oxidizing agent used may be selected in accordance with the carboxy group substitution degree (oxidation degree) of the natural cellulose fibers, and the amount of the oxidizing agent used is not unconditionally determined because the yields of the oxidation reaction differ depending upon the reaction conditions. The amount is within the range of from about 1 to about 100% by mass, based on the raw material natural cellulose fibers, on absolute dry basis.

In addition, in order to even more efficiently carry out the oxidation reaction, a bromide such as sodium bromide or potassium bromide, or an iodide such as sodium iodide or potassium iodide can be used as a promoter. The amount of the promoter may be an effective amount that can exhibit its function, without particular limitations.

The reaction temperature in the oxidation treatment is preferably 50° C. or lower, more preferably 40° C. or lower, and even more preferably 20° C. or lower, from the viewpoint of selectivity of the reaction and suppression of side reaction, and the lower limit of the reaction temperature is preferably −5° C. or higher.

In addition, it is preferable that a pH of the reaction system matches with the property of the oxidizing agent; for example, when sodium hypochlorite is used as an oxidizing agent, a pH of the reaction system is preferably on an alkaline side, preferably a pH of from 7 to 13, and more preferably a pH of from 10 to 13. Also, it is desired that a reaction time is from 1 to 240 minutes.

By carrying out the above-mentioned oxidation treatment, carboxy group-containing cellulose fibers having a carboxy group content within the range of preferably from 0.1 to 3 mmol/g are obtained.

(Purifying Step)

The carboxy group-containing cellulose fibers obtainable by the above-mentioned oxidation reaction contain an N-oxyl compound such as TEMPO used as a catalyst, or a by-product salt. The carboxy group-containing cellulose fibers may be subjected to the subsequent steps without any treatments, or the cellulose fibers are subjected to purification, whereby carboxy group-containing cellulose fibers having a high purity can be obtained. As a purification method, an optimal method can be employed according to the kinds of the solvents in the oxidation reaction, the degree of oxidation of the product, and the degree of purification. For example, the purification method includes re-precipitation with a well dissolvable solvent water and a hardly dissolvable solvent such as methanol, ethanol, or acetone, extraction of TEMPO or the like to a solvent that allows phase separation with water, such as hexane, and other purifications such as ion-exchange of salts and dialysis.

(Finely Pulverizing Step)

In a first production embodiment, after the above-mentioned purifying step, a step of finely pulverizing the carboxy group-containing cellulose fibers obtained in the step (A) is carried out. In the finely pulverizing step, it is preferable that the carboxy group-containing cellulose fibers obtained through the above-mentioned purifying step are dispersed in a solvent, and subjecting to a finely pulverizing treatment. By carrying out this finely pulverizing step, fine cellulose fibers having an average fiber diameter and an average aspect ratio respectively within the ranges mentioned above are obtained.

The solvent used as a dispersion medium is exemplified by water, an alcohol having from 1 to 6 carbon atoms, and preferably from 1 to 3 carbon atoms, such as methanol, ethanol, or propanol, a ketone having from 3 to 6 carbon atoms, such as acetone, methyl ethyl ketone or methyl isobutyl ketone, a linear or branched saturated hydrocarbon or unsaturated hydrocarbon having from 1 to 6 carbon atoms, an aromatic hydrocarbon such as benzene or toluene, a halogenated hydrocarbon such as methylene chloride or chloroform, a lower alkyl ether having from 2 to 5 carbon atoms, a polar solvent such as N,N-dimethylformamide, N,N-dimethylacetamide, dimethyl sulfoxide, and methyl triglycol succinate diester, and the like. These solvents can be used alone or in a mixture of two or more kinds. The solvent is preferably water, an alcohol having from 1 to 6 carbon atoms, a ketone having from 3 to 6 carbon atoms, a lower alkyl ether having from 2 to 5 carbon atoms, or a polar solvent such as N,N-dimethylformamide, N,N-dimethylacetamide, dimethyl sulfoxide, or methyl triglycol succinate diester, from the viewpoint of operability of the finely pulverizing treatment, and more preferably water, from the viewpoint of environmental friendliness. The amount of the solvent used may be an effective amount that can disperse the carboxy group-containing cellulose fibers, without particular limitations. The solvent is used in an amount of preferably from 1.0 to 500 times the weight, and more preferably from 2.0 to 100 times the weight, based on the carboxy group-containing cellulose fibers.

In addition, as an apparatus to be used in the finely pulverizing treatment, a known dispersing machine is suitably used. For example, disintegrator, a beating machine, a low-pressure homogenizer, a high-pressure homogenizer, a grinder, a cutter mill, a ball-mill, a jet mill, a short shaft extruder, a twin-screw extruder, an ultrasonic agitator, a juice mixer for households, or the like can be used. In addition, the solid content concentration of the reaction product fibers in the finely pulverizing treatment is preferably 50% by mass or less.

The form of the carboxy group-containing fine cellulose fibers obtainable after the finely pulverizing step can be, as occasion demands, in the form of a suspension of which solid content concentration is adjusted, e.g. visually colorless transparent or opaque liquid, or in the form of powder subjected to a drying treatment, provided that it is intended to mean that the fine cellulose fibers are in the form of an aggregated powder, not cellulose particles. Here, when provided in the form of a suspension, as a dispersion medium, water alone may be used, or a mixed solvent of water with other organic solvent, e.g. an alcohol such as ethanol, a surfactant, an acid, or a base may be used.

By subjecting the natural cellulose fibers to the oxidation treatment and the finely pulverizing treatment as described above, hydroxyl groups at a C6-position of the cellulose constituting unit are selectively oxidized to carboxy groups via aldehyde groups, and cellulose fibers having a crystallinity of preferably 30% or more, and being finely pulverized to an average fiber diameter of from 0.1 to 200 nm, and composed of cellulose having the above-mentioned carboxy group content of preferably from 0.1 to 3 mmol/g can be obtained. The above-mentioned fine cellulose fibers have a cellulose I crystal structure. This means that the fine cellulose fibers used in the present invention are fibers prepared by subjecting cellulose solid raw materials derived from nature having a cellulose I crystal structure to surface oxidation and finely pulverized treatment. Here, in the step (A), after the oxidation treatment of the natural cellulose fibers, further an acid, e.g. hydrochloric acid, is reacted, so that a carboxy group content can be adjusted, and the reaction may be carried out before the finely pulverized treatment or after the finely pulverized treatment.

<Step (B)>

In the first production embodiment, the step (B) is a step of reacting the carboxy group-containing cellulose fibers obtained through the above-mentioned finely pulverizing step and primary or secondary amines having hydrocarbon groups to provide a fine cellulose fiber composite. Specifically, carboxy groups contained in the carboxy group-containing fine cellulose fibers and amino groups of the primary or secondary amines having hydrocarbon groups are subjected to a condensation reaction to form an amide bond, to provide a fine cellulose fiber composite in which hydrocarbon groups are connected via an amide bond.

As the primary or secondary amines having hydrocarbon groups usable in the step (B), primary or secondary amines having hydrocarbon groups, the hydrocarbon groups being the same as the hydrocarbon groups mentioned above in the fine cellulose fiber composite can be used.

As the above-mentioned primary amines, primary amines having from 1 to 18 carbon atoms can be used. Specific examples include methylamine, ethylamine, propylamine, butylamine, pentylamine, hexylamine, heptylamine, octylamine, 2-ethylhexylamine, decylamine, dodecylamine, tridecylamine, tetradecylamine, octadecylamine, and the like. The primary amines having from 1 to 12 carbon atoms are preferred, from the viewpoint of transparency and mechanical strength of the resulting resin composition, specifically including methylamine, ethylamine, propylamine, butylamine, pentylamine, hexylamine, heptylamine, octylamine, 2-ethylhexylamine, decylamine, and dodecylamine. The primary amines having from 1 to 8 carbon atoms are more preferred, specifically including methylamine, ethylamine, propylamine, butylamine, pentylamine, hexylamine, heptylamine, and octylamine. The primary amines having from 1 to 6 carbon atoms are even more preferred, specifically including methylamine, ethylamine, propylamine, butylamine, pentylamine, and hexylamine.

The above-mentioned secondary amines include dimethylamine, diethylamine, diisopropylamine, dioctylamine, didecylamine, didodecylamine, ditetradecylamine, dioctadecylamine, and the like.

The above-mentioned primary or secondary amines having hydrocarbon groups can be used alone or in a combination of two or more kinds. Among them, primary amines having linear or branched hydrocarbon groups having preferably from 1 to 18 carbon atoms, more preferably from 1 to 12 carbon atoms, even more preferably from 1 to 8 carbon atoms, and even more preferably from 1 to 6 carbon atoms, are preferred, from the viewpoint of reactivity with a carboxy group.

The amount of the above-mentioned amine used is preferably from 0.01 to 50 mol, more preferably from 0.05 to 40 mol, and even more preferably from 0.1 to 20 mol, per one mol of the carboxy groups contained in the carboxy group-containing fine cellulose fibers, from the viewpoint of reactivity. If the amount of the above amine is 0.1 mol or more, reactivity with carboxy groups is excellent and reaction control is facilitated, and if the amount of the above amine is 20 mol or less, it is preferable from the viewpoint of purity of the manufactured article. Here, the amine in an amount to be contained in the above-mentioned range may be added to a reaction at once, or added to a reaction in divided portions.

In the reaction of the above-mentioned carboxy group-containing fine cellulose fibers and the above-mentioned amine, which may be hereinafter referred to as "condensation reaction" or "amide bond formation reaction," a known condensing agent can also be used.

The condensing agent is not particularly limited, and includes condensing agents described on page 116 of *Gosei Kagaku Shirizu Pepuchido Gosei (Synthetic Chemistry Series Peptide Synthesis)*, Maruzen, or described in *Tetrahedron*, 57, 1551 (2001), and the like, including, for example, 4-(4,6-dimethoxy-1,3,5-triazin-2-yl)-4-methylmorpholinium chloride, which may be hereinafter referred to as "DMT-MM," and the like.

In the above-mentioned condensation reaction, the same ones as the solvents in the above-mentioned finely pulverizing step can be used.

The reaction time and the reaction temperature in the above-mentioned condensation reaction can be appropriately selected depending upon the kinds of the amines and the solvents used, and the reaction time is preferably from 1 to 24 hours, from the viewpoint of reaction ratio. Also, the reaction temperature is preferably from 0° to 200° C., from the viewpoint of suppressing the deterioration of the fine cellulose fibers.

After the above-mentioned polycondensation reaction, in order to remove an unreacted amine, an unreacted condensing agent, or the like, a post-treatment may be properly carried out. As the post-treatment method, for example, filtration, centrifugation, dialysis or the like can be used.

In the second production embodiment, the method can be carried out in the same manner as in the first production embodiment, except that each of the steps mentioned above is carried out in the order of the step (A), the step (B), and the finely pulverizing step.

Thus, a fine cellulose fiber composite which is a reaction product of carboxy group-containing cellulose fibers and primary or secondary amines having hydrocarbon groups is obtained. The fine cellulose fiber composite obtained can be used in the state of a dispersion after subjecting to the above-mentioned post-treatment, or alternatively is subjected to a drying treatment or the like to remove the solvents from the dispersion to provide a fine cellulose fiber composite in a dry powdery state, and this powder can be used. Here, the term "powdery state" is a powdery state in which the fine cellulose fiber composites are aggregated, and does not mean cellulose particles.

The fine cellulose fiber composite in a powdery state includes, for example, a dried product obtained by directly drying a dispersion of the above-mentioned fine cellulose fiber composite; a powdered product obtained by a mechanical treatment of the dried product; a powdered product obtained by powdering a dispersion of the above-mentioned fine cellulose fiber composite according to a known spray-drying method; a powdered product obtained by powdering a dispersion of the above-mentioned fine cellulose fiber composite according to a known lyophilization method; and the like. The spray-drying method is a method including spraying the above-mentioned dispersion of a fine cellulose fiber composite in the air, and drying the dispersion.

The carboxy group content of the resulting fine cellulose fiber composite A is preferably 0.10 mmol/g or more, more preferably 0.20 mmol/g or more, and even more preferably 0.30 mmol/g or more, from the viewpoint of tensile modulus and transparency. In addition, the carboxy group content is preferably 3 mmol/g or less, more preferably 2 mmol/g or less, and even more preferably 1.5 mmol/g or less, from the viewpoint of heat resistance, i.e. a less degree of coloration upon molding. In addition, the carboxy group content is preferably from 0.10 to 3 mmol/g, more preferably from 0.20 to 2 mmol/g, and even more preferably from 0.30 to 1.5 mmol/g, from the viewpoint of being excellent in all of tensile modulus, transparency and heat resistance.

In addition, the average fiber diameter of the fine cellulose fiber composite A is preferably 0.1 nm or more, more preferably 0.2 nm or more, even more preferably 0.5 nm or more, even more preferably 0.8 nm or more, and still even more preferably 1 nm or more, from the viewpoint of heat resistance, i.e. a less degree of coloration upon molding. In addition, the average fiber diameter is preferably 200 nm or less, more preferably 100 nm or less, even more preferably 50 nm or less, even more preferably 20 nm or less, and still even more preferably 10 nm or less, from the viewpoint of tensile modulus and transparency. In addition, the average fiber diameter is preferably from 0.1 to 200 nm, more preferably from 0.2 to 100 nm, even more preferably from 0.5 to 50 nm, even more preferably from 0.8 to 20 nm, and still even more preferably from 1 to 10 nm, from the viewpoint of being excellent in all of tensile modulus, transparency, and heat resistance.

Here, since the fine cellulose fiber composite A does not undergo lowering of crystallinity by the reaction of the step (B), it is preferable that the fine cellulose fiber composite has a crystallinity of the same level as the crystallinity of the above-mentioned fine cellulose fibers.

The fine cellulose fiber composite contained in the polyester resin composition of the present invention may be any of those having an average fiber diameter of from 0.1 to 200 nm, in which hydrocarbon groups are connected to the fine cellulose fibers via an amide bond as mentioned above. The present invention also provides the following as a novel fine cellulose fiber composite. Specifically, the present invention provides a fine cellulose fiber composite having an average fiber diameter of from 0.1 to 200 nm, wherein the fine cellulose fiber composite contains fine cellulose fibers and hydrocarbon groups having from 1 to 16 carbon atoms being connected thereto via an amide bond in an average binding amount of 0.3 mmol/g or more, which is hereinafter also referred to as a fine cellulose fiber composite a.

The fine cellulose fibers in the fine cellulose fiber composite a include the same ones as the fine cellulose fibers usable in the above-mentioned fine cellulose fiber composite A.

Also, the hydrocarbon groups in the fine cellulose fiber composite a have from 1 to 16 carbon atoms, and more specifically include a hydrocarbon group having 1 carbon atom, or saturated or unsaturated, linear or branched hydrocarbon groups having from 2 to 16 carbon atoms. Among them, for example, in a case where a film made of the composite is produced, the number of carbon atoms is 16 or less, preferably 14 or less, and more preferably 12 or less, from the viewpoint of obtaining film strength. In addition, the number of carbon atoms is 1 or more, preferably 2 or more, and more preferably 3 or more, from the viewpoint of yellowing resistance and dispersibility in a hydrophobic medium. In addition, the number of carbon atoms of the hydrocarbon groups in the fine cellulose fiber composite a is from 1 to 16, preferably from 2 to 14, and more preferably from 3 to 12.

Specific examples of the hydrocarbon groups include, for example, a methyl group, an ethyl group, a propyl group, an isopropyl group, a butyl group, an isobutyl group, a pentyl group, a hexyl group, a heptyl group, an octyl group, a 2-ethylhexyl group, a decyl group, a dodecyl group, a tridecyl group, a tetradecyl group, a hexadecyl group, and the like. These hydrocarbon groups may be used alone or two or more of them in a given proportion may be connected each via an amide bond.

The binding amount of the hydrocarbon groups in the fine cellulose fiber composite a, in terms of an average binding amount, is 0.3 mmol/g or more, preferably 0.4 mmol/g or more, and more preferably 0.5 mmol/g or more, from the viewpoint of yellowing resistance and dispersibility in a hydrophobic medium. In addition, when a film made of the composite is produced, the binding amount is preferably 3 mmol/g or less, more preferably 2 mmol/g or less, and even more preferably 1 mmol/g or less, from the viewpoint of obtaining a film strength. Also, the average binding amount of the hydrocarbon groups is preferably from 0.3 to 3 mmol/g, more preferably from 0.4 to 2 mmol/g, and even more preferably from 0.5 to 1 mmol/g.

The fine cellulose fiber composite a can be produced in the same manner as in the fine cellulose fiber composite A, except that the hydrocarbon groups to be bound have from 1 to 16 carbon atoms.

Specifically, for example, there is included a method including the steps (1a) and (1b) given hereinbelow:

step (1a): oxidizing natural cellulose fibers in the presence of an N-oxyl compound, to provide carboxy group-containing cellulose fibers; and step (1b): reacting the carboxy group-containing cellulose fibers and primary or secondary amines having hydrocarbon groups having from 1 to 16 carbon atoms.

Here, the above method includes a method including, subsequent to the step (1a), carrying out a finely pulverizing step in the same manner as in the method for producing the fine cellulose fiber composite A, to provide carboxy group-containing fine cellulose fibers, and thereafter carrying out the step (1b) (a first production embodiment); and a method including, subsequent to the step (1a), carrying out the step (1b), and thereafter carrying out a finely pulverizing step (second production embodiment).

The step (1a) can be carried out in the same manner as in the step (A) in the above-mentioned method for producing a fine cellulose fiber composite A. Also, the step (1b) can be carried out in the same manner as in the step (B) in the above-mentioned method for producing a fine cellulose fiber composite A, except that the primary or secondary amines having hydrocarbon groups are specified to primary or secondary amines having from 1 to 16 carbon atoms. Here, the purifying step, the finely pulverizing step and the like can be similarly referred thereto.

In addition, another production method includes a method including the step (2a) given hereinbelow:

step (2a): reacting the carboxy group-containing cellulose fibers and primary or secondary amines having hydrocarbon groups having from 1 to 16 carbon atoms.

Here, the carboxy group-containing cellulose fibers as used herein do not mean a product obtained by subjecting natural cellulose fibers to a treatment in a manner as in the step (1a) in the above-mentioned production method, and are not particularly limited so long as they are cellulose fibers previously containing a carboxy group.

The step (2a) can be carried out in the same manner as in the step (B) in the method for producing the above-mentioned fine cellulose fiber composite A, except that the carboxy group-containing cellulose fibers are not prepared through the step (1a), that cellulose fibers previously containing carboxy groups are used, and that the primary or secondary amines having hydrocarbon groups are specified to primary or secondary amines having hydrocarbon groups having from 1 to 16 carbon atoms. Here, the purifying step, the finely pulverizing step and the like can be similarly referred thereto.

Thus, a fine cellulose fiber composite a, a reaction product of the carboxy group-containing cellulose fibers and the primary or secondary amines having hydrocarbon groups having from 1 to 16 carbon atoms, is obtained.

The carboxy group content in the resulting fine cellulose fiber composite a is preferably 0.01 mmol/g or more, more preferably 0.1 mmol/g or more, and even more preferably 0.2 mmol/g or more, from the viewpoint of tensile modulus. In addition, the carboxy group content is preferably 2.8 mmol/g or less, more preferably 2.0 mmol/g or less, and even more preferably 1.5 mmol/g or less, from the viewpoint of yellowing resistance, i.e. less coloration upon heating. In addition, the carboxy group content is preferably from 0.01 to 2.8 mmol/g, more preferably from 0.1 to 2.0 mmol/g, and even more preferably from 0.2 to 1.5 mmol/g, from the viewpoint of being excellent in both tensile modulus and yellowing resistance.

In addition, in the fine cellulose fiber composite a, the average fiber diameter is preferably 0.1 nm or more, more preferably 0.2 nm or more, even more preferably 0.5 nm or more, even more preferably 0.8 nm or more, and still even more preferably 1 nm or more, from the viewpoint of heat resistance, i.e. less coloration during molding, and film strength. In addition, the average fiber diameter is preferably 200 nm or less, more preferably 100 nm or less, even more preferably 50 nm or less, even more preferably 20 nm or less, and still even more preferably 10 nm or less, from the viewpoint of tensile modulus and transparency. In addition, the average fiber diameter is preferably from 0.1 to 200 nm, more preferably from 0.2 to 100 nm, even more preferably from 0.5 to 50 nm, even more preferably from 0.8 to 20 nm, and still even more preferably from 1 to 10 nm, from the viewpoint of being excellent in all of tensile modulus, transparency, and yellowing resistance.

The content of the fine cellulose fiber composite A, i.e. in a case where the fine cellulose fiber composite a is included, a total content of the composite a and other composites, based on 100 parts by weight of the polyester resin, is preferably 0.01 parts by weight or more, more preferably 0.05 parts by weight or more, and even more preferably 0.1 parts by weight or more, from the viewpoint of mechanical strength of the resulting polyester resin composition. Also, the content is preferably 5 parts by weight or less, more preferably 1 part by weight or less, and even more preferably 0.5 parts by weight or less, from the viewpoint of mechanical strength of the resulting polyester resin composition. In addition, the preferred content range is preferably from 0.01 to 5 parts by weight, more preferably from 0.05 to 1 part by weight, and even more preferably from 0.1 to 0.5 parts by weight.

The polyester resin composition of the present invention can further contain, in addition to the polyester resin and the fine cellulose fiber composite mentioned above, a plasticizer, a crystal nucleating agent, and a hydrolysis inhibitor.

In other words, another embodiment of the present invention includes a polyester resin composition containing a polyester resin and a fine cellulose fiber composite, as mentioned above, and at least one member selected from the group consisting of plasticizers, crystal nucleating agents, and hydrolysis inhibitors.

[Plasticizer]

The plasticizer is not particularly limited, and includes conventionally known plasticizers polycarboxylic acid esters such as phthalic acid esters, succinic acid esters, and adipic acid esters; fatty acid esters of an aliphatic polyol such as glycerol; and the like. Among them, an ester compound containing two or more ester groups in the molecule, the ester compound in which at least one kind of the alcohol component constituting the ester compound is an alcohol reacted with an alkylene oxide having from 2 to 3 carbon atoms in an amount of from 0.5 to 5 mol on average, per one hydroxyl group, is preferred, which are specifically exemplified by plasticizers listed in Japanese Patent Laid-Open Nos. 2008-174718 and 2008-115372. Here, in the present invention, plasticizers may be previously mixed with the fine cellulose fiber composite and contained as a dispersion medium of the fine cellulose fiber composite, from the viewpoint of excellently dispersing the fine cellulose fiber composite.

In addition, in the present invention, a polyester-based plasticizer, which is also referred to as an oligoester, represented by the following formula (I):

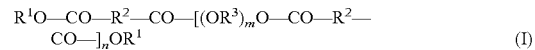

$$R^1O-CO-R^2-CO-[(OR^3)_mO-CO-R^2-CO-]_nOR^1 \quad \text{(I)}$$

wherein $R^1$ is an alkyl group having from 1 to 4 carbon atoms, $R^2$ is an alkylene group having from 2 to 4 carbon atoms, $R^3$ is an alkylene group having from 2 to 6 carbon atoms, m is the number of from 1 to 6, and n is the number of from 1 to 12, provided that all the $R^2$'s may be identical or different, and that all the $R^3$'s may be identical or different, is preferred, from the viewpoint of volatile resistance.

$R^1$ in the formula (I) is an alkyl group having the number of carbon atoms of from 1 to 4, and preferably from 1 to 2, and two of them are present in one molecule, the two being present at both terminals of the molecule. $R^1$ may be linear or branched, so long as it has the number of carbon atoms of from 1 to 4. Specific examples include a methyl group, an ethyl group, a propyl group, an isopropyl group, a butyl group, a sec-butyl group, and a tert-butyl group, among which a methyl group is preferred, from the viewpoint of improving compatibility with the polyester resin, thereby exhibiting a plasticizing effect.

$R^2$ in the formula (I) is an alkylene group having from 2 to 4 carbon atoms, which includes a linear alkylene group as a preferred example. Specific examples include an ethylene group, a 1,3-propylene group, and a 1,4-butylene group, among which an ethylene group and a 1,3-propylene group are preferred, and an ethylene group is more preferred, from the viewpoint of improving compatibility with the polyester resin, thereby exhibiting flexibility, and an ethylene group and a 1,4-butylene group are preferred, and an ethylene group is more preferred, from the viewpoint of exhibiting flexibility, and from the viewpoint of economic advantages. Here, all the $R^2$'s may be identical or different.

$R^3$ in the formula (I) is an alkylene group having the number of carbon atoms of from 2 to 6, and preferably from 2 to 3, and $OR^3$ is an oxyalkylene group. $R^3$ may be linear or branched, so long as it has the number of carbon atoms of from 2 to 6. Specific examples include an ethylene group, a 1,2-propylene group, a 1,3-propylene group, a 1,2-butylene group, a 1,3-butylene group, a 1,4-butylene group, a 2-methyl-1,3-propylene group, a 1,2-pentylene group, a 1,4-pentylene group, a 1,5-pentylene group, a 2,2-dimethyl-1,3-propylene group, a 1,2-hexylene group, a 1,5-hexylene group, a 1,6-hexylene group, a 2,5-hexylene group, a 3-methyl-1,5-pentylene group, among which an ethylene group, a 1,2-propylene group, and a 1,3-propylene group are preferred, from the viewpoint of improving compatibility with the polyester resin, thereby exhibiting a plasticizing effect. Here, all the $R^3$'s may be identical or different.

m is an average number of repeats of oxyalkylene groups, which is the number of from 1 to 6. When m becomes large, an ether group value of the ester compound represented by the formula (I) increases, so that the oxidation is more likely to take place, thereby lowering the stability. The number is preferably from 1 to 4, and the number is more preferably from 1 to 3, from the viewpoint of improving compatibility with the polyester resin.

n is an average degree of polymerization, which is the number is from 1 to 12. The number is preferably from 1 to 4, from the viewpoint of improving compatibility with the polyester resin, thereby improving flexibility of the polyester resin.

Among the above structure, an oligoester formed between at least one dibasic acid selected from succinic acid, glutaric acid, and adipic acid and at least one dihydric alcohol selected from diethylene glycol, triethylene glycol, 1,2-propanediol, and 1,3-propanediol, i.e. in the formula (I), n=1.2 to 3, is preferred, from the viewpoint of improving volatile resistance.

As the compound represented by the formula (I), a commercially available product, or a compound synthesized in accordance with a known production method may be used. The compound can be produced, for example, in accordance with a method as disclosed in Japanese Patent Laid-Open No. 2012-62467.

The content of the plasticizer is preferably 1 part by weight or more, and more preferably 5 parts by weight, and preferably 50 parts by weight or less, and more preferably 30 parts by weight or less, based on 100 parts by weight of the polyester resin, from the viewpoint of improving heat resistance, transparency, and moldability of the molded article made of the polyester resin composition. In addition, the content is preferably from 1 to 50 parts by weight, and more preferably from 5 to 30 parts by weight.

[Crystal Nucleating Agent]

The crystal nucleating agent includes inorganic crystal nucleating agents such as natural or synthetic silicate compounds, metal salts such as titanium oxide, barium sulfate, tricalcium phosphate, calcium carbonate, and sodium phosphate, kaolinite, halloysite, talc, smectite, vermiculite, and mica; and organic crystal nucleating agents such as ethylenebis fatty acid amides, propylenebis fatty acid amides, butylenebis fatty acid amides, and the like, and metal salts of phenylphosphonic acids. Among them, the organic crystal nucleating agents are preferred, and alkylenebis fatty acid amides such as ethylenebis fatty acid amides such as ethylenebis stearamide and ethylenebis oleamide, propylenebis fatty acid amides, and butylenebis fatty acid amides are more preferred, and alkylenebis hydroxyfatty acid amides such as ethylenebis 12-hydroxystearamide are even more preferred, from the viewpoint of improving transparency. Also, the metal salts of phenylphosphonic acids are preferred, from the viewpoint of improving strength.

The content of the crystal nucleating agent is preferably 0.1 parts by weight or more, and the content is preferably 1.0 part by weight or less, and more preferably 0.5 parts by weight or less, based on 100 parts by weight of the polyester resin, from the viewpoint of improving transparency of the polyester resin composition and the molded article made of the polyester resin composition. In addition, the content is preferably from 0.1 to 1.0 part by weight, and more preferably from 0.1 to 0.5 parts by weight.

[Hydrolysis Inhibitor]

The hydrolysis inhibitor includes carbodiimide compounds such as polycarbodiimide compounds and monocarbodiimide compounds, and the polycarbodiimide compounds are preferred, from the viewpoint of improving durability and impact resistance of the polyester resin composition, and the monocarbodiimide compounds are preferred, from the viewpoint of improving durability and moldability (fluidity) of the polyester resin composition. In addition, it is preferable that the monocarbodiimide and the polycarbodiimide are used together, from the viewpoint of even more improving durability, impact resistance, and moldability of the molded article made of the polyester resin composition.

The polycarbodiimide compound includes poly(4,4'-diphenylmethanecarbodiimide), poly(4,4'-dicyclohexylmethanecarbodiimide), poly(1,3,5-triisopropylbenzene)polycarbodiimide, poly(1,3,5-triisopropylbenzene and 1,3-diisopropylbenzene)polycarbodiimide, and the like. The monocarbodiimide compound includes N,N'-di-2,6-diisopropylphenylcarbodiimide, and the like.

In order to satisfy durability, impact resistance, and moldability of the molded article made of the polyester resin composition, the above-mentioned carbodiimide compounds may be used alone or in a combination of two or more kinds. In addition, as the poly(4,4'-dicyclohexylmethanecarbodiimide), Carbodilite LA-1 manufactured by Nisshinbo Chemical Inc. can be purchased and used; as the poly(1,3,5-triisopropylbenzene)polycarbodiimide and poly(1,3,5-triisopropylbenzene and 1,3-diisopropylbenzene) polycarbodiimide, Stabaxol P and Stabaxol P-100 manufactured by Rhein Chemie Rheinau GmbH can be purchased and used; and as N,N'-di-2,6-diisopropylphenylcarbodiimide, Stabaxol I manufactured by Rhein Chemie can be purchased and used, respectively.

The content of the hydrolysis inhibitor is preferably 0.05 parts by weight or more, and more preferably 0.10 parts by weight or more, and preferably 3 parts by weight or less, and more preferably 2 parts by weight or less, based on 100 parts by weight of the polyester resin, from the viewpoint of improving heat resistance and moldability of the molded article made of the polyester resin composition. In addition, the content is preferably from 0.05 to 3 parts by weight, and more preferably from 0.10 to 2 parts by weight.

The polyester resin composition of the present invention can contain, as other components besides those mentioned above, a filler including an inorganic filler and an organic filler, a flame retardant, an antioxidant, a lubricant such as a hydrocarbon wax or an anionic surfactant, an ultraviolet absorbent, an antistatic agent, an anti-clouding agent, a photostabilizer, a pigment, a mildewproof agent, a bactericidal agent, a blowing agent or the like, within the range that would not hamper the effects of the present invention. In addition, similarly, other polymeric materials and other resin compositions can be added within the range that would not hamper the effects of the present invention.

The polyester resin composition of the present invention can be prepared without particular limitations, so long as the polyester resin composition contains the polyester resin and the fine cellulose fiber composite. For example, the polyester resin composition can be prepared by melt-kneading raw materials containing a polyester resin and a fine cellulose fiber composite, and further optionally various additives, which are the raw materials for the polyester resin composition, with a known kneader, such as a closed kneader, a single-screw or twin-screw extruder, or an open roller kneader. The raw materials can also be subjected to melt-kneading after homogeneously mixing the raw materials with a Henschel mixer, a super mixer or the like. Here, when the polyester resin composition is prepared, a supercritical gas may be allowed to be present while mixing in a molten state in order to promote plasticity of the polyester resin.

The melt-kneading temperature is equal to or higher than a melting point Tm of the polyester resin, preferably within the range of from Tm to Tm plus(+) 100° C., and more preferably from Tm to Tm plus(+) 50° C., from the viewpoint of improving moldability and inhibition of deterioration of the polyester resin composition. For example, in a case where the polyester resin is a polylactic acid resin, the melt-kneading temperature is preferably from 170° to 240° C., and more preferably from 170° to 220° C. The melt-kneading time cannot be unconditionally determined because the melt-kneading time depends upon a melt-kneading temperature and the kinds of a kneader, and the melt-kneading time is preferably from 15 to 900 seconds. Here, in the present specification, the melting point of the polyester resin is obtained from a temperature of endothermic peak of crystal fusion according to a heating method for the differential scanning calorimetric measurement based on JIS-K7121, and the melting point can be measured by heating the polyester resin from 20° to 250° C. at a heating rate of 10° C./minute.

The resulting melt-kneaded mixture may be cooled after melt-kneading, from the viewpoint of even more improving crystallization velocity. The cooling temperature is a temperature lower than the melt-kneading temperature by preferably 60° C. or more, and more preferably 70° C. or more, and specifically the cooling temperature is preferably from 20° to 120° C., and more preferably from 20° to 100° C. The cooling time is preferably from 2 to 90 seconds, and more preferably from 5 to 60 seconds. Here, during cooling, a melt-kneaded product may be molded according to a known method, and then cooled.

Furthermore, after cooling, the temperature may be held at preferably from 50° to 120° C., more preferably from 60° to 100° C., for preferably from 30 to 180 seconds, more preferably from 30 to 120 seconds, and even more preferably from 30 to 60 seconds. Here, the holding temperature may be identical to or different from the cooling temperature.

The polyester resin composition of the present invention thus obtained has excellent workability and suppressed coloration at high temperatures, so that the polyester resin composition can be operated under high-temperature conditions, so that the polyester resin composition can be suitably used for various application, especially in automobile applications.

[Polyester Resin Molded Article]

The polyester resin molded article of the present invention can be prepared by subjecting a polyester resin composition of the present invention to extrusion-molding, injection-molding or press molding.

In extrusion molding, a polyester resin composition of the present invention which is filled in a heated extruder is melted, and thereafter extruded from a T die, whereby a sheet-like molded article can be obtained. This sheet-like molded article is immediately brought into contact with a cooling roller to cool the sheet to a temperature equal to or lower than the Tg of the polyester resin composition, thereby adjusting the crystalline property of the sheet, and subsequently the sheets are detached from the cooling roller, and wound around with a winding roller, whereby a sheet-like molded article can be obtained. Here, when filled in the extruder, the raw materials constituting the polyester resin composition of the present invention, for example, raw materials containing a polyester resin and a fine cellulose fiber composite, and further optionally various additives are filled, melt-kneaded, and thereafter subjected to extrusion molding.

The temperature of the extruder is preferably from 170° to 240° C., more preferably from 175° to 220° C., and even more preferably from 180° to 210° C., from the viewpoint of homogeneously mixing a polyester resin composition and inhibiting the deterioration of the polyester resin. Also, the temperature of the cooling roller is preferably 40° C. or lower, more preferably 30° C. or lower, and even more preferably 10° C. or lower, from the viewpoint of adjusting the crystalline property of the molded article.

In addition, the extrusion rate is preferably from 1 to 200 m/minute, more preferably from 5 to 150 m/minute, and even more preferably from 10 to 100 m/minute, from the viewpoint of adjusting the crystalline property of the molded article.

In the injection-molding, for example, a polyester resin composition of the present invention can be molded by filling a polyester resin composition in a die of a desired shape with an injection-molding machine of which cylinder temperature is set to a temperature preferably of from a melting point of the polyester resin, Tm, plus 5° C., i.e. Tm+5° C., to Tm+50° C., and more preferably from Tm+10° C. to Tm+30° C., specifically when a polyester resin is a polylactic acid resin, the cylinder temperature is set to a temperature of preferably from 180° to 220° C., and more preferably from 180° to 210° C.

The die temperature is preferably 150° C. or lower, more preferably 130° C. or lower, and even more preferably 110° C. or lower, and the die temperature is preferably 30° C. or higher, more preferably 60° C. or higher, and even more preferably 80° C. or higher, from the viewpoint of improving crystallization velocity and improving operability. The die temperature is preferably from 30° to 150° C., more preferably from 60° to 130° C., and even more preferably from 80° to 110° C., from the above viewpoint. In addition, when the polyester resin is a polylactic acid resin, the die temperature is preferably 110° C. or lower, more preferably 90° C. or lower, and even more preferably 80° C. or lower, and the die temperature is preferably 30° C. or higher, more preferably 40° C. or higher, and even more preferably 60° C. or higher, from the viewpoint of improving crystallization velocity and improving operability. The die temperature is preferably from 30° to 110° C., more preferably from 40° to 90° C., and even more preferably from 60° to 80° C., from the above viewpoint.

The holding time inside the die is not particularly limited, and the holding time is preferably from 2 to 60 seconds, more preferably from 3 to 30 seconds, and even more preferably from 5 to 20 seconds, in a die at, for example, 90° C., from the viewpoint of productivity of the molded article made of the polyester resin composition.

When a sheet-like molded article, for example, is molded by press molding, a molded article can be prepared by subjecting a polyester resin composition of the present invention to put and press into a frame having a sheet-like shape.

As the temperature and pressure of the press molding, it is preferable that the press can be carried out, for example, preferably under the conditions of a temperature of from 170° to 240° C. and a pressure of from 5 to 30 MPa, more preferably under the conditions of a temperature of from 175° to 220° C. and a pressure of from 10 to 25 MPa, and even more preferably under the conditions of a temperature of from 180° to 210° C. and a pressure of from 10 to 20 MPa. The press time cannot be unconditionally determined because the press time depends upon the temperature and pressure of the press, and the press time is preferably from 1 to 10 minutes, more preferably from 1 to 7 minutes, and even more preferably from 1 to 5 minutes.

In addition, immediately after the press under the above conditions, the polyester resin composition may be cooled by subjecting to press preferably under the conditions of a temperature of from 0° to 40° C. and a pressure of from 5 to 30 MPa, more preferably under the conditions of a temperature of from 10° to 30° C. and a pressure of from 10 to 25 MPa, and even more preferably under the conditions of a temperature of from 10° to 20° C. and a pressure of from 10 to 20 MPa. By pressing under the above temperature conditions, a polyester resin composition of the present invention is cooled to a temperature of equal to or lower than its Tg, thereby adjusting its crystalline property. The press time cannot be unconditionally determined because the press time depends upon the press temperature and pressure, and the press time is preferably from 1 to 10 minutes, more preferably from 1 to 7 minutes, and even more preferably from 1 to 5 minutes.

When a sheet-like molded article is prepared, its thickness is preferably from 0.1 to 1.5 mm, more preferably from 0.2 to 1.4 mm, and even more preferably from 0.3 to 1.2 mm, from the viewpoint of workability.

The molded article of the polyester resin composition of the present invention thus obtained has excellent mechanical strength and heat resistance, so that the molded article can be suitably used in various applications.

In addition, the present invention provides, as the polyester resin molded article of the present invention, i.e. the molded article made of the polyester resin composition of the present invention, molded articles of the following embodiments:

Embodiment 1

A thermoformed article made of a polyester resin composition containing a polyester resin, and a fine cellulose fiber composite having an average fiber diameter of from 0.1 to 200 nm, wherein the fine cellulose fiber composite contains fine cellulose fibers and hydrocarbon groups being connected thereto via an amide bond.

Embodiment 2

An injection-molded article made of a polyester resin composition containing a polyester resin, and a fine cellulose fiber composite having an average fiber diameter of from 0.1 to 200 nm, wherein the fine cellulose fiber composite contains fine cellulose fibers and hydrocarbon groups being connected thereto via an amide bond.

The thermoformed article of Embodiment 1 and the injection-molded article of Embodiment 2 may be any of those produced by molding the polyester resin composition of the present invention containing a polyester resin and a fine cellulose fiber composite, and the respective molding methods can be carried out in accordance with known methods, which are characterized in that the fine cellulose fiber composite contains fine cellulose fibers and hydrocarbon groups being connected to the surface thereof via an amide bond.

As the polyester resin in the molded article of Embodiment 1 and Embodiment 2, the same ones as those mentioned above can be used.

In addition, as the fine cellulose fiber composite in the molded article of Embodiment 1 and Embodiment 2, the same ones as those mentioned above can be used, and the kinds of the hydrocarbon groups, the average binding amount, the average fiber diameter and the like are not unconditionally determined by the kinds of the molded articles. The content of the fine cellulose fiber composite in the molded article of Embodiment 1, based on 100 parts by weight of the polyester resin, is preferably 0.01 parts by weight or more, more preferably 0.05 parts by weight or more, and even more preferably 0.1 parts by weight or more, from the viewpoint of tensile modulus and heat resistance. Also, the content is preferably 5 parts by weight or less, more preferably 1 part by weight or less, and even more preferably 0.5 parts by weight or less, from the viewpoint of transparency of the thermoformed article. In addition, preferred content ranges are preferably from 0.01 to 5 parts by weight, more preferably from 0.05 to 1 part by weight, and even more preferably from 0.1 to 0.5 parts by weight. The content of the fine cellulose fiber composite in the molded article of Embodiment 2, based on 100 parts by weight of the polyester resin, is preferably 0.01 parts by weight or more, more preferably 0.05 parts by weight or more, and even more preferably 0.1 parts by weight or more. In addition, the content is preferably 5 parts by weight or less, more preferably 1 parts by weight or less, and even more preferably 0.5 parts by weight or less, from the viewpoint of mechanical strength of the injection-molded article. In addition, preferred content ranges are preferably from 0.01 to 5 parts by weight, more preferably from 0.05 to 1 part by weight, and even more preferably from 0.1 to 0.5 parts by weight.

As the polyester resin composition in Embodiment 1, in addition to the polyester resin and the fine cellulose fiber composite mentioned above, a plasticizer, a crystal nucleating agent, other components and the like can be contained in the same manner as in the polyester resin composition of the present invention. The kinds thereof are not particularly limited, and the same ones as those mentioned above can be used. The contents of the plasticizer and the crystal nucleating agent may also be the same as those mentioned above.

As the polyester resin composition in Embodiment 2, in addition to the polyester resin and the fine cellulose fiber composite mentioned above, a plasticizer, a crystal nucleating agent, a hydrolysis inhibitor, other components and the like can be contained in the same manner as in the polyester resin composition of the present invention. The kinds thereof are not particularly limited, and the same ones as those mentioned above can be used. The contents of the plasticizer, the crystal nucleating agent, and the hydrolysis inhibitor may also be the same as those mentioned above.

The thermoformed article of Embodiment 1 is obtained by thermoforming a polyester resin composition of the present invention mentioned above in accordance with a known method without particular limitations. For example, the thermoformed article can be prepared by preparing a sheet using a polyester resin composition of the present invention, and thereafter thermoforming the sheet.

The sheet usable in the molding of the thermoformed article, which is also referred to as a sheet for use in a thermoformed article, can be prepared by subjecting a polyester resin composition mentioned above to extrusion molding or press molding.

In extrusion molding, a polyester resin composition mentioned above which is filled in a heated extruder is melted, and thereafter extruded from a T die, whereby a sheet for use in a thermoformed article can be obtained. Here, upon filling the extruder, the raw materials constituting the polyester resin composition of the present invention may be directly filled, melt-kneaded, and thereafter subjected to extrusion-molding.

In addition, in the present invention, a sheet-like primary processed product obtained by extrusion from a T die is immediately brought into contact with a cooling roller to cool the primary processed product to a temperature of lower than the Tg of the polyester resin composition to make it in an amorphous state or semi-crystalline state, and subsequently the primary processed product is detached from the cooling roller, and wound around with a winding roller, whereby a sheet for use in a thermoformed article may be obtained. Here, as to the amorphous state and the semi-crystalline state as used herein, a case where a relative crystallinity calculated by the following formula is less than 60% is defined as an amorphous state, and a case where a relative crystallinity is 60% or more and less than 80% is defined as a semi-crystalline state. Accordingly, the formed article in an amorphous state or semi-crystalline state means a formed article having a relative crystallinity of less than 80%.

$$\text{Relative Crystallinity (\%)} = \{(\Delta Hm - \Delta Hcc)/\Delta Hm\} \times 100$$

Specifically, the relative crystallinity can be obtained with a DSC apparatus (Diamond DSC, manufactured by Perkin-Elmer), using $\Delta Hcc$, which is an absolute value of a cold crystallization enthalpy of a polyester resin observed in 1st RUN and $\Delta Hm$, which is melt crystallization enthalpy observed in 2nd RUN, wherein 1st RUN includes the steps of heating from 20° to 200° C. at a heating rate of 20° C./minute, holding at 200° C. for 5 minutes, cooling from 200° to 20° C. at a cooling rate of −20° C./minute, holding at 20° C. for 1 minute, and 2nd RUN includes, after 1st RUN, the step of heating from 20° to 200° C. at a heating rate of 20° C./minute.

The temperature of the extruder is preferably 170° C. or higher, more preferably 175° C. or higher, and even more preferably 180° C. or higher, and the temperature of the extruder is preferably 240° C. or lower, more preferably 220° C. or lower, and even more preferably 210° C. or lower, from the viewpoint of homogeneously mixing a polyester resin composition and inhibiting the deterioration of the polyester resin. In addition, the temperature of the extruder is preferably from 170° to 240° C., more preferably from 175° to 220° C., and even more preferably from 180° to 210° C. Here, in the present invention, the temperature of the extruder means a barrel setting temperature of the extruder.

In addition, the extrusion rate is not particularly limited, and the extrusion rate is preferably from 1 to 100 m/minute, more preferably from 5 to 80 m/minute, and even more preferably from 10 to 50 m/minute, from the viewpoint of obtaining a formed article in an amorphous state or a semi-crystalline state.

In addition, the temperature of the cooling roller is preferably set to a temperature lower than a Tg of the polyester resin composition, from the viewpoint of obtaining a sheet for use in a thermoformed article in an amorphous state or a semi-crystalline state, and specifically preferably lower than 40° C., more preferably 30° C. or lower, and even more preferably 20° C. or lower. The time contacting the cooling roller is preferably from 0.1 to 50 seconds, more preferably from 0.5 to 10 seconds, and even more preferably from 0.8 to 5 seconds, from the viewpoint of obtaining a formed article in an amorphous state or a semi-crystalline state.

In a case where a sheet for use in a thermoformed article is molded by press molding, a formed article can be prepared by immediately cooling a primary processed product obtained by subjecting a polyester resin composition of the present invention to put and press into a frame having a sheet-like shape.

As the temperature and pressure of the press molding, it is preferable that the press is carried out, for example, preferably under the conditions of a temperature of from 170° to 240° C. and a pressure of from 5 to 30 MPa, more preferably under the conditions of a temperature of from 175° to 220° C. and a pressure of from 10 to 25 MPa, and even more preferably under the conditions of a temperature of from 180° to 210° C. and a pressure of from 10 to 20 MPa. The press time cannot be unconditionally determined because the time depends upon the temperature and pressure of the press, and the press time is preferably from 1 to 10 minutes, more preferably from 1 to 7 minutes, and even more preferably from 1 to 5 minutes.

Immediately after the press under the above conditions, it is preferable that the formed product is cooled by subjecting to press preferably under the conditions of a temperature of from 0° to 40° C. and a pressure of from 5 to 30 MPa, more preferably under the conditions of a temperature of from 10° to 30° C. and a pressure of from 10 to 25 MPa, and even more preferably under the conditions of a temperature of from 10° to 20° C. and a pressure of from 10 to 20 MPa. By the press under the above temperature conditions, a polyester resin composition of the present invention is cooled to a temperature of lower than its Tg, whereby an amorphous state or a semi-crystalline state can be maintained. The press time cannot be unconditionally determined because the press time depends upon the press temperature and pressure, and the press time is preferably from 1 to 10 minutes, more preferably from 1 to 7 minutes, and even more preferably from 1 to 5 minutes.

When a sheet for use in a thermoformed article in an amorphous state or a semi-crystalline state is prepared, its thickness is preferably from 0.1 to 1.5 mm, more preferably from 0.1 to 1.4 mm, and even more preferably from 0.15 to 1.2 mm, from the viewpoint of obtaining evenness of the thermoformed article, which is a secondary working article.

Next, the resulting sheet for use in a thermoformed article is subjected to thermoforming. As the method for thermoforming, a known method is used without particular limitations, so long as the method includes vacuum forming or pressure forming in a heated state. For example, a formed article can be prepared by setting a sheet mentioned above, and preferably a sheet in an amorphous state or a semi-crystalline state, in a die in a heated vacuum pressure molding machine, and holding the sheet in a pressed or non-pressed state, to allow forming.

As the vacuum pressure molding machine, a known vacuum pressure molding machine can be used. The vacuum pressure molding machine includes, for example, a single-step vacuum pressure forming machine manufactured by WAKISAKA Co., Ltd.

The die temperature is not particularly limited so long as the die temperature is a temperature at which the sheet for use in a thermoformed article can follow inside a die, and the die temperature is preferably equal to or higher than a glass transition temperature Tg of the polyester resin composition and lower than a inciting point Tm thereof, from the viewpoint of improving crystallization velocity and improving operability of the polyester resin composition. Specifically, the die temperature is preferably 120° C. or lower, more preferably 115° C. or lower, and even more preferably 110° C. or lower, and preferably 70° C. or higher, more preferably 75° C. or higher, and even more preferably 80° C. or higher. From the above viewpoint, the die temperature is preferably from 70° to 120° C., more preferably from 75° to 115° C., and even more preferably from 80° to 110° C. By heating the inside of the die within the above-mentioned temperature range, crystallization of the polyester resin composition progresses, so that a thermoformed article having a relative crystallinity obtained by the method mentioned above of preferably 80% or more, and more preferably 90% or more can be produced.

The holding time inside the die of preferably from 2 to 60 seconds, more preferably from 3 to 30 seconds, and even more preferably from 5 to 20 seconds in a die, for example, at 90° C., from the viewpoint of improving heat resistance and productivity of the thermoformed article made of the polyester resin composition.

The thickness of the thermoformed article of the present invention thus obtained is not particularly limited, and the thickness is preferably from 0.1 to 1.5 mm, more preferably from 0.15 to 1.4 mm, and even more preferably from 0.2 to 1.2 mm, from the viewpoint of obtaining evenness of the formed article, which is a secondary working article.

The thermoformed article of the present invention has excellent transparency and heat resistance because the above-mentioned polyester resin composition has excellent transparency and thermal stability, and the thermoformed article has excellent fittability because a sheet-like primary worked article made of the resin composition has excellent thermoforming property. The fittability refers to a fit-in property when, for example, a lid and a main body of a plastic container is fit together. Accordingly, the thermoformed article of the present invention has a storage modulus at 80° C., which is also simply referred to as storage modulus, of preferably 200 MPa or more, more preferably 250 MPa or more, and even more preferably 300 MPa or more. The upper limit is not particularly limited, and the upper limit is preferably 1,000 MPa or less, more preferably 800 MPa or less, and even more preferably 500 MPa or less, from the viewpoint of fittability. In addition, the thermoformed article of the present invention has a Haze (%) of preferably 30% or less, more preferably 25% or less, and even more preferably 20% or less. Also, the thermoformed article of the invention has preferably a storage modulus of 200 MPa or more and a Haze (%) of 30% or less, more preferably a storage modulus of 250 MPa or more and a Haze (%) of 25% or less, and even more preferably a storage modulus of 300 MPa or more and a Haze (%) of 20% or less. Here, the storage modulus at 80° C. and the Haze (%) as used herein can be measured in accordance with the methods described in Examples set forth below.

In addition, the injection-molded article of Embodiment 2 is obtained by injection-molding a polyester resin composition of the present invention mentioned above in accordance with a known method without particular limitations. For example, an injection-molded article can be prepared by filling a polyester resin composition of the present invention in an injection molding machine, injecting the polyester resin composition in a die, and allowing to mold the polyester resin composition.

In the injection molding, a known injection molding machine can be used, including, for example, a machine comprising a cylinder and a screw inserted through an internal thereof as main constituting elements, e.g. J110AD-180H, manufactured by The Japan Steel Works, Ltd. or the like. Here, the raw materials for the above-mentioned polyester resin composition may be supplied in a cylinder and directly melt-kneaded, but it is preferable that a product previously melt-kneaded is filled in an injection-molding machine.

The set temperature of the cylinder is preferably from a melting point Tm of the polyester resin plus 5° C., i.e. Tm+5° C., to Tm+50° C., and more preferably from Tm+10° C. to Tm+30° C. For example, in a case where the polyester resin is a polylactic acid resin, the set temperature is preferably from 180° to 220° C., and more preferably from 180° to 210° C. In a case where a melt-kneader is used, the set temperature means a set temperature of the cylinder in the kneader during melt-kneading the components. Here, the cylinder comprises some heaters, by which temperature control is carried out. The number of heaters cannot be unconditionally determined because the number of heaters differs depending on the kinds of machines. The heaters of which temperatures are controlled to the above-mentioned set temperature are located at the discharge outlet side of the melt-kneaded product, a tip end side of the nozzle.

The die temperature is preferably from 30° to 150° C., more preferably from 60° to 130° C., and even more preferably from 80° to 110° C., from the viewpoint of improving crystallization velocity and improving operability of the polyester resin composition. In addition, in a case where the polyester resin is a polylactic acid resin, the die temperature is preferably from 30° to 110° C., more preferably from 40° to 90° C., and even more preferably from 60° to 80° C.

The holding time inside the die cannot be unconditionally determined because the holding time depends upon the die temperature, and the holding time is preferably from 10 to 120 seconds, and more preferably from 30 to 90 seconds.

The injection-molded article of the present invention has excellent strength and heat resistance because the above-mentioned polyester resin composition has excellent mechanical strength and heat resistance. Accordingly, the injection-molded article of the present invention has a flexural strength of preferably 40 MPa or more, and more preferably 45 MPa or more. Although there are no particular limitations in the upper limit to the flexural strength, the flexural modulus is preferably 200 MPa or less, more preferably 150 MPa or less, and even more preferably 100 MPa or less, from the viewpoint of moldability. In addition, the injection-molded article of the present invention has a deflection temperature under load of preferably 70° C. or higher, and more preferably 75° C. or higher. Although there are no particular limitations in the upper limit to the deflection temperature under load, the deflection temperature under load is preferably 160° C. or lower, and more preferably 150° C. or lower, from the viewpoint of moldability. In addition, the injection-molded article of the invention preferably has a flexural strength of 40 MPa or more and a deflection temperature under load of 70° C. or higher, and more preferably a flexural strength of 45 MPa or more and a deflection temperature under load of 75° C. or higher. Here, the flexural strength and the deflection temperature under load as used herein can be measured in accordance with methods described in Examples set forth below.

The present invention also provides a method for producing a thermoformed article and a method for producing an injection-molded article of the present invention.

The method for producing a thermoformed article is not particularly limited, so long as the method includes the step of thermoforming a polyester resin composition containing a polyester resin and a fine cellulose fiber composite mentioned above, and the steps can be appropriately added according to the kinds of the formed article obtained.

Specific examples include embodiments including the following steps:

step (1-1): melt-kneading raw materials containing a fine cellulose fiber composite having an average fiber diameter of from 0.1 to 200 nm and a polyester resin, wherein the fine cellulose fiber composite contains fine cellulose fibers and hydrocarbon groups being connected thereto via an amide bond, to provide a polyester resin composition;

step (1-2): extrusion-molding or press-molding the polyester resin composition obtained in the step (1-1), to provide a sheet; and step (1-3): thermoforming the sheet obtained in the step (1-2), to provide a thermoformed article;

The step (1-1) is a step for preparing a polyester resin composition, which can be carried out in the same manner as in the method for preparing a polyester resin composition of the present invention. For example, a polyester resin composition can be prepared by melt-kneading raw materials containing a polyester resin and a fine cellulose fiber composite, and further optionally various additives such as a plasticizer and a crystal nucleating agent with a known kneader. The apparatus, the conditions and the like for the melt-kneading are as those mentioned above. Here, although the fine cellulose fiber composite can be produced in accordance with a known method, it is preferable to use a fine cellulose fiber composite produced by a method including the steps (A) and (B) in the method for producing a fine cellulose fiber composite mentioned above.

In the step (1-2), the polyester resin composition obtained in the step (1-1) is extrusion-molded or press-molded to provide a sheet, i.e. a sheet for use in a thermoformed article. In this step, since the sheet may be prepared into a sheet in an amorphous state or a semi-crystalline state, the step (1-2) may be, for example, a step of extruding a polyester resin composition obtained in the step (1-1) from a die according to an extrusion-molding method to provide a sheet, and thereafter cooling the sheet to a temperature lower than a glass transition temperature Tg of the polyester resin composition to provide a sheet having a relative crystallinity of less than 80%. The extrusion-molding or press-molding can be carried out in the same manner as above. In addition, in a case where the sheet is cooled after molding into a sheet-like form, the same as above is carried out.

In the step (1-3), the sheet obtained in the step (1-2) is thermoformed, to provide a thermoformed article. The method for thermoforming may be the same method as those mentioned above. For example, a sheet for use in a thermoformed article prepared in the above-mentioned step (1-2), and preferably a sheet in an amorphous state or a semi-crystalline state, is thermoformed within a temperature region of equal or higher than a glass transition temperature Tg of the polyester resin composition and lower than a melting point Tm, whereby a thermoformed article that is crystallized so as to have a relative crystallinity as calculated by the method mentioned above of preferably 80% or more, and more preferably 90% or more, can be obtained. Accordingly, the step (1-3) may be a step of thermoforming the sheet obtained in the step (1-2) within a temperature region of equal or higher than a glass transition temperature Tg of the polyester resin composition and lower than a melting point Tm, to provide a thermoformed article that is crystallized so as to have a relative crystallinity of 80% or more.

The method for producing an injection-molded article is not particularly limited, so long as the method includes the step of injection-molding a polyester resin composition containing a polyester resin and a fine cellulose fiber composite mentioned above, and steps can be appropriately added, depending upon the kinds of the molded article obtained.

Specific examples include embodiments including the following steps:

step (2-1): melt-kneading raw materials containing a fine cellulose fiber composite having an average fiber diameter of from 0.1 to 200 nm and a polyester resin, wherein the fine cellulose fiber composite contains fine cellulose fibers and hydrocarbon groups being connected thereto via an amide bond, to provide a polyester resin composition; and step (2-2): injection-molding the polyester resin composition obtained in the step (2-1) in a die.

The step (2-1) is a step for preparing a polyester resin composition, as in the step (1-1), which can be carried out in the same manner as in the method for preparing a polyester resin composition of the present invention. The apparatus, the conditions and the like of melt-kneading may be as those mentioned above. Here, although the fine cellulose fiber composite can be produced in accordance with a known method, it is preferable to use a fine cellulose fiber composite produced by a method including the steps (A) and (B) in the method for producing a fine cellulose fiber composite mentioned above.

The step (2-2) is a step of injection-molding a polyester resin composition. Specifically, the step includes filling a polyester resin composition obtained in the step (2-1) in an injection-molding machine equipped with a cylinder, heated to a temperature of from a melting point of the polyester resin plus 5° C., i.e. Tm+5° C. to Tm+50° C., more preferably from Tm+10° C. to Tm+30° C., and when a polyester resin is a polylactic acid resin, the molding machine equipped with a cylinder, heated to a temperature of preferably from 180° to 220° C., more preferably from 180° to 210° C., and injecting in a die at a temperature of preferably from 30° to 150° C., more preferably from 60° to 130° C., and even more preferably from 80° to 110° C., and when a polyester resin is a polylactic acid resin, a die at a temperature of preferably from 30° to 110° C., more preferably from 40° to 90° C., and even more preferably from 60° to 80° C. to allow molding.

The thermoformed article of the present invention thus obtained has excellent transparency and excellent heat resistance, and has a relative crystallinity of preferably 80% or more, and more preferably 90% or more, which is highly crystalline, so that the thermoformed articles can be suitably used in various applications, especially blister packs or trays for daily sundries, cosmetics, and household electric appliances; food containers such as lids for lunch-boxes; and industrial trays usable in transportation or protection of industrial parts.

In addition, the injection-molded article of the present invention has excellent strength and heat resistance because the fine cellulose fiber composite is well dispersed, so that the injection-molded article can be suitably used for cases or parts for intelligent household electric appliances, daily sundries, stationeries, cosmetics, and the like.

The present invention can relate to any of the followings:

<1>
A polyester resin composition containing a polyester resin, and a fine cellulose fiber composite having an average fiber diameter of preferably 0.1 nm or more, more preferably 0.2 nm or more, even more preferably 0.5 nm or more, even more preferably 0.8 nm or more, and still even more preferably 1 nm or more, and preferably 200 nm or less, more preferably 100 nm or less, even more preferably 50 nm or less, even more preferably 20 nm or less, and still even more preferably 10 nm or less, and preferably from 0.1 to 200 nm, more preferably from 0.2 to 100 nm, even more preferably from 0.5 to 50 nm, even more preferably from 0.8 to 20 nm, and still even more preferably from 1 to 10 nm, wherein the fine cellulose fiber composite contains fine cellulose fibers and hydrocarbon groups being connected thereto via an amide bond.

<2>
The polyester resin composition according to <1>, wherein the hydrocarbon groups are saturated or unsaturated, linear or branched hydrocarbon groups having the number of carbon atoms of preferably 1 or more, more preferably 2 or more, and even more preferably 3 or more, and preferably 30 or less, more preferably 18 or less, even more preferably 12 or less, and still even more preferably 8 or less.

<3>
The polyester resin composition according to <1>, wherein the hydrocarbon groups are a hydrocarbon group having the number of carbon atom of 1, or saturated or unsaturated, linear or branched hydrocarbon groups having the number of carbon atoms of preferably from 2 to 30, more preferably from 2 to 18, even more preferably from 2 to 12, and even more preferably from 3 to 8.

<4>
The polyester resin composition according to any one of <1> to <3>, wherein the hydrocarbon groups are at least one member selected from the group consisting of a methyl group, an ethyl group, a propyl group, an isopropyl group, a butyl group, an isobutyl group, a pentyl group, a hexyl group, a heptyl group, an octyl group, a 2-ethylhexyl group, a decyl group, a dodecyl group, a tridecyl group, a tetradecyl group, and an octadecyl group.

<5>
The polyester resin composition according to any one of <1> to <4>, wherein the average binding amount of the hydrocarbon groups in the fine cellulose fiber composite is preferably 0.001 mmol/g or more, more preferably 0.005 mmol/g or more, and even more preferably 0.01 mmol/g or more, and preferably 3 mmol/g or less, more preferably 2 mmol/g or less, and even more preferably 1 mmol/g or less.

<6>
The polyester resin composition according to any one of <1> to <4>, wherein the average binding amount of the hydrocarbon groups in the fine cellulose fiber composite is preferably from 0.001 to 3 mmol/g, more preferably from 0.005 to 2 mmol/g, and even more preferably from 0.01 to 1 mmol/g.

<7>
The polyester resin composition according to any one of <1> to <6>, wherein the average fiber diameter of the fine cellulose fibers is preferably from 0.1 to 200 nm, more preferably from 0.2 to 100 nm, even more preferably from 0.5 to 50 nm, even more preferably from 0.8 to 20 nm, and still even more preferably from 1 to 10 nm.

<8>
The polyester resin composition according to any one of <1> to <7>, wherein the carboxy group content of the fine cellulose fibers is preferably 0.1 mmol/g or more, more preferably 0.4 mmol/g or more, and even more preferably 0.6 mmol/g or more, and
preferably 3 mmol/g or less, more preferably 2 mmol/g or less, and even more preferably 1.8 mmol/g or less.

<9>
The polyester resin composition according to any one of <1> to <7>, wherein the carboxy group content of the fine cellulose fibers is preferably from 0.1 to 3 mmol/g, more preferably from 0.1 to 2 mmol/g, even more preferably from 0.4 to 2 mmol/g, and still even more preferably from 0.6 to 1.8 mmol/g.

<10>
The polyester resin composition according to any one of <1> to <9>, wherein the average aspect ratio of the fine cellulose fibers is preferably from 10 to 1,000, more preferably from 20 to 500, even more preferably from 50 to 400, and still even more preferably from 100 to 350.

<11>
The polyester resin composition according to any one of <1> to <10>, wherein the crystallinity of the fine cellulose fibers is preferably from 30 to 95%, more preferably from 35 to 90%, even more preferably from 40 to 85%, and still even more preferably from 45 to 80%.

<12>
The polyester resin composition according to any one of <1> to <11>, wherein the carboxy group content of the fine cellulose fiber composite is preferably 0.10 mmol/g or more, more preferably 0.20 mmol/g or more, and even more preferably 0.30 mmol/g or more, and preferably 3 mmol/g or less, more preferably 2 mmol/g or less, and even more preferably 1.5 mmol/g or less.

<13>
The polyester resin composition according to any one of <1> to <11>, wherein the carboxy group content of the fine cellulose fiber composite is preferably from 0.10 to 3 mmol/g, more preferably from 0.20 to 2 mmol/g, and even more preferably from 0.30 to 1.5 mmol/g.

<14>
The polyester resin composition according to any one of <1> to <13>, wherein the content of the fine cellulose fiber composite is preferably 0.01 parts by weight or more, more preferably 0.05 parts by weight or more, and even more preferably 0.1 parts by weight or more, and preferably 5 parts by weight or less, more preferably 1 part by weight or less, and even more preferably 0.5 parts by weight or less, based on 100 parts by weight of the polyester resin.

<15>
The polyester resin composition according to any one of <1> to <13>, wherein the content of the fine cellulose fiber composite is preferably from 0.01 to 5 parts by weight, more preferably from 0.05 to 1 part by weight, and even more preferably from 0.1 to 0.5 parts by weight, based on 100 parts by weight of the polyester resin.

<16>
The polyester resin composition according to any one of <1> to <15>, wherein the fine cellulose fiber composite is obtainable according to a method including the following steps (A) and (B):
step (A): oxidizing natural cellulose fibers in the presence of an N-oxyl compound, to provide carboxy group-containing cellulose fibers; and
step (B): reacting the carboxy group-containing cellulose fibers obtained in the step (A) and primary or secondary amines having hydrocarbon groups.

<17>

The polyester resin composition according to <16>, wherein the N-oxyl compound is one or more heterocyclic N-oxyl compounds selected from piperidinyloxyl compounds, pyrrolidinyloxyl compounds, imidazolinyloxyl compounds, and azaadamantane compounds having an alkyl group having 1 or 2 carbon atoms.

<18>

The polyester resin composition according to <16>, wherein the N-oxyl compound is at least one member selected from the group consisting of 2,2,6,6-tetramethylpiperidinyl-1-oxyl (TEMPO), a 4-hydroxy-2,2,6,6-tetramethylpiperidinyl-1-oxyl, and a 4-methoxy-2,2,6,6-tetramethylpiperidinyl-1-oxyl.

<19>

The polyester resin composition according to any one of <16> to <18>, wherein the primary amines having hydrocarbon groups are at least one member selected from the group consisting of methylamine, ethylamine, propylamine, butylamine, pentylamine, hexylamine, heptylamine, octylamine, 2-ethylhexylamine, decylamine, dodecylamine, tridecylamine, tetradecylamine, and octadecylamine.

<20>

The polyester resin composition according to any one of <16> to <18>, wherein the secondary amines is at least one member selected from the group consisting of dimethylamine, diethylamine, diisopropylamine, dioctylamine, didecylamine, didodecylamine, ditetradecylamine, and dioctadecylamine.

<21>

The polyester resin composition according to any one of <16> to <18>, wherein the primary amines having hydrocarbon groups are primary amines having linear or branched hydrocarbon groups having preferably from 1 to 18 carbon atoms, more preferably from 1 to 12 carbon atoms, even more preferably from 1 to 8 carbon atoms, and even more preferably from 1 to 6 carbon atoms.

<22>

The polyester resin composition according to any one of <16> to <21>, wherein the amount of the primary amines or secondary amines having hydrocarbon groups used is preferably from 0.01 to 50 mol, more preferably from 0.05 to 40 mol, and even more preferably from 0.1 to 20 mol, per one mol of the carboxy group contained in the carboxy group-containing fine cellulose fibers.

<23>

The polyester resin composition according to any one of <16> to <22>, wherein the fine cellulose fiber composite is a reaction product of the carboxy group-containing cellulose fibers and the primary or secondary amines having hydrocarbon groups.

<24>

The polyester resin composition according to any one of <1> to <23>, wherein the polyester resin is a polylactic acid resin.

<25>

The polyester resin composition according to any one of <1> to <24>, further containing a plasticizer.

<26>

The polyester resin composition according to <25>, wherein the plasticizer contains an ester compound containing two or more ester groups in the molecule, wherein at least one kind of the alcohol component constituting the ester compound is an alcohol reacted with an alkylene oxide having from 2 to 3 carbon atoms in an amount of from 0.5 to 5 mol on average, per one hydroxyl group.

<27>

The polyester resin composition according to <25>, wherein the plasticizer contains a polyester-based plasticizer, which is also referred to as an oligoester, represented by the following formula (I):

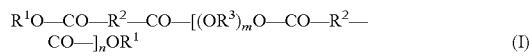

$$R^1O\text{—}CO\text{—}R^2\text{—}CO\text{—}[(OR^3)_mO\text{—}CO\text{—}R^2\text{—}CO\text{—}]_nOR^1 \quad (I)$$

wherein $R^1$ is an alkyl group having from 1 to 4 carbon atoms, $R^2$ is an alkylene group having from 2 to 4 carbon atoms, $R^3$ is an alkylene group having from 2 to 6 carbon atoms, m is the number of from 1 to 6, and n is the number of from 1 to 12, provided that all the $R^2$'s may be identical or different, and that all the $R^3$'s may be identical or different.

<28>

The polyester resin composition according to any one of <25> to <28>, wherein the content of the plasticizer is preferably 1 part by weight or more, and more preferably 5 parts by weight or more, and preferably 50 parts by weight or less, and more preferably 30 parts by weight or less, based on 100 parts by weight of the polyester resin.

<29>

The polyester resin composition according to any one of <1> to <28>, further containing a crystal nucleating agent.

<30>

The polyester resin composition according to <28>, wherein the crystal nucleating agent contains at least one member selected from the group consisting of alkylenebis fatty acid amides such as ethylenebis fatty acid amides such as ethylenebis stearamide and ethylenebis oleamide, propylenebis fatty acid amides, and butylenebis fatty acid amides; and metal salts of phenylphosphonic acids.

<31>

The polyester resin composition according to <29> or <30>, wherein the content of the plasticizer is preferably 1 part by weight or more, and more preferably 5 parts by weight or more, and preferably 50 parts by weight or less, and more preferably 30 parts by weight or less, based on 100 parts by weight of the polyester resin.

<32>

The polyester resin composition according to any one of <1> to <31>, further containing a hydrolysis inhibitor.

<33>

The polyester resin composition according to <32>, wherein the content of the hydrolysis inhibitor is preferably 0.05 parts by weight or more, and more preferably 0.10 parts by weight or more, and preferably 3 parts by weight or less, and more preferably 2 parts by weight or less, based on 100 parts by weight of the polyester resin.

<34>

The polyester resin composition according to any one of <1> to <33>, wherein the polyester resin composition is produced by melt-kneading raw materials containing a polyester resin and a fine cellulose fiber composite.

<35>

A thermoformed article made of a polyester resin composition as defined in any one of <1> to <34>.

<36>

The thermoformed article according to <35>, wherein the content of the fine cellulose fiber composite is preferably 0.01 parts by weight or more, more preferably 0.05 parts by weight or more, and even more preferably 0.1 parts by weight or more, and preferably 5 parts by weight or less, more preferably 1 part by weight or less, and even more preferably 0.5 parts by weight or less, and preferably from 0.01 to 5 parts by weight, more preferably from 0.05 to 1 part by weight, and even more preferably from 0.1 to 0.5 parts by weight, based on 100 parts by weight of the polyester.
<37>
The thermoformed article according to <35> or <36>, wherein the formed article is produced by setting a sheet made of a polyester resin composition as defined in any one of <1> to <34> in a die in a heated vacuum pressure molding machine, and holding the sheet in a die in a pressed or non-pressed state, to allow forming.
<38>
The thermoformed article according to <37>, wherein the sheet is prepared by extrusion-molding or press-molding a polyester resin composition as defined in any one of <1> to <34>.
<39>
The thermoformed article according to <38>, wherein the extrusion-molding includes melting a polyester resin composition as defined in any one of <1> to <34> which is filled in a heated extruder, and thereafter extruding a molten composition from a T die.
<40>
The thermoformed article according to <39>, wherein the temperature of the extruder is preferably 170° C. or higher, more preferably 175° C. or higher, and even more preferably 180° C. or higher, and preferably 240° C. or lower, more preferably 220° C. or lower, and even more preferably 210° C. or lower, and preferably from 170° to 240° C., more preferably from 175° to 220° C., and even more preferably from 180° to 210° C.
<41>
The thermoformed article according to <39> or <40>, wherein a primary processed product in a sheet-like form obtained by extrusion from a T die is immediately brought into contact with a cooling roller to cool to a temperature lower than Tg of the polyester resin composition.
<42>
The thermoformed article according to <41>, wherein the temperature of the cooling roller is preferably lower than 40° C., more preferably 30° C. or lower, and even more preferably 20° C. or lower.
<43>
The thermoformed article according to <38>, wherein the press molding includes subjecting a polyester resin composition as defined in any one of <1> to <34> to frame press molding with a frame having a sheet-like shape.
<44>
The thermoformed article according to <43>, wherein as to the temperature and pressure of the press molding, the press molding is carried out preferably under conditions of a temperature of from 170° to 240° C. and a pressure of from 5 to 30 MPa, more preferably under the conditions of a temperature of from 175° to 220° C. and a pressure of from 10 to 25 MPa, and even more preferably under the conditions of a temperature of from 180° to 210° C. and a pressure of from 10 to 20 MPa.
<45>
The thermoformed article according to <44>, wherein, immediately after the press under the conditions as defined in <44>, the polyester resin composition is cooled by subjecting to press preferably under the conditions of a temperature of from 0° to 40° C. and a pressure of from 5 to 30 MPa, more preferably under the conditions of a temperature of from 10° to 30° C. and a pressure of from 10 to 25 MPa, and even more preferably under the conditions of a temperature of from 10° to 20° C. and a pressure of from 10 to 20 MPa.

<46>
The thermoformed article according to <41>, <42>, or <45>, wherein the sheet is in an amorphous state or a semi-crystalline state.
<47>
The thermoformed article according to <46>, wherein the thickness of the sheet in an amorphous state or a semi-crystalline state is preferably from 0.1 to 1.5 mm, more preferably from 0.1 to 1.4 mm, and even more preferably from 0.15 to 1.2 mm.
<48>
The thermoformed article according to any one of <37> to <47>, wherein the die temperature is preferably 120° C. or lower, more preferably 115° C. or lower, and even more preferably 110° C. or lower, and preferably 70° C. or higher, more preferably 75° C. or higher, and even more preferably 80° C. or higher, and preferably from 70° to 120° C., more preferably from 75° to 115° C., and even more preferably from 80° to 110° C.
<49>
The thermoformed article according to any one of <35> to <48>, wherein the thickness of the thermoformed article is preferably from 0.1 to 1.5 mm, more preferably from 0.15 to 1.4 mm, and even more preferably from 0.2 to 1.2 mm,
<50>
The thermoformed article according to any one of <35> to <49>, wherein the storage modulus at 80° C. of the thermoformed article is preferably 200 MPa or more, more preferably 250 MPa or more, and even more preferably 300 MPa or more, and preferably 1,000 MPa or less, more preferably 800 MPa or less, and even more preferably 500 MPa or less.
<51>
The thermoformed article according to any one of <35> to <50>, wherein the Haze (%) of the thermoformed article is preferably 30% or less, more preferably 25% or less, and even more preferably 20% or less.
<52>
The thermoformed article according to any one of <35> to <51>, wherein the thermoformed article preferably has a storage modulus at 80° C. of 200 MPa or more and a Haze (%) of 30% or less, more preferably a storage modulus at 80° C. of 250 MPa or more and a Haze (%) of 25% or less, and even more preferably a storage modulus at 80° C. of 300 MPa or more and a Haze (%) of 20% or less.
<53>
A method for producing a thermoformed article as defined in any one of <35> to <52>, including the following steps (1-1) to (1-3):
step (1-1): melt-kneading raw materials containing a fine cellulose fiber composite having an average fiber diameter of from 0.1 to 200 nm and a polyester resin, wherein the fine cellulose fiber composite contains fine cellulose fibers and hydrocarbon groups being connected thereto via an amide bond, to provide a polyester resin composition;
step (1-2): extrusion-molding or press-molding the polyester resin composition obtained in the step (1-1) to provide a sheet; and
step (1-3): thermoforming the sheet obtained in the step (1-2), to provide a thermoformed article.
<54>
The method for producing a thermoformed article according to <53>, wherein the fine cellulose fiber composite is obtainable according to a method including the following steps (A) and (B):

step (A): oxidizing natural cellulose fibers in the presence of an N-oxyl compound, to provide carboxy group-containing cellulose fibers; and step (B): reacting the carboxy group-containing cellulose fibers obtained in the step (A) and primary or secondary amines having hydrocarbon groups.

<55>

The method for producing a thermoformed article according to <53> or <54>, wherein the step (1-2) includes extruding a polyester resin composition obtained in the step (1-1) from a die according to an extrusion-molding method to provide a sheet, and thereafter cooling the sheet to a temperature lower than a glass transition temperature Tg of the polyester resin composition to provide a sheet having a relative crystallinity of less than 80%.

<56>

The method for producing a thermoformed article according to any one of <53> to <55>, wherein the step (1-3) includes thermoforming the sheet obtained in the step (1-2) within a temperature region of equal or higher than a glass transition temperature Tg of the polyester resin composition and lower than a melting point Tm, to provide a thermoformed article that is crystallized so as to have a relative crystallinity of 80% or more.

<57>

An injection-molded article made of a polyester resin composition as defined in any one of <1> to <34>.

<58>

The injection-molded article according to <57>, wherein the content of the fine cellulose fiber composite is preferably 0.01 parts by weight or more, more preferably 0.05 parts by weight or more, and even more preferably 0.1 parts by weight or more, and preferably 5 parts by weight or less, more preferably 1 part by weight or less, and even more preferably 0.5 parts by weight or less, and preferably from 0.01 to 5 parts by weight, more preferably from 0.05 to 1 part by weight, and even preferably from 0.1 to 0.5 parts by weight, based on 100 parts by weight of the polyester resin.

<59>

The injection-molded article according to <57> or <58>, wherein the injection-molded article is produced by filling a polyester resin composition as defined in any one of <1> to <34> in an injection-molding machine, and injecting the resin composition in a die, and allowing to mold.

<60>

The injection-molded article according to <59>, wherein the injection molding machine is a machine comprising a cylinder and a screw inserted through an internal thereof as main constituting elements.

<61>

The injection-molded article according to <60>, wherein the set temperature of the cylinder is preferably from a melting point Tm of the polyester resin plus 5° C., i.e. Tm+5° C., to Tm+50° C., and more preferably from Tm+10° C. to Tm+30° C., and in a case where the polyester is a polylactic acid resin, the set temperature is preferably from 180° to 220° C., and more preferably from 180° to 210° C.

<62>

The injection-molded article according to any one of <59> to <61>, wherein the die temperature is preferably from 30° to 150° C., more preferably from 60° to 130° C., and even more preferably from 80° to 110° C., and in a case where the polyester resin is a polylactic acid resin, the die temperature is preferably from 30° to 110° C., more preferably from 40° to 90° C., and even more preferably from 60° to 80° C.

<63>

The injection-molded article according to any one of <59> to <62>, wherein the injection-molded article has a flexural strength of preferably 40 MPa or more, and more preferably 45 MPa or more, and preferably 200 MPa or less, more preferably 150 MPa or less, and even more preferably 100 MPa or less.

<64>

The injection-molded article according to any one of <59> to <63>, wherein the injection-molded article has a deflection temperature under load of preferably 70° C. or higher, and more preferably 75° C. or higher, and preferably 160° C. or lower, and more preferably 150° C. or lower.

<65>

The injection-molded article according to any one of <59> to <64>, wherein the injection-molded article preferably has a flexural strength of 40 MPa or more and a deflection temperature under load of 70° C. or higher, and more preferably a flexural strength of 45 MPa or more and a deflection temperature under load of 75° C. or higher.

<66>

A method for producing an injection-molded article as defined in any one of <59> to <65>, including the following steps (2-1) to (2-2):

step (2-1): melt-kneading raw materials containing a fine cellulose fiber composite having an average fiber diameter of from 0.1 to 200 nm and a polyester resin, wherein the fine cellulose fiber composite contains fine cellulose fibers and hydrocarbon groups being connected thereto via an amide bond, to provide a polyester resin composition; and step (2-2): injection-molding the polyester resin composition obtained in the step (2-1) in a die.

<67>

The method for producing an injection-molded article according to <66>, wherein the fine cellulose fiber composite is obtainable according to a method including the following steps (A) and (B):

step (A): oxidizing natural cellulose fibers in the presence of an N-oxyl compound, to provide carboxy group-containing cellulose fibers; and step (B): reacting the carboxy group-containing cellulose fibers obtained in the step (A) and primary or secondary amines having hydrocarbon groups.

<68>

The method for producing an injection-molded article according to <66> or <67>, wherein the step (2-2) includes filling a polyester resin composition obtained in the step (2-1) in an injection-molding machine equipped with a cylinder, heated to a temperature of from a melting point of the polyester resin plus 5° C., i.e. Tm+5° C. to Tm+50° C., more preferably from Tm+10° C. to Tm+30° C., and when a polyester resin is a polylactic acid resin, the molding machine equipped with a cylinder, heated to a temperature of preferably from 180° to 220° C., more preferably from 180° to 210° C., and injecting the polyester resin composition in a die at a temperature of preferably from 30° to 150° C., more preferably from 60° to 130° C., and even more preferably from 80° to 110° C., and when a polyester resin is a polylactic acid resin, a die at a temperature of preferably from 30° to 110° C., more preferably from 40° to 90° C., and even more preferably from 60° to 80° C. to allow molding.

<69>

The thermoformed article according to any one of <35> to <52>, for use in blister packs or trays for daily sundries, cosmetics, and household electric appliances; food containers such as lids for lunch-boxes; and industrial trays usable in transportation or protection of industrial parts.

<70>
The injection-molded article according to any one of <59> to <65>, for use in cases or parts for intelligent household electric appliances, daily sundries, stationeries, and cosmetics.

<71>
A fine cellulose fiber composite having an average fiber diameter of from 0.1 to 200 nm, wherein the fine cellulose fiber composite contains fine cellulose fibers and hydrocarbon groups having from 1 to 16 carbon atoms being connected thereto via an amide bond.

<72>
The fine cellulose fiber composite according to <71>, wherein the hydrocarbon groups are a hydrocarbon group having 1 carbon atom, or saturated or unsaturated, linear or branched hydrocarbon groups having from 2 to 16 carbon atoms.

<73>
The fine cellulose fiber composite according to <71> or <72>, wherein the number of carbon atoms of the hydrocarbon groups is 16 or less, preferably 14 or less, and more preferably 12 or less, and 1 or more, preferably 2 or more, and more preferably 3 or more, and from 1 to 16, preferably from 2 to 14, and more preferably from 3 to 12.

<74>
The fine cellulose fiber composite according to any one of <71> to <73>, wherein the hydrocarbon groups are at least one member selected from a methyl group, an ethyl group, a propyl group, an isopropyl group, a butyl group, an isobutyl group, a pentyl group, a hexyl group, a heptyl group, an octyl group, a 2-ethylhexyl group, a decyl group, a dodecyl group, a tridecyl group, a tetradecyl group, and a hexadecyl group.

<75>
The fine cellulose fiber composite according to any one of <71> to <74>, wherein the binding amount of the hydrocarbon groups is 0.3 mmol/g or more, preferably 0.4 mmol/g or more, and more preferably 0.5 mmol/g or more, and preferably 3 mmol/g or less, more preferably 2 mmol/g or less, and even more preferably 1 mmol/g or less, and preferably from 0.3 to 3 mmol/g, more preferably from 0.4 to 2 mmol/g, and even more preferably from 0.5 to 1 mmol/g.

<76>
A method for producing a fine cellulose fiber composite as defined in any one of <71> to <75>, including the following steps (1a) and (1b):
step (1a): oxidizing natural cellulose fibers in the presence of an N-oxyl compound, to provide carboxy group-containing cellulose fibers; and
step (1b): reacting the carboxy group-containing cellulose fibers and primary or secondary amines having hydrocarbon groups having from 1 to 16 carbon atoms.

<77>
A method for producing a fine cellulose fiber composite as defined in any one of <71> to <75>, including the following step (2a):
step (2a): reacting the carboxy group-containing cellulose fibers and primary or secondary amines having hydrocarbon groups having from 1 to 16 carbon atoms.

<78>
A fine cellulose fiber composite obtainable by the method as defined in <76> or <77>, wherein the fine cellulose fiber composite is a reaction product of carboxy group-containing cellulose fibers and primary or secondary amines having hydrocarbon groups having from 1 to 16 carbon atoms.

<79>
The fine cellulose fiber composite according to any one of <71> to <75>, wherein the carboxy group content is preferably 0.01 mmol/g or more, more preferably 0.1 mmol/g or more, and even more preferably 0.2 mmol/g or more, and preferably 2.8 mmol/g or less, more preferably 2.0 mmol/g or less, and even more preferably 1.5 mmol/g or less, and preferably from 0.01 to 2.8 mmol/g, more preferably from 0.1 to 2.0 mmol/g, and even more preferably from 0.2 to 1.5 mmol/g.

<80>
The fine cellulose fiber composite according to any one of <71> to <75> and <79>, wherein the average fiber diameter is preferably 0.1 nm or more, more preferably 0.2 nm or more, even more preferably 0.5 nm or more, even more preferably 0.8 nm or more, and still even more preferably 1 nm or more, and preferably 200 nm or less, more preferably 100 nm or less, even more preferably 50 nm or less, even more preferably 20 nm or less, and still even more preferably 10 nm or less, and preferably from 0.1 to 200 nm, more preferably from 0.2 to 100 nm, even more preferably from 0.5 to 50 nm, even more preferably from 0.8 to 20 nm, and still even more preferably from 1 to 10 nm.

EXAMPLES

The present invention will be explained more specifically hereinbelow by showing Examples and Comparative Examples, without intending to limit the present invention to the Examples set forth below.

[Average Fiber Diameters of Fine Cellulose Fibers and Fine Cellulose Fiber Composite]

Water is added to fine cellulose fibers or a fine cellulose fiber composite to provide a dispersion of which concentration is 0.0001% by mass. The dispersion is added dropwise to mica (mica), and dried to provide an observation sample. A fiber height of the cellulose fibers in the observation sample is measured with an atomic force microscope (AFM, Nanoscope III Tapping mode AFM, manufactured by Digital Instrument, a probe used being Point Probe (NCH) manufactured by NANOSENSORS. During that measurement, five or more sets of fine cellulose fibers or fine cellulose fiber composites are extracted from a microscopic image in which the cellulose fibers can be confirmed, and an average fiber diameter is calculated from those fiber heights.

[Carboxy Group Contents of Fine Cellulose Fibers and Fine Cellulose Fiber Composite]

Fine cellulose fibers or a fine cellulose fiber composite in an amount of 0.5 g on a dry mass basis is placed in a 100 mL beaker, a mixed solvent of (ion-exchanged water or methanol)/water=2/1 is added thereto to make up a total volume of 55 mL. Five milliliters of a 0.01 M aqueous sodium chloride solution is added thereto to provide a dispersion, and the dispersion is stirred until the fine cellulose fibers or the fine cellulose fiber composite is sufficiently dispersed. A 0.1 M hydrochloric acid is added to this dispersion to adjust its pH to 2.5 to 3, and a 0.05 M aqueous sodium hydroxide solution is added dropwise to the dispersion with an automated titration instrument manufactured by DKK-TOA CORPORATION under the trade name of "AUT-50," under the conditions of a waiting time of 60 seconds. The values of electroconductivity and a pH are measured every minute, and the measurements are continued up to a pH of 11 or so to obtain an electroconductivity curve. A titrated amount of sodium hydroxide is obtained from this electroconductivity curve, and the carboxy group content of the fine cellulose fibers or the fine cellulose fiber composite is calculated in accordance with the following formulas:

Carboxy Group Content (mmol/g)=Titrated Amount of Sodium Hydroxide×Aqueous Sodium Hydroxide Solution Concentration (0.05 M)/Mass of Cellulose Fibers (0.5 g)

[Average Binding Amount and Introductory Rate of Hydrocarbon Groups of Fine Cellulose Fiber Composite]

The average binding amount of the hydrocarbon groups in the fine cellulose fiber composite is calculated in accordance with the following formula:

$$\text{Binding Amount of Hydrocarbon Groups (mmol/g)} = \begin{bmatrix} \text{Carboxy Group Content} \\ \text{of Fine Cellulose} \\ \text{Fibers Before Introducing} \\ \text{Hydrocarbon (mmol/g)} \end{bmatrix} - \begin{bmatrix} \text{Carboxy Group Content} \\ \text{of Fine Cellulose} \\ \text{Fibers After Introducing} \\ \text{Hydrocarbon (mmol/g)} \end{bmatrix}$$

$$\text{Introductory Rate (\%) of Hydrocarbon Groups} = \frac{\text{Binding Amount of Hydrocarbon Groups (mmol/g)}}{\text{Carboxy Group Content in Fine Cellulose Fibers Before Introducing Hydrocarbon (mmol/g)}^\wedge} \times 100$$

Preparation Example 1 of Fine Cellulose Fibers—Dispersion of Carboxy Group-Containing Fine Cellulose Fibers Obtained by Treating Natural Cellulose with N-Oxyl Compound Needle-leaf bleached kraft pulp manufactured by Fletcher Challenge Canada Ltd., under the trade name of "Machenzie," CSF 650 ml, was used as natural cellulose fibers. As TEMPO, a commercially available product manufactured by Sigma-Aldrich Co. LLC, Free radical, 98% by mass, was used. As sodium hypochlorite, a commercially available product manufactured by Wako Pure Chemical Industries, Ltd. was used. As sodium bromide, a commercially available product manufactured by Wako Pure Chemical Industries, Ltd. was used.

First, 100 g of the needle-leaf bleached kraft pulp fibers were sufficiently stirred in 9,900 g of ion-exchanged water, and 1.25% by mass of TEMPO, 12.5% by mass of sodium bromide, and 28.4% by mass of sodium hypochlorite were added in that order to 100 g of the mass of the pulp. Using a pH stud, a 0.5 M sodium hydroxide was added dropwise to keep a pH of 10.5. After the reaction was carried out for 120 minutes, the dropwise addition of sodium hydroxide was stopped, to provide oxidized pulp. The oxidized pulp obtained was sufficiently washed with ion-exchanged water, and subsequently subjected to a dehydration treatment. Thereafter, 3.9 g of the oxidized pulp and 296.1 g of ion-exchanged water were subjected twice to a finely pulverizing treatment with a high-pressure homogenizer manufactured by Sugino Machine Limited, Starburstlabo HJP-2 5005 at 245 MPa, to provide a dispersion of carboxy group-containing fine cellulose fibers, a solid content concentration of which was 1.3% by weight. The average fiber diameter of the resulting fine cellulose fibers was 3.3 nm, and the carboxy group content was 1.2 mmol/g.

Preparation Example 2 of Fine Cellulose Fibers—Dispersion of Carboxy Group-Containing Fine Cellulose Fibers Obtained by Acidic Treatment In a beaker, 4,085 g of ion-exchanged water was added to 4,088.75 g of a dispersion of carboxy group-containing fine cellulose fibers obtained in Preparation Example 1, a solid content concentration of which was 1.3% by mass, to provide a 0.5% by mass aqueous solution, and the aqueous solution was stirred with a mechanical stirrer at room temperature for 3 hours. Next, the beaker was charged with 245 g of a 1 M aqueous hydrochloric acid solution, and the contents were allowed to react overnight at room temperature. After the termination of the reaction, the reaction mixture was reprecipitated from acetone, the precipitates were filtered, and thereafter the residue was washed with acetone/ion-exchanged water, to remove hydrochloric acid and salt. Finally, acetone was added thereto, and the mixture was filtered, to provide a dispersion of acetone-containing acidic cellulose fibers in a state that the carboxy group-containing fine cellulose fibers were swollen with acetone, a solid content concentration of which was 5.0% by mass. The average fiber diameter of the resulting fine cellulose fibers was 3.3 nm, and the carboxy group content was 1.4 mmol/g.

Preparation Example 1 of Fine Cellulose Fiber Composite

A three-neck rounded bottom flask equipped with a magnetic stirrer, a stirring paddle, and a reflux tube was charged with 400 g of the dispersion of carboxy group-containing fine cellulose fibers obtained in Preparation Example 1 of Fine Cellulose Fibers, a solid content concentration of which was 1.3% by mass. Next, the flask was charged with 1.42 g of propylamine, equivalent to 4 mol of amine groups per one mol of the carboxy groups of the fine cellulose fibers, and 9.96 g of a condensing agent 4-(4,6-dimethoxy-1,3,5-triazin-2-yl)-4-methylmorpholinium chloride (DMT-MM) to dissolve. The liquid reaction mixture was held at a pH of 7.0 and a temperature of 60° C., and allowed to react for 8 hours in a nitrogen atmosphere. The liquid reaction mixture after the termination of the reaction was dialyzed, thereby removing unreacted propylamine and DMT-MM. Finally, acetone was added thereto, and the mixture was filtered, to provide a fine cellulose fiber composite containing fine cellulose fibers and propyl groups connected thereto via an amide bond. The average binding amount of the propyl groups in the fine cellulose fiber composite was 0.20 mmol/g, and the average fiber diameter of the fine cellulose fiber composite was 3.07 nm.

Preparation Example 2 of Fine Cellulose Fiber Composite

A fine cellulose fiber composite containing fine cellulose fibers and propyl groups connected thereto via an amide bond was prepared in the same manner as in Preparation Example 1, except that the amount of propylamine was changed to 0.284 g, equivalent to 1 mol of amine groups per one mol of carboxy groups of the fine cellulose fibers, and that the amount of DMT-MM was changed to 1.99 g. The average binding amount of the propyl groups in the fine cellulose fiber composite was 0.06 mmol/g, and the average fiber diameter of the fine cellulose fiber composite was 3.07 nm.

Preparation Example 3 of Fine Cellulose Fiber Composite

A fine cellulose fiber composite containing fine cellulose fibers and hexyl groups connected thereto via an amide bond was prepared in the same manner as in Preparation Example 1, except that 1.42 g of propylamine was changed to 2.43 g of hexylamine, equivalent to 4 mol of amine groups per one mol of carboxy groups of the fine cellulose fibers. The average binding amount of the hexyl groups in the fine cellulose fiber composite was 0.53 mmol/g, and the average fiber diameter of the fine cellulose fiber composite was 3.17 nm.

Preparation Example 4 of Fine Cellulose Fiber Composite

A fine cellulose fiber composite containing fine cellulose fibers and hexyl groups connected thereto via an amide bond was prepared in the same manner as in Preparation Example 1, except that 1.42 g of propylamine was changed to 0.486 g of hexylamine, equivalent to 1 mol of amine groups per one mol of carboxy groups of the fine cellulose fibers, and that DMT-MM was changed to an amount of 1.99 g. The average binding amount of the hexyl groups in the fine cellulose fiber composite was 0.02 mmol/g, and the average fiber diameter of the fine cellulose fiber composite was 3.17 nm.

Preparation Example 5 of Fine Cellulose Fiber Composite

A four-neck rounded bottom flask equipped with a mechanical stirrer and a reflux tube was charged with 509.16 g of the dispersion of acetone-containing acidic cellulose fibers obtained in Preparation Example 2 of Fine Cellulose Fibers, a solid content concentration of which was adjusted from 5.0% by mass to 4.4% by mass, 5,000 g of isopropyl alcohol was added thereto to make a 0.5% by mass solution, and the solution was stirred at room temperature for 1 hour with the magnetic stirrer. Next, the flask was charged with 5.45 g of propylamine, equivalent to 3 mol of amine groups per one mol of carboxy groups of the fine cellulose fibers, and 26.38 g of DMT-MM to dissolve, and the contents were allowed to react overnight at room temperature. After the termination of the reaction, the reaction mixture was filtered, and thereafter the residue was washed with methanol/ion-exchanged water to remove unreacted propylamine and DMT-MM. Finally, acetone was added thereto, and the mixture was filtered, to provide a fine cellulose fiber composite containing fine cellulose fibers and propyl groups connected thereto via an amide bond. The average binding amount of the propyl groups in the fine cellulose fiber composite was 0.79 mmol/g, and the average fiber diameter of the fine cellulose fiber composite was 3.17 nm.

Preparation Example 6 of Fine Cellulose Fiber Composite

A four-neck rounded bottom flask equipped with a mechanical stirrer and a reflux tube was charged with 93.02 g of the dispersion of acetone-containing acidic cellulose fibers obtained in Preparation Example 2 of Fine Cellulose Fibers, a solid content concentration of which was adjusted from 5.0% by mass to 4.4% by mass, 800 g of t-butyl alcohol was added thereto to make a 0.5% by mass solution, and the solution was stirred at room temperature for 1 hour. Next, the flask was charged with 1.46 g of hexylamine, equivalent to 3 mol of amine groups per one mol of carboxy groups of the fine cellulose fibers, and 4.12 g of DMT-MM to dissolve, and the contents were allowed to react at 60° C. for 4 hours. Thereafter, the flask was further charged with 1.46 g of hexylamine, equivalent to 3 mol of amine groups per one mol of carboxy groups of the fine cellulose fibers, and 4.12 g of DMT-MM to dissolve, and the contents were allowed to react at 60° C. for 4 hours. After the termination of the reaction, the reaction mixture was filtered, and thereafter the residue was washed with ethanol/ion-exchanged water to remove unreacted hexylamine and DMT-MM. Finally, acetone was added thereto, and the mixture was filtered, to provide a fine cellulose fiber composite containing fine cellulose fibers and hexyl groups connected thereto via an amide bond. The average binding amount of the hexyl groups in the fine cellulose fiber composite was 0.81 mmol/g, and the average fiber diameter of the fine cellulose fiber composite was 3.07 nm.

Preparation Example 7 of Fine Cellulose Fiber Composite

A four-neck rounded bottom flask equipped with a mechanical stirrer and a reflux tube was charged with 488.80 g of the dispersion of acetone-containing acidic cellulose fibers obtained in Preparation Example 2 of Fine Cellulose Fibers, a solid content concentration of which was adjusted from 5.0% by mass to 4.4% by mass, 4,800 g of t-butyl alcohol was added thereto to make a 0.5% by mass solution, and the solution was stirred at room temperature for 1 hour. Next, the flask was charged with 17.50 g of octadecylamine, equivalent to 2 mol of amine groups per one mol of carboxy groups of the fine cellulose fibers, and 17.97 g of DMT-MM. After having confirmed of being dissolved, the contents were allowed to react at 55° C. for 6 hours. After the termination of the reaction, the reaction mixture was filtered, and thereafter the residue was washed with methanol/ion-exchanged water to remove unreacted octadecylamine and DMT-MM. Finally, acetone was added thereto, and the mixture was filtered, to provide a fine cellulose fiber composite containing fine cellulose fibers and octadecylamine groups connected thereto via an amide bond. The average binding amount of the octadecylamine groups in the fine cellulose fiber composite was 0.64 mmol/g, and the average fiber diameter of the fine cellulose fiber composite was 3.94 nm.

Preparation Example 8 of Fine Cellulose Fiber Composite

The dispersion of acetone-containing acidic cellulose fibers obtained in Preparation Example 2 of Fine Cellulose Fibers, a solid content concentration of which was 5.0% by mass, was placed in a beaker equipped with stirring blades, and diluted with ion-exchanged water to a solid content concentration of 1.0% by mass to provide a dispersion. This dispersion was adjusted to near a pH of 8.0 with a 10% aqueous tetrabutylammonium hydroxide solution, Wako Pure Chemical Industries, to provide a fine cellulose treated with an organo-onium, hereinafter referred to as "finely modified cellulose." This finely modified cellulose was lyophilized.

The above-mentioned finely modified cellulose in an amount of 1.0 part by mass was transferred to a beaker, and 100 parts by mass of dimethylformamide was added thereto to carry out a dispersion treatment for 10 minutes with a homogenizer. Further, as an alkylating agent, 10.2 parts by mass of propyl iodide was added thereto, the reaction temperature was then set at 25° C., and the contents were allowed to react for about 48 hours. The reaction mixture was washed with methanol, and thereafter dried under a reduced pressure over entire day and night, to provide a fine cellulose fiber composite containing fine cellulose fibers and propyl groups connected thereto via an ester bond. The average binding amount of the propyl groups in the fine cellulose fiber composite was 0.73 mmol/g, and the average fiber diameter of the fine cellulose fiber composite was 3.02 nm.

Preparation Example 9 of Fine Cellulose Fiber Composite

A fine cellulose fiber composite containing fine cellulose fibers and propyl groups connected thereto via an ester bond was prepared in the same manner as in Preparation Example 8, except that 10.2 parts by mass of propyl iodide was changed to 12.7 parts by mass of hexyl iodide. The average binding amount of the hexyl groups in the fine cellulose fiber composite was 0.67 mmol/g, and the average fiber diameter of the fine cellulose fiber composite was 3.28 nm.

Preparation Example 10 of Fine Cellulose Fiber Composite

A beaker was charged with 159.00 g of a dispersion of acetone-containing acidic cellulose fibers obtained in Preparation Example 2 of Fine Cellulose Fibers, a solid content concentration of which was adjusted from 5.0% by mass to 4.4% by mass, and 1,400 g of ion-exchanged water was added thereto to make a 0.5% by mass aqueous solution. The contents were stirred at room temperature for 1 hour with a magnetic stirrer. Next, the beaker was charged with 2.86 g of propylamine, and the contents were allowed to react at room temperature for 6 hours. After the termination of the reaction, the mixture was concentrated under a reduced pressure to remove unreacted propylamine, and further diluted with ion-exchanged water, and the dilution was subjected to dialysis. Thereafter, the dialyzed solution was lyophilized, to provide a fine cellulose fiber composite containing fine cellulose fibers and propyl groups connected thereto via an ionic bond. The average binding amount of the propyl groups in the fine cellulose fiber composite was 1.15 mmol/g, and the average fiber diameter of the fine cellulose fiber composite was 2.49 nm.

Preparation Example 11 of Fine Cellulose Fiber Composite

A beaker was charged with 159.11 g of a dispersion of acetone-containing acidic cellulose fibers obtained in Preparation Example 2 of Fine Cellulose Fibers, a solid content concentration of which was adjusted from 5.0% by mass to 4.4% by mass, and 1,400 g of ion-exchanged water was added thereto to make a 0.5% by mass aqueous solution. The contents were stirred at room temperature for 1 hour with a magnetic stirrer. Next, the beaker was charged with 4.89 g of hexylamine, and the contents were allowed to react at room temperature for 6 hours. After the termination of the reaction, the liquid reaction mixture was subjected to dialysis to remove unreacted hexylamine. Thereafter, the dialyzed solution was lyophilized, to provide a fine cellulose fiber composite containing fine cellulose fibers and hexyl groups connected thereto via an ionic bond. The average binding amount of the hexyl groups in the fine cellulose fiber composite was 0.82 mmol/g, and the average fiber diameter of the fine cellulose fiber composite was 2.91 nm.

Preparation Example 12 of Fine Cellulose Fiber Composite

A beaker was charged with 22.72 g of a dispersion of acetone-containing acidic cellulose fibers obtained in Preparation Example 2 of Fine Cellulose Fibers, a solid content concentration of which was adjusted from 5.0% by mass to 4.4% by mass, and 133 g of isopropyl alcohol and 67 g of ion-exchanged water were added thereto to make a 0.5% by mass aqueous solution. The contents were stirred at room temperature for 1 hour with a magnetic stirrer. Next, the beaker was charged with 1.86 g of octadecylamine, and after having confirmed of being dissolved, the contents were allowed to react at room temperature for 12 hours. After the termination of the reaction, the reaction mixture was filtered, and thereafter washed with ethanol to remove unreacted octadecylamine. Finally, acetone was added, and the mixture was filtered, to provide a fine cellulose fiber composite containing fine cellulose fibers and octadecyl groups connected thereto via an ionic bond. The average binding amount of the octadecyl groups in the fine cellulose fiber composite was 0.75 mmol/g, and the average fiber diameter of the fine cellulose fiber composite was 3.18 nm.

Preparation Example 13 of Fine Cellulose Fiber Composite

A 1,000 mL beaker equipped with a magnetic stirrer and a stirring paddle was charged with 400 g of a dispersion of carboxy group-containing fine cellulose fibers obtained in Preparation Example 1 of Fine Cellulose Fibers, a solid content concentration of which was 1.3% by mass. Next, the beaker was charged with 6.22 g of tetrabutylammonium hydroxide, calculated as an effective ingredient, to dissolve, and the liquid reaction mixture was allowed to react at room temperature for 8 hours. After the termination of the reaction, acetone was added, and the mixture was filtered, to provide a fine cellulose fiber composite containing fine cellulose fibers and tetrabutylammonium groups connected thereto via an ionic bond. The average binding amount of the tetrabutylammonium groups in the fine cellulose fiber composite was 0.93 mmol/g, and the average fiber diameter of the fine cellulose fiber composite was 2.58 nm.

Preparation Example 14 of Fine Cellulose Fiber Composite

A four-neck rounded bottom flask equipped with a mechanical stirrer and a reflux tube was charged with 79.29 g of a dispersion of acetone-containing acidic cellulose fibers obtained in Preparation Example 2 of Fine Cellulose Fibers, a solid content concentration of which was adjusted from 5.0% by mass to 3.3% by mass, 800 g of isopropyl alcohol was added thereto to make a 0.3% by mass aqueous solution, and the aqueous solution was stirred at room temperature for 1 hour. Next, the flask was charged with 1.19 g of dodecylamine, equivalent to 2 mol of amine groups per one mol of the carboxy groups of the fine cellulose fibers, and 1.78 g of DMT-MM to dissolve, and the contents were then allowed to react at 50° C. for 4 hours. After the termination of the reaction, the reaction mixture was filtered, and the residue was then washed with ethanol/ion-exchanged water to remove unreacted dodecylamine and DMT-MM. Finally, acetone was added, and the mixture was filtered, to provide a fine cellulose fiber composite containing fine cellulose fibers and dodecyl groups connected thereto via an amide bond. The average binding amount of the dodecyl groups in the fine cellulose fiber composite was 0.75 mmol/g, and the average fiber diameter of the fine cellulose fiber composite was 7.33 nm.

Preparation Example 15 of Fine Cellulose Fiber Composite

A four-neck rounded bottom flask equipped with a mechanical stirrer and a reflux tube was charged with 51.55 g of a dispersion of acetone-containing acidic cellulose fibers obtained in Preparation Example 2 of Fine Cellulose Fibers, a solid content concentration of which was adjusted from 5.0% by mass to 3.5% by mass, 400 g of isopropyl alcohol was added thereto to make a 0.5% by mass aqueous solution, and the aqueous solution was stirred at room temperature for 1 hour. Next, the flask was charged with 0.62 g of 2-ethylhexylamine, equivalent to 2.0 mol of amine groups per one mol of the carboxy groups of the fine cellulose fibers, and 1.33 g of DMT-MM to dissolve, and the contents were then allowed to react at 50° C. for 6 hours. After the termination of the reaction, the reaction mixture was filtered, and the residue was then washed with methanol/ion-exchanged water to remove unreacted dodecylamine and DMT-MM. Finally, acetone was added, and the mixture was filtered, to provide a fine cellulose fiber composite containing fine cellulose fibers and 2-ethylhexyl groups connected thereto via an amide bond. The average binding amount of the 2-ethylhexyl groups in the fine cellulose fiber composite was 0.58 mmol/g, and the average fiber diameter of the fine cellulose fiber composite was 4.17 nm.

Preparation Example 1 of Plasticizer—Diester Formed Between Succinic Acid and Triethylene Glycol Monomethyl Ether A 3-L flask equipped with a stirrer, a thermometer, and a dehydration tube was charged with 500 g of succinic anhydride, 2,463 g of triethylene glycol monomethyl ether, and 9.5 g of paratoluenesulfonic acid monohydrate, and the contents were allowed to react at 110° C. for 15 hours under a reduced pressure of from 4 to 10.7 kPa, while blowing nitrogen at 500 mL/min in a space portion. The liquid reaction mixture had an acid value of 1.6 mgKOH/g. To the liquid reaction mixture was added 27 g of an adsorbent KYOWAAD 500SH manufactured by Kyowa Chemical Industry Co., Ltd., and the mixture was stirred at 80° C. and 2.7 kPa for 45 minutes, and filtered. Thereafter, triethylene glycol monomethyl ether was distilled off at a liquid temperature of from 115° to 200° C. and a pressure of 0.03 kPa, and after cooling to 80° C., the residue was filtered under a reduced pressure, to provide a diester formed between succinic acid and triethylene glycol monomethyl ether as a filtrate. The diester obtained had an acid value of 0.2 mgKOH/g, a saponification value of 276 mgKOH/g, a hydroxyl value of 1 mgKOH/g or less, and a hue APHA of 200.

Preparation Example 2 of Plasticizer—Oligoester Compound Formed Between Dimethyl Succinate and 1,3-Propanediol A four-necked flask equipped with a stirrer, a thermometer, a dropping funnel, a distillation tube, and a nitrogen blowing tube was charged with 521 g (6.84 mol) of 1,3-propanediol and 5.9 g of a 28% by weight sodium methoxide-containing methanol solution (sodium methoxide: 0.031 mol) as a catalyst, and methanol was distilled off, while stirring the contents at 120° C. and a normal pressure for 0.5 hours. Thereafter, 1,500 g (10.26 mol) of dimethyl succinate manufactured by Wako Pure Chemical Industries, Ltd. was added dropwise thereto over 1 hour, and the contents were allowed to react at 120° C. and a normal pressure to distill off methanol formed by the reaction. Next, the temperature was cooled to 60° C., and 5.6 g of a 28% by weight sodium methoxide-containing methanol solution (sodium methoxide: 0.029 mol) was supplied thereto. The temperature was raised to 120° C. over 2 hours, and the pressure was then gradually dropped from a normal pressure to 3.7 kPa over 1 hour, to distill off methanol. Thereafter, the temperature was cooled to 80° C., 18 g of KYOWAAD 600S manufactured by Kyowa Chemical Industry Co., Ltd. was added thereto, and the mixture was stirred at 80° C. and a pressure of 4.0 kPa for 1 hour, and then filtered under a reduced pressure. The temperature of the filtrate was raised from 85° to 194° C. at a pressure of 0.1 kPa over 2.5 hours to distill off the residual dimethyl succinate, to provide a yellow liquid at an ambient temperature. Here, the amount of the catalyst used was 0.58 mol per 100 mol of the dicarboxylic acid ester.

Example A-1

A fine cellulose fiber composite obtained in Preparation Example 1 of Fine Cellulose Fiber Composite in an amount of 0.05 g as calculated on a solid basis and 5 g of a diester of methyl triglycol succinate, synthesized in Preparation Example 1 of Plasticizer, as a dispersion medium were mixed, and stirred for 3 minutes with a ultrasonication agitator UP200H manufactured by Hielscher Ultrasonics GmbH. Thus, a dispersion of a fine cellulose fiber composite containing a fine cellulose fiber composite and a plasticizer, a concentration of the fine cellulose fiber composite of which was 1% by mass, was prepared. The amount 5.05 g of this dispersion of a fine cellulose fiber composite, 50 g of a polylactic acid, manufactured by Nature Works LLC, under the trade name of NW4032D, and 0.15 g of a crystal nucleating agent manufactured by Nippon Kasei Chemical Co., Ltd., ethylenebis 12-hydroxystearamide, under the trade name of SLIPACKS H were sequentially added, and the components were kneaded with a kneader manufactured by TOYO SEIKI SEISAKU-SHO, LTD., Labo-plastomill, at a rotational speed of 50 rpm at 180° C. for 10 minutes, to provide a homogeneous mixture. The homogeneous mixture was pressed with a press machine manufactured by TOYO SEIKI SEISAKU-SHO, LTD. under the trade name of Labo-press, under the conditions sequentially of 180° C. and 5 kg/cm$^2$ for 2 minutes, 200 kg/cm$^2$ for 2 minutes, 15° C. and 5 kg/cm$^2$ for 1 minute, and 80° C. and 5 kg/cm$^2$ for 1 minute, to provide a sheet-like composite material having a thickness of about 0.4 mm.

Example A-2

A composite material was produced in the same manner as in Example A-1, except that a fine cellulose fiber composite was changed to a fine cellulose fiber composite obtained in Preparation Example 2.

Example A-3

A composite material was produced in the same manner as in Example A-1, except that a fine cellulose fiber composite was changed to a fine cellulose fiber composite obtained in Preparation Example 5, and an amount used was changed to 0.025 g as calculated on a solid basis.

Example A-4

A composite material was produced in the same manner as in Example A-1, except that a fine cellulose fiber composite was changed to a fine cellulose fiber composite obtained in Preparation Example 5.

Example A-5

A composite material was produced in the same manner as in Example A-4, except that an acetone-containing fine cellulose fiber composite obtained in Preparation Example 5 was used in an amount of 0.10 g as calculated on a solid basis.

Example A-6

A composite material was produced in the same manner as in Example A-1, except that a fine cellulose fiber composite was changed to a fine cellulose fiber composite obtained in Preparation Example 3.

Example A-7

A composite material was produced in the same manner as in Example A-1, except that a fine cellulose fiber composite was changed to a fine cellulose fiber composite obtained in Preparation Example 4.

Example A-8

A composite material was produced in the same manner as in Example A-1, except that a fine cellulose fiber composite was changed to a fine cellulose fiber composite obtained in Preparation Example 6.

Example A-9

A composite material was produced in the same manner as in Example A-1, except that a fine cellulose fiber composite was changed to a fine cellulose fiber composite obtained in Preparation Example 14.

Example A-10

A composite material was produced in the same manner as in Example A-1, except that a fine cellulose fiber composite was changed to a fine cellulose fiber composite obtained in Preparation Example 7.

Example A-11

A dispersion of a fine cellulose fiber composite prepared in the same manner as in Example A-4 in an amount of 5.05 g as calculated on a solid basis and 50 g of a polyethylene terephthalate manufactured by RP TOPLA LIMITED, under the trade name of NOACRYSTAL-V were sequentially added, and a mixture was kneaded with a kneader Labo-plastomill at a rotational speed of 50 rpm and 260° C. for 10 minutes to provide a homogeneous mixture. The homogeneous mixture was pressed with a press machine Labo-press, under the conditions sequentially of 260° C. and 5 kg/cm$^2$ for 2 minutes, 200 kg/cm$^2$ for 2 minutes, 15° C. and 5 kg/cm$^2$ for 1 minute, and 120° C. and 5 kg/cm$^2$ for 2 minutes, to provide a sheet-like composite material having a thickness of about 0.4 mm.

Example A-12

A composite material was produced in the same manner as in Example A-1, except that a fine cellulose fiber composite was changed to a fine cellulose fiber composite obtained in Preparation Example 15.

Example A-13

A composite material was produced in the same manner as in Example A-4, except that the kind of the plasticizer was changed to MeSA-1,3PD synthesized in Preparation Example 2 of Plasticizer.

Example A-14

A composite material was produced in the same manner as in Example A-4, except that the kind of the plasticizer was changed to DAIFATTY-101 manufactured by DAIHACHI CHEMICAL INDUSTRY CO., LTD.

Example A-15

A composite material was produced in the same manner as in Example A-4, except that a crystal nucleating agent, SLIPACKS H, was not added.

Comparative Example A-1

A composite material was produced in the same manner as in Example A-1, except that a fine cellulose fiber composite was changed to a fine cellulose fiber composite obtained in Preparation Example 8.

Comparative Example A-2

A composite material was produced in the same manner as in Example A-1, except that a fine cellulose fiber composite was changed to a fine cellulose fiber composite obtained in Preparation Example 9.

Comparative Example A-3

A composite material was produced in the same manner as in Example A-1, except that a fine cellulose fiber composite was changed to a fine cellulose fiber composite obtained in Preparation Example 10.

Comparative Example A-4

A composite material was produced in the same manner as in Example A-1, except that a fine cellulose fiber composite was changed to a fine cellulose fiber composite obtained in Preparation Example 11.

Comparative Example A-5

A composite material was produced in the same manner as in Example A-1, except that a fine cellulose fiber composite was changed to a fine cellulose fiber composite obtained in Preparation Example 12.

Comparative Example A-6

A composite material was produced in the same manner as in Example A-1, except that a fine cellulose fiber composite was changed to a fine cellulose fiber composite obtained in Preparation Example 13.

Comparative Example A-7

Acetone-containing fine cellulose fibers obtained by reprecipitating a dispersion of fine cellulose fibers obtained in Production Example 1 with acetone, in an amount of 0.05 g, calculated as solid basis, and 5 g of a diester of methyl triglycol succinate, synthesized in Preparation Example 1 of Plasticizer, as a dispersion medium were mixed, and stirred for 3 minutes with a ultrasonication agitator UP200H manufactured by Hielscher Ultrasonics GmbH. Thus, a dispersion of a fine cellulose fiber composite containing a fine cellulose fiber composite and a plasticizer, a concentration of the fine cellulose fiber composite of which was 1% by mass, was prepared. The amount 5.05 g of this dispersion of a fine cellulose fiber composite, 50 g of a polylactic acid, manufactured by Nature Works LLC, under the trade name of NW4032D, and 0.15 g of a crystal nucleating agent manufactured by Nippon Kasei Chemical Co., Ltd., ethylenebis 12-hydroxystearamide, under the trade name of SLIPACKS H were sequentially added, and components were kneaded with a kneader manufactured by TOYO SEIKI SEISAKU-SHO, LTD. under the trade name of Labo-plastomill, at a rotational speed of 50 rpm at 180° C. for 10 minutes, to provide a homogeneous mixture. The homogeneous mixture was pressed with a press machine manufactured by TOKYO SEIKI SEISAKU-SHO, LTD. under the trade name of Labo-press, under the conditions sequentially of 180° C. and 5 kg/cm$^2$ for 2 minutes, 200 kg/cm$^2$ for 2 minutes, 15° C. and 5 kg/cm$^2$ for 1 minute, and 80° C. and 5 kg/cm$^2$ for 1 minute, to provide a sheet-like composite material having a thickness of about 0.4 mm.

Comparative Example A-8

A composite material was produced in the same manner as in Example A-1, except that a dispersion of a fine cellulose fiber composite was changed to a diester of methyl triglycol succinate, synthesized in Preparation Example 1 of Plasticizer, not containing a fine cellulose fine fiber composite.

Comparative Example A-9

A composite material was produced in the same manner as in Example-11, except that a fine cellulose fiber composite was not added.

Here, the raw materials in Tables 1 to 6 are as follows.
<Polyester Resin>
NW4032D: Polylactic acid resin, manufactured by Nature Works LLC, poly-L-lactic acid, Nature Works 4032D, optical purity: 98.5%, melting point: 160° C., weight-average molecular weight: 141,000
NOACRYSTAL-V: Polyethylene terephthalate resin, manufactured by RP TOPLA LIMITED, A-PET, melting point: 250° C.
<Crystal Nucleating Agent>
SLIPACKS H: Ethylenebis 12-hydroxystearamide, manufactured by Nippon Kasei Chemical Co., Ltd.
<Plasticizer>
(MeEO$_3$)$_2$SA: A diester formed between succinic acid and triethylene glycol monomethyl ether, prepared in Preparation Example 1 of Plasticizer MeSA-1,3PD: An oligoester compound formed between dimethyl succinate and 1,3-propanediol, prepared in Preparation Example 2 of Plasticizer
DAIFATTY-101: A diester compound formed between adipic acid and an equivolume mixture of methyl diglycol/benzyl ester, manufactured by DAIHACHI CHEMICAL INDUSTRY CO., LTD.

The properties of the resulting molded articles were evaluated in accordance with the methods of the following Test Examples A-1 to A-3. The results are shown in Tables 1 to 6.

Test Example A-1—Elasticity

Each of the tensile modulus and the tensile strength at yield of the molded article was measured using a tensile compression testing machine manufactured by Shimadzu Corporation, under the trade name of "Autograph AGS-X" as prescribed in JIS K7113. Samples punched through with No. 2 dumbbell were set at a span of 80 mm and measured at a crosshead speed of 50 mm/min. It is shown that the higher the elasticity, the more excellent the mechanical strength.

Test Example A-2—Transparency

Haze values were measured with a haze meter Model HM-150, manufactured by MURAKAMI COLOR RESEARCH LABORATORY CO., Ltd., and the Haze values were used as indexes for transparency. It is shown that the lower the numerical values, the more excellent the transparency.

Test Example A-3—Thermal Stability

The YI (Yellow Index) values of the molded articles were measured with a spectrocolorimeter manufactured by JEOL, SE2000. It is shown that the lower the numerical values, the more excellent the thermal stability.

TABLE 1

| Raw Materials for Polyester Resin Composition, parts by weight | | | Examples | | | | |
|---|---|---|---|---|---|---|---|
| | | | A-1 | A-2 | A-3 | A-4 | A-5 |
| Polyester Resin | NW4032D | | 100 | 100 | 100 | 100 | 100 |
| Fine Cellulose Fiber Composite | Preparation Example of Fine Cellulose Fiber Composite | | 1 | 2 | 5 | 5 | 5 |
| | Fine Cellulose Fibers | Average Fiber Diameter, nm | 3.3 | 3.3 | 3.3 | 3.3 | 3.3 |
| | | Carboxy Group Content, mmol/g | 1.2 | 1.2 | 1.4 | 1.4 | 1.4 |
| | Substituent | Kind | propyl group | propyl group | propyl group | propyl group | propyl group |
| | | Binding Form | amide bond | amide bond | amide bond | amide bond | amide bond |
| | | Average Binding Amount, mmol/g | 0.20 | 0.06 | 0.79 | 0.79 | 0.79 |
| | | Introductory Rate, % | 17 | 5 | 56 | 56 | 56 |
| | Average Fiber Diameter of Composite, nm | | 3.07 | 3.07 | 3.17 | 3.17 | 3.17 |
| | Carboxy Group Content of Composite, mmol/g | | 1.00 | 1.14 | 0.61 | 0.61 | 6.61 |
| | Content | | 0.1 | 0.1 | 0.05 | 0.1 | 0.2 |

TABLE 1-continued

|  | Raw Materials for Polyester Resin Composition, parts by weight | A-1 | A-2 | A-3 | A-4 | A-5 |
|---|---|---|---|---|---|---|
| Plasticizer | (MeEO₃)₂SA | 10 | 10 | 10 | 10 | 10 |
| Crystal Nucleating Agent | SLIPACKS H | 0.3 | 0.3 | 0.3 | 0.3 | 0.3 |
| Properties |  |  |  |  |  |  |
| Tensile Modulus, GPa |  | 2.0 | 1.9 | 2.0 | 2.3 | 2.4 |
| Transparency, Haze, % |  | 8.8 | 9.1 | 7.8 | 8.0 | 8.2 |
| Thermal Stability, YI Value |  | 0.7 | 0.7 | 0.7 | 0.7 | 0.7 |

TABLE 2

|  | Raw Materials for Polyester Resin Composition, parts by weight |  | A-6 | A-7 | A-8 | A-9 | A-10 |
|---|---|---|---|---|---|---|---|
| Polyester Resin | NW4032D |  | 100 | 100 | 100 | 100 | 100 |
| Fine Cellulose Fiber Composite | Preparation Example of Fine Cellulose Fiber Composite |  | 3 | 4 | 6 | 14 | 7 |
|  | Fine Cellulose Fibers | Average Fiber Diameter, nm | 3.3 | 3.3 | 3.3 | 3.3 | 3.3 |
|  |  | Carboxy Group Content, mmol/g | 1.2 | 1.2 | 1.4 | 1.4 | 1.4 |
|  | Substituent | Kind | hexyl group | hexyl group | hexyl group | dodecyl group | octadecyl group |
|  |  | Binding Form | amide bond | amide bond | amide bond | amide bond | amide bond |
|  |  | Average Binding Amount, mmol/g | 0.53 | 0.02 | 0.81 | 0.75 | 0.64 |
|  |  | Introductory Rate, % | 44 | 1.7 | 58 | 54 | 46 |
|  | Average Fiber Diameter of Composite, nm |  | 3.17 | 3.17 | 3.07 | 7.33 | 3.94 |
|  | Carboxy Group Content of Composite, mmol/g |  | 0.67 | 1.18 | 0.59 | 0.65 | 0.76 |
|  | Content |  | 0.1 | 0.1 | 0.1 | 0.1 | 0.1 |
| Plasticizer | (MeEO₃)₂SA |  | 10 | 10 | 10 | 10 | 10 |
| Crystal Nucleating Agent | SLIPACKS H |  | 0.3 | 0.3 | 0.3 | 0.3 | 0.3 |
| Properties |  |  |  |  |  |  |  |
| Tensile Modulus, GPa |  |  | 2.1 | 1.8 | 2.2 | 2.1 | 1.8 |
| Transparency, Haze, % |  |  | 9.3 | 10.0 | 8.8 | 9.0 | 11 |
| Thermal Stability, YI Value |  |  | 0.8 | 0.8 | 0.8 | 0.8 | 0.9 |

TABLE 3

|  | Raw Materials for Polyester Resin Composition, parts by weight |  | A-11 | A-12 | A-13 | A-14 | A-15 |
|---|---|---|---|---|---|---|---|
| Polyester Resin | NW4032D |  | — | 100 | 100 | 100 | 100 |
|  | NOACRYSTAL-V |  | 100 | — | — | — | — |
| Fine Cellulose Fiber Composite | Preparation Example of Fine Cellulose Fiber Composite |  | 5 | 15 | 5 | 5 | 5 |
|  | Fine Cellulose Fibers | Average Fiber Diameter, nm | 3.3 | 3.3 | 3.3 | 3.3 | 3.3 |
|  |  | Carboxy Group Content, mmol/g | 1.4 | 1.4 | 1.4 | 1.4 | 1.4 |
|  | Substituent | Kind | propyl group | 2-ethylhexyl group | propyl group | propyl group | propyl group |
|  |  | Binding Form | amide bond | amide bond | amide bond | amide bond | amide bond |
|  |  | Average Binding Amount, mmol/g | 0.79 | 0.58 | 0.79 | 0.79 | 0.79 |
|  |  | Introductory Rate, % | 56 | 41 | 56 | 56 | 56 |
|  | Average Fiber Diameter of Composite, nm |  | 3.17 | 4.17 | 3.17 | 3.17 | 3.17 |
|  | Carboxy Group Content of Composite, mmol/g |  | 0.61 | 1.18 | 0.61 | 0.61 | 0.61 |
|  | Content |  | 0.1 | 0.1 | 0.1 | 0.1 | 0.1 |
| Plasticizer | (MeEO₃)₂SA |  | 10 | 10 | — | — | 10 |
|  | MeSA-1,3PD |  | — | — | 10 | — | — |
|  | DAIFATTY-101 |  | — | — | — | 10 | — |
| Crystal Nucleating Agent | SLIPACKS H |  | — | 0.3 | 0.3 | 0.3 | — |
| Properties |  |  |  |  |  |  |  |
| Tensile Modulus, GPa |  |  | 2.8 | 2.2 | 2.4 | 2.5 | 2.0 |
| Transparency, Haze, % |  |  | 5.1 | 8.9 | 8.2 | 8.5 | 10.5 |
| Thermal Stability, YI Value |  |  | 0.5 | 0.8 | 0.6 | 0.8 | 0.8 |

TABLE 4

| Raw Materials for Polyester Resin Composition, parts by weight | | | Comparative Examples | |
|---|---|---|---|---|
| | | | A-1 | A-2 |
| Polyester Resin | NW4032D | | 100 | 100 |
| Fine Cellulose Fiber Composite | Preparation Example of Fine Cellulose Fiber Composite | | 8 | 9 |
| | Fine Cellulose Fibers | Average Fiber Diameter, nm | 3.3 | 3.3 |
| | | Carboxy Group Content, mmol/g | 1.4 | 1.4 |
| | Substituent | Kind | propyl group | hexyl group |
| | | Binding Form | ester bond | ester bond |
| | | Average Binding Amount, mmol/g | 0.73 | 0.67 |
| | | Introductory Rate, % | 52 | 48 |
| | Average Fiber Diameter of Composite, nm | | 3.02 | 3.28 |
| | Carboxy Group Content of Composite, mmol/g | | 0.47 | 0.53 |
| | Content | | 0.1 | 0.1 |
| Plasticizer | $(MeEO_3)_2SA$ | | 10 | 10 |
| Crystal Nucleating Agent | SLIPACKS H | | 0.3 | 0.3 |
| Properties | | | | |
| Tensile Modulus, GPa | | | 1.3 | 1.3 |
| Transparency, Haze, % | | | N.D. | N.D. |
| Thermal Stability, YI Value | | | 2.0 | 2.1 |

TABLE 5

| Raw Materials for Polyester Resin Composition, parts by weight | | | Comparative Examples | | |
|---|---|---|---|---|---|
| | | | A-3 | A-4 | A-5 |
| Polyester Resin | NW4032D | | 100 | 100 | 100 |
| Fine Cellulose Fiber Composite | Preparation Example of Fine Cellulose Fiber Composite | | 10 | 1.1 | 12 |
| | Fine Cellulose Fibers | Average Fiber Diameter, nm | 3.3 | 3.3 | 3.3 |
| | | Carboxy Group Content, mmol/g | 1.4 | 1.4 | 1.4 |
| | Substituent | Kind | propyl group | hexyl group | octadecyl group |
| | | Binding Form | ionic bond | ionic bond | ionic bond |
| | | Average Binding Amount, mmol/g | 1.15 | 0.82 | 0.75 |
| | | Introductory Rate, % | 82 | 59 | 54 |
| | Average Fiber Diameter of Composite, nm | | 2.49 | 2.91 | 3.18 |
| | Carboxy Group Content of Composite, mmol/g | | 0.25 | 0.58 | 0.65 |
| | Content | | 0.1 | 0.1 | 0.1 |
| Plasticizer | $(MeEO_3)_2SA$ | | 10 | 10 | 10 |
| Crystal Nucleating Agent | SLIPACKS H | | 0.3 | 0.3 | 0.3 |
| Properties | | | | | |
| Tensile Modulus, GPa | | | 1.6 | 1.6 | 1.5 |
| Transparency, Haze, % | | | 13 | 14 | 17 |
| Thermal Stability, YI Value | | | 3.6 | 3.7 | 3.8 |

TABLE 6

| Raw Materials for Polyester Resin Composition, parts by weight | | | Comparative Examples | | | |
|---|---|---|---|---|---|---|
| | | | A-6 | A-7 | A-8 | A-9 |
| Polyester Resin | NW4032D | | 100 | 100 | 100 | — |
| | NOACRYSTAL-V | | — | — | — | 100 |
| Fine Cellulose Fiber Composite | Preparation Example of Fine Cellulose Fiber Composite | | 13 | — | — | — |
| | Fine Cellulose Fibers | Average Fiber Diameter, nm | 3.3 | 3.3 | — | — |
| | | Carboxy Group Content, mmol/g | 1.4 | 1.2 | — | — |
| | Substituent | Kind | TBAH group[1] | — | — | — |
| | | Binding Form | ionic bond | — | — | — |
| | | Average Binding Amount, mmol/g | 0.93 | — | — | — |
| | | Introductory Rate, % | 66 | — | — | — |
| | Average Fiber Diameter of Composite, nm | | 2.58 | — | — | — |
| | Carboxy Group Content of Composite, mmol/g | | 0.47 | — | — | — |
| | Content | | 0.1 | 0.1 | — | — |
| Plasticizer | $(MeEO_3)_2SA$ | | 10 | 10 | 10 | 10 |
| Crystal Nucleating Agent | SLIPACKS H | | 0.3 | 0.3 | 0.3 | — |
| Properties | | | | | | |
| Tensile Modulus, GPa | | | 1.7 | 1.5 | 1.3 | 2.1 |
| Transparency, Haze, % | | | 11.0 | 17.0 | 7.0 | 3.2 |
| Thermal Stability, YI Value | | | 2.8 | 1.2 | 0.7 | 0.5 |

[1] TBAH group: tetrabutylammonium hydroxide group

As is clear from the results of Tables 1 to 6, when comparison is made between those composites of which alkyl groups have the same length, it is possible to remarkably improve mechanical strength of the resin composition without hampering transparency of the resin composition, when the fine cellulose fiber composite of the present invention is added to the resin. Further, it can be seen that the fine cellulose fiber composite of the present invention has excellent thermal stability as compared to other fine cellulose fiber composites, so that the yellowing degree after the fine cellulose fiber composite is formed into a resin composition is low, showing its less likeliness to be discolored.

Examples B-1 to B-10 and Comparative Examples B-1 to B-4

Preparation of Polyester Resin Compositions

Raw materials for compositions as listed in Tables 7 to 9 were added in a single batch to a twin-screw extruder manufactured by Ikegai Corporation, PCM-45 from a raw material supplying inlet, and melt-kneaded at a rotational speed of 100 r/min and a melt-kneading temperature of 190° C., and the kneaded mixture was strand-cut, to provide pellets of a polyester resin composition. The pellets obtained were dried at 80° C. for 5 hours with a dehumidifier, so as to have a water content of 500 ppm or less. Here, in Comparative Example B-1, pellets were prepared in the same manner as in Example B-1, using a dispersion of fine cellulose fibers obtained in Production Example 1 in a content as listed in Table 9 calculated on a solid basis.

The pellets were melt-kneaded with a T die twin-screw extruder manufactured by The Japan Steel Works, Ltd., TEX44αII, at a rotational speed of 120 r/min and a melt-kneading temperature of 200° C., and a sheet-like composition, i.e. a sheet for thermoforming, having a thickness of 0.3 mm was extruded from the T die, and contacted with a cooling roller of which surface temperature was controlled to 20° C. for 2 seconds, to provide an amphorous sheet, thickness: 0.3 mm.

Preparation of Thermoformed Articles

Next, with a single-step vacuum pressure molding machine manufactured by WAKISAKA Co., Ltd., FVS-500P WAKITEC, the above-mentioned cut-out sheet was placed along the guide, and the temperature of the sheet surface was controlled to from 70° to 90° C. by varying a holding time in the heater section in which a heater temperature was set to 400° C. to heat and soften the sheet to a thermoformable state. Thereafter, the sheet was subjected to vacuum molding with upper and lower dies of which surface temperatures were set at 90° C., and the sheet was held in the die for 10 seconds, and thereafter demolded, to provide a thermoformed article. As the temperature of the sheet surface, the sheet surface temperature after heating was directly measured with a surface thermometer. Here, the die used is shown in FIG. 1.

Here, the raw materials in Tables 7 to 9 are as follows.

<Polyester Resin>
NW4032D: Polylactic acid resin, manufactured by Nature Works LLC, poly-L-lactic acid, Nature Works 4032D, optical purity: 98.5%, melting point: 160° C., weight-average molecular weight: 141,000

<Plasticizer>
$(MeEO_3)_2SA$: A diester formed between succinic acid and triethylene glycol monomethyl ether, prepared in Preparation Example 1 of Plasticizer <Crystal Nucleating Agent>
SLIPACKS H: Ethylenebis 12-hydroxystearamide, manufactured by Nippon Kasei Chemical Co., Ltd.

The properties of the resulting molded articles were evaluated in accordance with the methods of the following Test Examples B-1 to B-3. The results are shown in Tables 7 to 9.

Test Example B-1—Heat Resistance

A sample piece having a width of 1 cm and a length of 4 cm was cut out from a flat portion of a top side of a thermoformed article, and a storage modulus E' in a temperature region of from −20° to 80° C. was measured at a frequency of 10 Hz and a heating rate of 2° C./min with a dynamic viscoelasticity measurement instrument manufactured by SII Nano Technology Inc., EXSTAR6000, and a storage modulus (MPa) at 80° C. was obtained. It is shown that if the numerical values are 180 or more, the formed article has excellent heat resistance.

Test Example B-2—Transparency

Haze values for the formed articles obtained were measured with a haze meter Model HM-150, manufactured by MURAKAMI COLOR RESEARCH LABORATORY CO., Ltd., and the Haze values were used as indexes for transparency. It is shown that the lower the numerical values, the more excellent the transparency.

Test Example B-3—Measurement of Relative Crystallinity

A part of the above-mentioned amorphous sheets and the thermoformed articles was cut out, and a relative crystallinity was obtained. Specifically, a cut-out sample was heated from 20° to 200° C. at a rate of 20° C./min with DSC manufactured by PerkinElmer Inc., and a relative crystallinity was obtained in accordance with the following formula from ΔHcc, which is an absolute value of a cold crystallization enthalpy observed, and ΔHm, which is an absolute value of a melt crystallization enthalpy observed:

Relative Crystallinity, %={(ΔHm−ΔHcc)/ΔHm}×100

TABLE 7

| Raw Materials for Polyester Resin Composition, parts by weight | | | Examples | | | | |
| --- | --- | --- | --- | --- | --- | --- | --- |
| | | | B-1 | B-2 | B-3 | B-4 | B-5 |
| Polyester Resin | NW4032D | | 100 | 100 | 100 | 100 | 100 |
| Fine Cellulose Fiber Composite | Preparation Example of Fine Cellulose Fiber Composite | | 7 | 14 | 4 | 3 | 6 |
| | Fine Cellulose Fibers | Average Fiber Diameter, nm | 3.3 | 3.3 | 3.3 | 3.3 | 3.3 |
| | | Carboxy Group Content, mmol/g | 1.4 | 1.4 | 1.2 | 1.2 | 1.4 |

TABLE 7-continued

| Raw Materials for Polyester Resin Composition, parts by weight | | | Examples | | | | |
|---|---|---|---|---|---|---|---|
| | | | B-1 | B-2 | B-3 | B-4 | B-5 |
| | Substituent | Kind | octadecyl group | dodecyl group | hexyl group | hexyl group | hexyl group |
| | | Binding Form | amide bond | amide bond | amide bond | amide bond | amide bond |
| | | Average Binding Amount, mmol/g | 0.64 | 0.75 | 0.02 | 0.53 | 0.81 |
| | | Introductory Rate, % | 46 | 54 | 1.7 | 44 | 58 |
| | Average Fiber Diameter of Composite, nm | | 3.94 | 7.33 | 3.17 | 3.17 | 3.07 |
| | Carboxy Group Content Of Composite, mmol/g | | 0.76 | 0.65 | 1.18 | 0.67 | 0.59 |
| | Content | | 0.1 | 0.1 | 0.1 | 0.1 | 0.1 |
| Plasticizer | (MeEO$_3$)$_2$SA | | 10 | 10 | 10 | 10 | 10 |
| Crystal Nucleating Agent | SLIPACKS H | | 0.4 | 0.4 | 0.4 | 0.4 | 0.4 |
| Relative Crystallinity of Amorphous Sheet, % | | | 41 | 40 | 42 | 42 | 41 |
| Properties of Molded Articles | | | | | | | |
| Storage Modulus, MPa | | | 300 | 320 | 315 | 325 | 335 |
| Transparency, Haze, % | | | 20 | 15 | 15 | 14 | 12 |
| Relative Crystallinity, % | | | 100 | 100 | 100 | 100 | 100 |

TABLE 8

| Raw Materials for Polyester Resin Composition, parts by weight | | | Examples | | | | |
|---|---|---|---|---|---|---|---|
| | | | B-6 | B-7 | B-8 | B-9 | B-10 |
| Polyester Resin | NW4032D | | 100 | 100 | 100 | 100 | 100 |
| Fine Cellulose Fiber Composite | Preparation Example of Fine Cellulose Fiber Composite | | 2 | 1 | 5 | 5 | 5 |
| | Fine Cellulose Fibers | Average Fiber Diameter, nm | 3.3 | 3.3 | 3.3 | 3.3 | 3.3 |
| | | Carboxy Group Content, mmol/g | 1.2 | 1.2 | 1.4 | 1.4 | 1.4 |
| | Substituent | Kind | propyl group | propyl group | propyl group | propyl group | propyl group |
| | | Binding Form | amide bond | amide bond | amide bond | amide bond | amide bond |
| | | Average Binding Amount, mmol/g | 0.06 | 0.20 | 0.79 | 0.79 | 0.79 |
| | | Introductory Rate, % | 5 | 17 | 56 | 56 | 56 |
| | Average Fiber Diameter of Composite, nm | | 3.07 | 3.07 | 3.17 | 3.17 | 3.17 |
| | Carboxy Group Content of Composite, mmol/g | | 1.14 | 1.00 | 0.61 | 0.61 | 0.61 |
| | Content | | 0.1 | 0.1 | 0.05 | 0.1 | 0.2 |
| Plasticizer | (MeEO$_3$)$_2$SA | | 10 | 10 | 10 | 10 | 10 |
| Crystal Nucleating Agent | SLIPACKS H | | 0.4 | 0.4 | 0.4 | 0.4 | 0.4 |
| Relative Crystallinity of Amorphous Sheet, % | | | 40 | 41 | 41 | 42 | 42 |
| Properties of Molded Articles | | | | | | | |
| Storage Modulus, MPa | | | 345 | 350 | 320 | 360 | 365 |
| Transparency, Haze, % | | | 9 | 8 | 5 | 6 | 8 |
| Relative Crystallinity, % | | | 100 | 100 | 100 | 100 | 100 |

TABLE 9

| Raw Materials for Polyester Resin Composition, parts by weight | | | Comparative Examples | | | |
|---|---|---|---|---|---|---|
| | | | B-1 | B-2 | B-3 | B-4 |
| Polyester Resin | NW4032D | | 100 | 100 | 100 | 100 |
| Fine Cellulose Fiber Composite | Preparation Example of Fine Cellulose Fiber Composite | | — | 13 | 10 | 8 |
| | Fine Cellulose Fibers | Average Fiber Diameter, nm | 3.3 | 3.3 | 3.3 | 3.3 |
| | | Carboxy Group Content, mmol/g | 1.2 | 1.4 | 1.4 | 1.4 |
| | Substituent | Kind | — | TBAH group[1] | propyl group | propyl group |
| | | Binding Form | — | ionic bond | ionic bond | ester bond |
| | | Average Binding Amount, mmol/g | — | 0.93 | 1.15 | 0.73 |
| | | Introductory Rate, % | — | 66 | 82 | 52 |
| | Average Fiber Diameter of Composite, nm | | — | 2.58 | 2.49 | 3.02 |
| | Carboxy Group Content of Composite, mmol/g | | — | 0.47 | 0.25 | 0.47 |
| | Content | | 0.1 | 0.1 | 0.1 | 0.1 |

TABLE 9-continued

|  | Comparative Examples | | | |
|---|---|---|---|---|
| Raw Materials for Polyester Resin Composition, parts by weight | B-1 | B-2 | B-3 | B-4 |
| Plasticizer (MeEO$_3$)$_2$SA | 10 | 10 | 10 | 10 |
| Crystal Nucleating Agent SLIPACKS H | 0.4 | 0.4 | 0.4 | 0.4 |
| Relative Crystallinity of Amorphous Sheet, % | 40 | 40 | 41 | 42 |
| Properties of Molded Articles | | | | |
| Storage Modulus, MPa | 110 | 130 | 140 | 150 |
| Transparency, Haze, % | 50 | 45 | 43 | 40 |
| Relative Crystallinity, % | 100 | 100 | 100 | 100 |

[1)]TBAH group: tetrabutylammonium hydroxide group

As is clear from the results of Tables 7 to 9, the thermoformed articles of the polyester resin compositions of the present invention, Examples B-1 to B-10, have excellent transparency, and a large storage modulus at 80° C., thereby suggesting excellent heat resistance.

Examples C-1 to C-15 and Comparative Examples C-1 to C-5

Preparation of Polyester Resin Compositions

Raw materials for compositions as listed in Tables 10 to 13 were added in a single batch to a twin-screw extruder manufactured by Ikegai Corporation, PCM-45 from a raw material supplying inlet, and melt-kneaded at a rotational speed of 100 r/min and a melt-kneading temperature of 190° C., and the kneaded mixture was strand-cut, to provide pellets of a polyester resin composition. The pellets obtained were dried at 80° C. for 5 hours with a dehumidifier, so as to have a water content of 500 ppm or less. Here, in Comparative Example C-1, pellets were prepared in the same manner as in Example C-1, using a dispersion of fine cellulose fibers obtained in Production Example 1 in a content as listed in Table 13 calculated on a solid basis. In Example C-11 and Comparative Example C-5, the pellets were prepared in the same manner as in Example C-1 except that a melt-kneading temperature was set at 260° C.

Examples C-1 to C-10 and C-12 to C-15 and Comparative Examples C-1 to C-4

Preparation of Injection-Molded Articles

Next, the resulting pellets were injection-molded with an injection-molding machine manufactured by The Japan Steel Works, Ltd., J110AD-180H, of which cylinder temperature was set at 200° C., and test pieces, rectangular test pieces of dimensions of 125 mm×12 mm×6 mm were molded at a die temperature of 80° C. and a molding time of 60 seconds.

Example C-11 and Comparative Example C-5

Preparation of Injection-Molded Articles

Injection-molding was carried out in the same manner as in Example C-1 except that a cylinder temperature was changed to 260° C., that a die temperature was changed to 120° C., and that a molding time was changed to 120 seconds, to provide test pieces.

Here, the raw materials in Tables 10 to 13 are as follows.
<Polyester Resin>
NW4032D: Polylactic acid resin, manufactured by Nature Works LLC, poly-L-lactic acid, Nature Works 4032D, optical purity: 98.5%, melting point: 160° C., weight-average molecular weight: 141,000

NOACRYSTAL-V: Polyethylene terephthalate resin, manufactured by RP TOPLA LIMITED, A-PET, melting point: 250° C.

<Plasticizer>

(MeEO$_3$)$_2$SA: A diester formed between succinic acid and triethylene glycol monomethyl ether, prepared in Preparation Example 1 of Plasticizer MeSA-1,3PD: An oligoester compound formed between dimethyl succinate and 1,3-propanediol, prepared in Preparation Example 2 of Plasticizer DAIFATTY-101: A diester compound formed between adipic acid and an equivolume mixture of methyl diglycol/benzyl ester, manufactured by DAIHACHI CHEMICAL INDUSTRY CO., LTD.

<Crystal Nucleating Agent>

PPA-Zn: A zinc salt of unsubstituted phenylphosphonic acid, manufactured by NISSAN CHEMICAL INDUSTRIES, LTD.

<Hydrolysis Inhibitor>

Carbodilite LA-1: Polycarbodiimide, manufactured by Nisshin Boseki Chemical Inc.

The properties of the resulting molded articles were evaluated in accordance with the methods of the following Test Examples C-1 to C-2. The results are shown in Tables 10 to 13.

Test Example C-1—Heat Resistance

A temperature at which a test piece deflected in amount of 0.25 mm under a load of 1.80 MPa is defined as a deflection temperature under load, ° C., for each of rectangular test pieces having dimensions of 125 mm×12 mm×6 mm was measured, as prescribed in JIS K7191 with a measurement instrument for a deflection temperature under load manufactured by Toyo Seiki Seisaku-sho, Ltd., B-32. It is shown that the higher the deflection temperature under load, the more excellent the heat resistance.

Test Example C-2—Flexural Strength

A flexural test was carried out for rectangular test pieces having dimension of 125 mm×12 mm×6 mm, as prescribed in JIS K7203, with TENSILON, manufactured by Orientec Co., LTD., TENSILON Tensile Tester RTC-1210A, with setting a crosshead speed to 3 mm/min to obtain flexural strength. It is shown that the higher the flexural strength, the more excellent the flexibility.

TABLE 10

| Raw Materials for Polyester Resin Composition, parts by weight | | Examples | | | | |
|---|---|---|---|---|---|---|
| | | C-1 | C-2 | C-3 | C-4 | G-5 |
| Polyester Resin | NW4032D | 100 | 100 | 100 | 100 | 100 |
| Fine Cellulose Fiber Composite | Preparation Example of Fine Cellulose Fiber Composite | 7 | 14 | 4 | 3 | 6 |
| | Fine Cellulose Fibers Average Fiber Diameter, nm | 3.3 | 3.3 | 3.3 | 3.3 | 3.3 |
| | Fine Cellulose Fibers Carboxy Group Content, mmol/g | 1.4 | 1.4 | 1.2 | 1.2 | 1.4 |
| | Substituent Kind | octadecyl group | dodecyl group | hexyl group | hexyl group | hexyl group |
| | Binding Form | amide bond | amide bond | amide bond | amide bond | amide bond |
| | Average Binding Amount, mmol/g | 0.64 | 0.75 | 0.02 | 0.53 | 0.81 |
| | Introductory Rate, % | 46 | 54 | 1.7 | 44 | 58 |
| | Average Fiber Diameter of Composite, nm | 3.94 | 7.33 | 3.17 | 3.17 | 3.07 |
| | Carboxy Group Content of Composite, mmol/g | 0.76 | 0.65 | 1.18 | 0.67 | 0.59 |
| | Content | 0.1 | 0.1 | 0.1 | 0.1 | 0.1 |
| Plasticizer | (MeEO$_3$)$_2$SA | 10 | 10 | 10 | 10 | 10 |
| Crystal Nucleating Agent | PPA-Zn | 1 | 1 | 1 | 1 | 1 |
| Hydrolysis Inhibitor | Carbodilite LA-1 | 1 | 1 | 1 | 1 | 1 |
| Properties | | | | | | |
| Deflection Temperature Under Load, °C. | | 75 | 77 | 75 | 77 | 79 |
| Flexural Strength, MPa | | 48 | 58 | 56 | 59 | 66 |

TABLE 11

| Raw Materials for Polyester Resin Composition, parts by weight | | Examples | | | | |
|---|---|---|---|---|---|---|
| | | C-6 | C-7 | C-8 | C-9 | C-10 |
| Polyester Resin | NW4032D | 100 | 100 | 10 | 100 | 100 |
| Fine Cellulose Fiber Composite | Preparation Example of Fine Cellulose Fiber Composite | 2 | 1 | 5 | 5 | 5 |
| | Fine Cellulose Fibers Average Fiber Diameter, nm | 3.3 | 3.3 | 3.3 | 3.3 | 3.3 |
| | Fine Cellulose Fibers Carboxy Group Content, mmol/g | 1.2 | 1.2 | 1.4 | 1.4 | 1.4 |
| | Substituent Kind | propyl group | propyl group | propyl group | propyl group | propyl group |
| | Binding Form | amide bond | amide bond | amide bond | amide bond | amide bond |
| | Average Binding Amount, mmol/g | 0.06 | 0.20 | 0.79 | 0.79 | 0.79 |
| | Introductory Rate, % | 5 | 17 | 56 | 56 | 56 |
| | Average Fiber Diameter of Composite, nm | 3.07 | 3.07 | 3.17 | 3.17 | 3.17 |
| | Carboxy Group Content of Composite, mmol/g | 1.14 | 1.00 | 0.61 | 0.61 | 0.61 |
| | Content | 0.1 | 0.1 | 0.05 | 0.1 | 0.2 |
| Plasticizer | (MeEO$_3$)$_2$SA | 10 | 10 | 10 | 10 | 10 |
| Crystal Nucleating Agent | PPA-Zn | 1 | 1 | 1 | 1 | 1 |
| Hydrolysis Inhibitor | Carbodilite LA-1 | 1 | 1 | 1 | 1 | 1 |
| Properties | | | | | | |
| Deflection Temperature Under Load, °C. | | 79 | 85 | 75 | 92 | 90 |
| Flexural Strength, MPa | | 69 | 70 | 65 | 75 | 80 |

TABLE 12

| Raw Materials for Polyester Resin Composition, parts by weight | | Examples | | | | |
|---|---|---|---|---|---|---|
| | | C-11 | C-12 | C-13 | C-14 | C-15 |
| Polyester Resin | NW4032D | — | 100 | 100 | 100 | 100 |
| | NOACRYSTAL-V | 100 | — | — | — | — |
| Fine Cellulose Fiber Composite | Preparation Example of Fine Cellulose Fiber Composite | 5 | 15 | 5 | 5 | 5 |
| | Fine Cellulose Fibers Average Fiber Diameter, nm | 3.3 | 3.3 | 3.3 | 3.3 | 3.3 |
| | Fine Cellulose Fibers Carboxy Group Content, mmol/g | 1.4 | 1.4 | 1.4 | 1.4 | 1.4 |

TABLE 12-continued

| Raw Materials for Polyester Resin Composition, parts by weight | | | C-11 | C-12 | C-13 | C-14 | C-15 |
|---|---|---|---|---|---|---|---|
| | Substituent | Kind | propyl group | 2-ethylhexyl group | propyl group | propyl group | propyl group |
| | | Binding Form | amide bond | amide bond | amide bond | amide bond | amide bond |
| | | Average Binding Amount, mmol/g | 0.79 | 0.58 | 0.79 | 0.79 | 0.79 |
| | | Introductory Rate, % | 56 | 41 | 56 | 56 | 56 |
| | Average Fiber Diameter of Composite, nm | | 3.17 | 4.17 | 3.17 | 3.17 | 3.17 |
| | Carboxy Group Content of Composite, mmol/g | | 0.61 | 1.18 | 0.61 | 0.61 | 0.61 |
| | Content | | 0.1 | 0.1 | 0.1 | 0.1 | 0.1 |
| Plasticizer | $(MeEO_3)_2SA$ | | 10 | 10 | — | — | 10 |
| | MeSA-1,3PD | | — | — | 10 | — | — |
| | DAIFATTY-101 | | — | — | — | 10 | — |
| Crystal Nucleating Agent | PPA-Zn | | — | 1 | 1 | 1 | — |
| Hydrolysis Inhibitor | Carbodilite LA-1 | | — | 1 | 1 | 1 | 1 |
| Properties | | | | | | | |
| Deflection Temperature Under Load, °C. | | | 71 | 77 | 90 | 88 | 79 |
| Flexural Strength, MPa | | | 103 | 59 | 71 | 70 | 72 |

TABLE 13

| Raw Materials for Polyester Resin Composition, parts by weight | | | C-1 | C-2 | C-3 | C-4 | C-5 |
|---|---|---|---|---|---|---|---|
| Polyester Resin | NW4032D | | 100 | 100 | 100 | 100 | — |
| | NOACRYSTAL-V | | — | — | — | — | 100 |
| Fine Cellulose Fiber Composite | Preparation Example of Fine Cellulose Fiber Composite | | — | 13 | 10 | 8 | — |
| | Fine Cellulose Fibers | Average Fiber Diameter, nm | 3.3 | 3.3 | 3.3 | 3.3 | — |
| | | Carboxy Group Content, mmol/g | 1.2 | 1.4 | 1.4 | 1.4 | — |
| | Substituent | Kind | — | TBAH group[1] | propyl group | propyl group | — |
| | | Binding Form | — | ionic bond | ionic bond | ester bond | — |
| | | Average Binding Amount, mmol/g | — | 0.93 | 1.15 | 0.73 | — |
| | | Introductory Rate, % | — | 66 | 82 | 52 | — |
| | Average Fiber Diameter of Composite, nm | | — | 2.58 | 2.49 | 3.02 | — |
| | Carboxy Group Content of Composite, mmol/g | | — | 0.47 | 0.25 | 0.47 | — |
| | Content | | 0.1 | 0.1 | 0.1 | 0.1 | — |
| Plasticizer | $(MeEO_3)_2SA$ | | 10 | 10 | 10 | 10 | 10 |
| Crystal Nucleating Agent | PPA-Zn | | 1 | 1 | 1 | 1 | — |
| Hydrolysis Inhibitor | Carbodilite LA-1 | | 1 | 1 | 1 | 1 | — |
| Properties | | | | | | | |
| Deflection Temperature Under Load, °C. | | | 55 | 60 | 62 | 65 | 41 |
| Flexural Strength, MPa | | | 28 | 35 | 38 | 39 | 90 |

[1]TBAH group: tetrabutylammonium hydroxide group

As is clear from the results of Tables 10 to 13, the injection-molded articles of the polyester resin compositions of the present invention, Examples C-1 to C-15, have excellent heat resistance, and high flexural strength, thereby suggesting excellent mechanical strength.

Test Example D-1

The following properties were evaluated for the fine cellulose fiber composites. The results are shown in Table 14. Here, the fine cellulose fiber composites evaluated are the fine cellulose fiber composites obtained in Preparation Examples 6 and 12 mentioned above, and composites obtained in the following Preparation Examples.

(Yellowing Resistance)

A fine cellulose fiber composite was washed with a 1 M aqueous hydrochloric acid solution, and further with ion-exchanged water, and thereafter dried under a reduced pressure at 60° C. for 12 hours. The resulting dried product was pulverized, and evenly sized to a particle size of from 53 to 130 μM to provide a sample. With respect to the sample, b value was measured with a colorimeter manufactured by Konica Minolta, Inc., under the trade name of "CR-200." Thereafter, the sample was stored in the environment of 150° C. for 1.5 hours, and b value was then measured again. The yellowing resistance Δb was calculated by the following formula. It is shown that the lower the yellowing resistance, the more excellent the properties.

Yellowing Resistance Δb=(b Value When Stored at 150° C. for 1.5 hours)−(b Value Before Storage)

(Storage Modulus)

Ethanol or ion-exchanged water was added to a fine cellulose fiber composite, to provide a 0.5 wt % solution, and the solution was stirred with a ultrasonication agitator for 2 minutes. The resulting dispersion was transferred to a petri dish, dried at room temperature over an entire day and night, and then dried under a reduced pressure at 60° C. for 6 hours, to provide a film. With respect to this film, a storage modulus at 100° C. was measured with a measurement instrument for viscoelasticity manufactured by SSI Nano Technology Inc., under the trade name of "EXSTAR DMS 6100." It is shown that the higher the storage modulus, the more excellent the film strength.

Preparation Example 16 of Fine Cellulose Fiber Composite

A four-neck rounded bottom flask equipped with a mechanical stirrer and a reflux tube was charged with 79.29 g of the dispersion of acetone-containing acidic cellulose fibers obtained in Preparation Example 2 of Fine Cellulose Fibers, a solid content concentration of which was adjusted from 5.0% by mass to 3.3% by mass, 800 g of isopropyl alcohol was added thereto to make a 0.3% by mass solution, and the solution was stirred at room temperature for 1 hour. Next, the flask was charged with 1.19 g of dodecylamine, equivalent to 2 mol of amine groups per one mol of carboxy groups of the fine cellulose fibers, and 1.78 g of DMT-MM to dissolve, and the contents were then allowed to react at 50° C. for 4 hours. After the termination of the reaction, the reaction mixture was filtered, and thereafter the residue was washed with ethanol/ion-exchanged water to remove unreacted dodecylamine and DMT-MM. Finally, acetone was added thereto, and the mixture was filtered, to provide a fine cellulose fiber composite containing fine cellulose fibers and dodecyl groups connected thereto via an amide bond. The average binding amount of the dodecyl groups in the fine cellulose fiber composite was 0.75 mmol/g, and the average fiber diameter of the fine cellulose fiber composite was 7.33 nm.

Preparation Example 17 of Fine Cellulose Fiber Composite

A four-neck rounded bottom flask equipped with a mechanical stirrer and a reflux tube was charged with 114.94 g of the dispersion of acetone-containing acidic cellulose fibers obtained in Preparation Example 2 of Fine Cellulose Fibers, a solid content concentration of which was adjusted from 5.0% by mass to 3.5% by mass, 800 g of isopropyl alcohol was added thereto to make a 0.5% by mass solution, and the solution was stirred at room temperature for 1 hour. Next, the flask was charged with 0.09 g of hexylamine, equivalent to 0.2 mol of amine groups per one mol of carboxy groups of the fine cellulose fibers, and 0.24 g of DMT-MM to dissolve, and the contents were then allowed to react at 50° C. for 4 hours. After the termination of the reaction, the reaction mixture was filtered, and thereafter the residue was washed with methanol/ion-exchanged water to remove unreacted hexylamine and DMT-MM. Finally, acetone was added thereto, and the mixture was filtered, to provide a fine cellulose fiber composite containing fine cellulose fibers and hexyl groups connected thereto via an amide bond. The average binding amount of the hexyl groups in the fine cellulose fiber composite was 0.07 mmol/g, and the average fiber diameter of the fine cellulose fiber composite was 2.59 nm.

Preparation Example 18 of Fine Cellulose Fiber Composite

A four-neck rounded bottom flask equipped with a mechanical stirrer and a reflux tube was charged with 114.94 g of the dispersion of acetone-containing acidic cellulose fibers obtained in Preparation Example 2 of Fine Cellulose Fibers, a solid content concentration of which was adjusted from 5.0% by mass to 3.5% by mass, 800 g of isopropyl alcohol was added thereto to make a 0.5% by mass solution, and the solution was stirred at room temperature for 1 hour. Next, the flask was charged with 0.08 g of dodecylamine, equivalent to 0.1 mol of amine groups per one mol of carboxy groups of the fine cellulose fibers, and 0.12 g of DMT-MM to dissolve, and the contents were allowed to react at 50° C. for 4 hours. After the termination of the reaction, the reaction mixture was filtered, and thereafter the residue was washed with methanol/ion-exchanged water to remove unreacted dodecylamine and DMT-MM. Finally, acetone was added thereto, and the mixture was filtered, to provide a fine cellulose fiber composite containing fine cellulose fibers and dodecyl groups connected thereto via an amide bond. The average binding amount of the dodecyl groups in the fine cellulose fiber composite was 0.05 mmol/g, and the average fiber diameter of the fine cellulose fiber composite was 3.76 nm.

TABLE 14

| | Preparation Example No. of Fine Cellulose Fiber Composite | | | | |
|---|---|---|---|---|---|
| | 6 | 16 | 17 | 18 | 12 |
| The Number of Carbon Atoms of Hydrocarbon Groups | 6 | 12 | 6 | 12 | 18 |
| Average Binding Amount, mmol/g | 0.81 | 0.75 | 0.07 | 0.05 | 0.75 |
| Yellowing Resistance $\Delta b$ | 13 | 14 | 20 | 21 | 10 |
| Storage Modulus, Pa | $1.5 \times 10^9$ | $1.3 \times 10^9$ | $2.9 \times 10^9$ | $2.1 \times 10^9$ | $5.5 \times 10^8$ |

A composite in which the number of carbon atoms of the hydrocarbon groups in the fine cellulose fiber composite is 6 and the average binding amount is 0.81 mmol/g and a composite in which the number of carbon atoms of the hydrocarbon groups in the composite is 12 and the average binding amount is 0.75 mmol/g are excellent in both yellowing resistance and film strength.

INDUSTRIAL APPLICABILITY

The polyester resin composition of the present invention is suitably used for various industrial applications, such as daily sundries, household electric appliance parts, packaging materials for household electric appliance parts, and automobile parts. The fine cellulose fiber composite including surface-modified fine cellulose fibers of the present invention has high dispersibility against solvents having wide polarity, and exhibits thickening effects, so that it is suitable as various thickeners or the like. In addition, the fine cellulose fiber composite also has high dispersibility against various resins and can exhibit strength-enhancing effects, so that it is suitable as various fillers or the like.

The invention claimed is:
1. A fine cellulose fiber composite having an average fiber diameter of from 1 to 10 nm, wherein the fine cellulose fiber composite comprises:
fine cellulose fibers having an average fiber diameter of from 1 to 10 nm; and
hydrocarbon groups having from 3 to 12 carbon atoms;

wherein the hydrocarbon groups are connected to the fine cellulose fibers via an amide bond in an average binding amount of from 0.3 to 2.0 mmol/g.

2. The fine cellulose fiber composite according to claim 1, wherein the carboxy group content is from 0 to 2.8 mmol/g in the fine cellulose fiber composite.

3. The fine cellulose fiber composite according to claim 1, wherein the fine cellulose fiber composite is a reaction product of carboxy group-containing cellulose fibers and a primary amine or a secondary amine;

wherein the primary amine or the secondary amine comprises the hydrocarbon groups having from 3 to 12 carbon atoms.

* * * * *